(12) United States Patent
Campbell et al.

(10) Patent No.: US 12,533,448 B2
(45) Date of Patent: Jan. 27, 2026

(54) WEARABLE HEMOFILTRATION ARTIFICIAL KIDNEY

(71) Applicant: Volutrol Inc., London (CA)

(72) Inventors: Gordon John Campbell, London (CA); Robert McGregor Lindsay, London (CA); Salem Treesh, London (CA); Shih Han Huang, London (CA); Charles Anthony Rupar, London (CA); Robert Gonzales Barbeito, London (CA)

(73) Assignee: Volutrol Inc., London (CA)

( * ) Notice: Subject to any disclaimer, the term of this patent is extended or adjusted under 35 U.S.C. 154(b) by 320 days.

(21) Appl. No.: 18/025,788

(22) PCT Filed: Dec. 14, 2021

(86) PCT No.: PCT/CA2021/051811
§ 371 (c)(1),
(2) Date: Mar. 10, 2023

(87) PCT Pub. No.: WO2022/133582
PCT Pub. Date: Jun. 30, 2022

(65) Prior Publication Data
US 2023/0330310 A1    Oct. 19, 2023

Related U.S. Application Data

(60) Provisional application No. 63/128,725, filed on Dec. 21, 2020.

(51) Int. Cl.
*A61M 1/16* (2006.01)
*A61M 1/34* (2006.01)
*A61M 1/36* (2006.01)

(52) U.S. Cl.
CPC ........ *A61M 1/1601* (2014.02); *A61M 1/3406* (2014.02); *A61M 1/3626* (2013.01);
(Continued)

(58) Field of Classification Search
None
See application file for complete search history.

(56) References Cited

U.S. PATENT DOCUMENTS 3,388,803 A    6/1968 Scott
3,884,808 A    5/1975 Scott
(Continued)

FOREIGN PATENT DOCUMENTS

CN    107469170 A    12/2017
EP    2281591 A1    2/2011
(Continued)

OTHER PUBLICATIONS

International Search Report and Written Opinion of PCT/CA2021/050274 dated Aug. 30, 2021.
(Continued)

*Primary Examiner* — Krishnan S Menon
(74) *Attorney, Agent, or Firm* — Smart & Biggar LP

(57) ABSTRACT

An artificial kidney configured to automatically or semi-automatically perform priming, procedure running, purging, flushing, and procedure ending. The artificial kidney is wearable and can be used while ambulating, sitting, and lying down. The artificial kidney can be used at home as a supplement to standard intermittent hemodialysis therapy in the clinic. In an example, the artificial kidney can be configured to perform alert event detection, start a timer, and take steps to resolving the alert event. The steps can include automated steps and can include instructions to be manually performed by the user (or the patient). If the alert event is resolved within a set time, the artificial kidney can continue
(Continued)

to perform procedure running. If the alert event is not resolved within the set time, the artificial kidney performs the procedure ending.

18 Claims, 38 Drawing Sheets

(52) U.S. Cl.
CPC ....... *A61M 1/3643* (2013.01); *A61M 2205/18* (2013.01); *A61M 2209/088* (2013.01)

(56) References Cited

U.S. PATENT DOCUMENTS

| | | | |
|---|---|---|---|
| 3,902,490 | A | 9/1975 | Jacobsen et al. |
| 3,926,797 | A | 12/1975 | Gigou et al. |
| 4,212,738 | A | 7/1980 | Henne |
| 4,235,231 | A | 11/1980 | Schindler et al. |
| 5,284,470 | A | 2/1994 | Beltz |
| 5,431,811 | A | 7/1995 | Tusini et al. |
| 6,960,179 | B2 | 11/2005 | Gura |
| 7,597,677 | B2 | 10/2009 | Gura et al. |
| 7,896,830 | B2 | 3/2011 | Gura et al. |
| 8,137,299 | B2 | 3/2012 | Gura et al. |
| 8,206,331 | B2 | 6/2012 | Gura et al. |
| 2003/0097086 | A1 | 5/2003 | Gura |
| 2004/0009096 | A1 | 1/2004 | Wellman |
| 2006/0241543 | A1 | 10/2006 | Gura |
| 2007/0179425 | A1 | 8/2007 | Gura et al. |
| 2008/0021366 | A1 | 1/2008 | Gura et al. |
| 2008/0051689 | A1 | 2/2008 | Gura et al. |
| 2009/0120864 | A1 | 5/2009 | Fulkerson et al. |
| 2011/0105982 | A1 | 5/2011 | Leonard et al. |
| 2014/0276371 | A1 | 9/2014 | Updyke et al. |
| 2019/0099536 | A1 | 4/2019 | Zhao |

FOREIGN PATENT DOCUMENTS

| | | | |
|---|---|---|---|
| FR | 2156699 | A1 | 6/1973 |
| FR | 2355515 | A1 | 1/1978 |
| KR | 20050014640 | A | 2/2005 |
| WO | 8203567 | | 10/1982 |
| WO | 9529731 | | 11/1995 |
| WO | 2007103411 | A2 | 9/2007 |
| WO | 2008075951 | A1 | 6/2008 |
| WO | 2009025807 | A1 | 2/2009 |
| WO | 2012042481 | A2 | 4/2012 |
| WO | 2014099631 | A1 | 6/2014 |

OTHER PUBLICATIONS

International Search Report and Written Opinion of PCT/CA2021/051811 dated Feb. 28, 2022.

Extended European Search Report of corresponding EP Application No. 21908183.3 dated Jul. 4, 2024.

Ultrafiltration

Hemofiltration

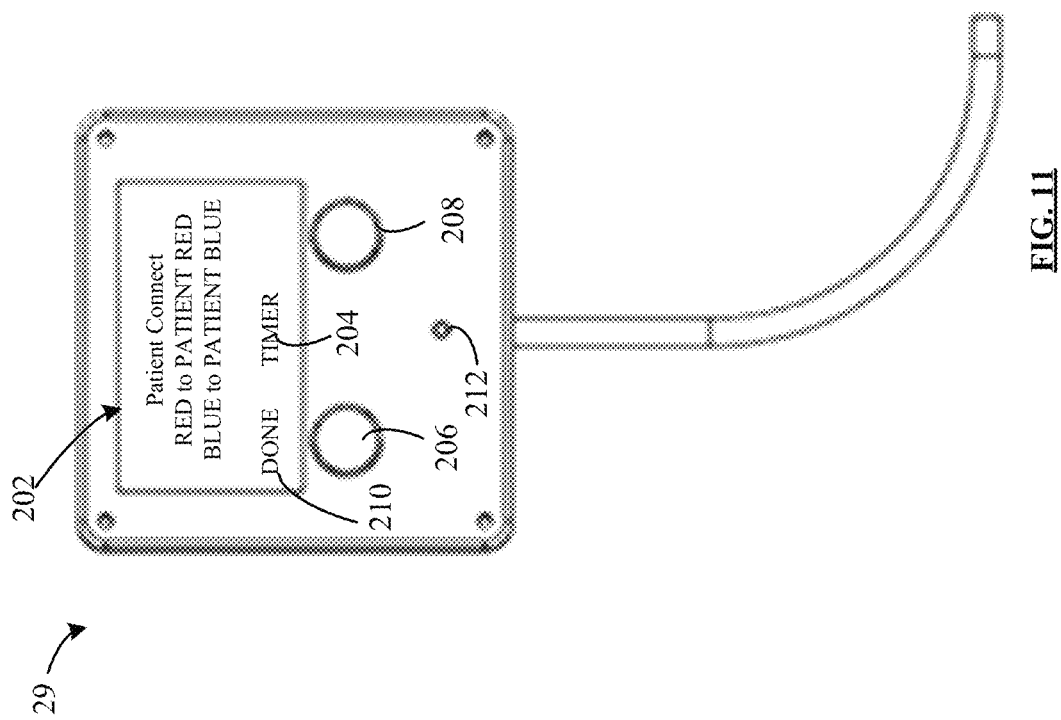

WEARABLE HEMOFILTRATION ARTIFICIAL KIDNEY

CROSS-REFERENCE

This application is a U.S. nationalization under 35 U.S.C. § 371 of International Application No. PCT/CA2021/051811 filed Dec. 14, 2021, which claims the benefit of priority to U.S. Provisional Patent Application No. 63/128,725 filed Dec. 21, 2020, all the contents of which are incorporated by reference into the Detailed Description of Example Embodiments herein below. This application is also a Continuation-In-Part of PCT Patent Application No. PCT/CA2021/050274 filed Mar. 2, 2021, which claims the benefit of priority to U.S. Provisional Patent Application No. 63/128,725 filed Dec. 21, 2020, all the contents of which are incorporated by reference into the Detailed Description of Example Embodiments herein below.

TECHNICAL FIELD

Example embodiments relate to artificial kidneys, for example portable or wearable artificial kidneys.

BACKGROUND

Artificial kidneys are used to perform dialysis on a patient. For example, blood from the patient can be filtered and returned to the patient.

In some instances, the patient is required to attend an on-site clinic away from home to perform the dialysis procedure. The dialysis procedure is performed on a schedule that is intermittent, e.g. three times weekly. Another difficulty with existing artificial kidneys is that the patient is to remain in a fixed position when receiving the dialysis procedure, e.g. sitting up in a chair or bed. Another difficulty is that if a problem arises during the dialysis procedure, the procedure needs to be restarted or a trained practitioner needs to be available to address the problem.

It is desirable to provide an artificial kidney that is portable and wearable.

It is desirable to provide an artificial kidney that can be used while ambulating, sitting, and lying down. It is desirable to provide an artificial kidney that can be used away from a clinic, such as at home.

It is desirable to provide an artificial kidney that can be used between clinic appointments and at a lower continuous dialysis flow rate to improve dialysis efficacy.

It is desirable to provide an artificial kidney that can detect problems that arise during the dialysis procedure and automatically or semi-automatically take steps to address the problems.

Additional difficulties with existing systems may be appreciated in view of the Detailed Description of Example Embodiments, below.

SUMMARY

An example embodiment is an artificial kidney configured to automatically or semi-automatically perform priming, procedure running, purging, flushing, and procedure ending. In an example, the artificial kidney can be configured to perform alert event detection, start a timer, and take steps to resolving the alert event. The steps can include automated steps and can include instructions to be manually performed by the user (or the patient). If the alert event is resolved within a set time, the artificial kidney can continue to perform procedure running. If the alert event is not resolved within the set time, the artificial kidney performs the procedure ending.

An advantage of the artificial kidney is that the artificial kidney can automatically or semi-automatically perform priming, procedure running, purging, flushing, and procedure ending.

Another advantage of the artificial kidney is that the time of the alert event can be tracked to remedy the alert event within a set time. If the alarm event can be remedied within the set time, then procedure running can continue to be performed on the patient, which avoids restarting the entire dialysis procedure, and therefore can avoid replacing and re-priming the disposables of the artificial kidney for the restarting.

An example embodiment is an artificial kidney, comprising: a garment for supporting at least part of the artificial kidney; a blood inlet circuit; a 3-port, 2-position blood inlet stopcock connected to the blood inlet circuit and for connection to a patient inlet circuit; a saline circuit for providing saline and connected to the 3-port, 2-position blood inlet stopcock; a hemofilter connected to the blood inlet circuit; a blood outlet circuit connected to the hemofilter; a blood pump for circulating through the blood inlet circuit, the hemofilter, and the blood outlet circuit; a waste circuit for waste removal; a 3-port, 2-position blood outlet stopcock connected to the blood outlet circuit and to the waste circuit and for connection to a patient outlet circuit; a first actuator for controlling the 3-port, 2-position blood inlet stopcock; a second actuator for controlling the 3-port, 2-position blood outlet stopcock; and a controller for controlling operation of at least the first actuator, the second actuator, and the blood pump.

An advantage of the artificial kidney is that the artificial kidney can be used while ambulating, sitting, and lying down. It is desirable to provide an artificial kidney that can be used away from a clinic, such as at home.

An advantage of the artificial kidney is that the artificial kidney can be used away from the clinic between standard dialysis clinic appointments.

Another example embodiment is a kit including components for assembling the artificial kidney.

Another example embodiment is a method for controlling an artificial kidney, the artificial kidney including a blood circuit, a hemofilter connected to the blood circuit, a blood pump for circulating through the blood circuit, a 3-port, 2-position blood inlet stopcock connected to the blood circuit, a 3-port, 2-position blood outlet stopcock connected to the blood circuit, a saline circuit for providing saline and connected to the 3-port, 2-position blood inlet stopcock, a waste circuit for waste removal and connected to the 3-port, 2-position blood outlet stopcock, the method comprising: controlling the 3-port, 2-position blood inlet stopcock; controlling the 3-port, 2-position blood outlet stopcock; and activating the blood pump.

Another example embodiment is a controller-implemented method for controlling an artificial kidney, the artificial kidney including a blood circuit, a hemofilter connected to the blood circuit, a blood pump for circulating through the blood circuit, the method comprising: detecting an alert event, and in response: outputting a timer, performing one or more steps to resolve the alert event, detecting that the alert event has been resolved by a set time, and activating or maintaining the activating of the blood pump.

Another example embodiment is a controller-implemented method for operating an artificial kidney, the artificial kidney including a blood circuit, a hemofilter connected to the blood circuit, a blood pump for circulating through the blood circuit, the method comprising: activating the blood pump; detecting an alert event, and in response: deactivating the blood pump, outputting a timer, perform one or more steps to resolve the alert event, detecting that a set time has ended without resolving of the alert event, and outputting a message that the operating of the artificial kidney has ended.

Another example embodiment is an artificial kidney, comprising: a blood circuit; a hemofilter connected to the blood circuit; a blood pump for circulating through the blood circuit; and a controller configured to perform the method or the controller-implemented according to any of the above.

Another example embodiment is a non-transitory computer-readable medium, including instructions that, when executed by a controller, causes the controller to control an artificial kidney, the instructions comprising instructions for performing the method or the controller-implemented method according to any of the above.

BRIEF DESCRIPTION OF THE DRAWINGS

Reference is now made, by way of example, to the accompanying drawings which show example embodiments, in which:

FIG. 11 illustrates a front view of a user interface device of the artificial kidney, in accordance with an example embodiment;

Similar reference numerals may be used in different figures to denote similar components.

DETAILED DESCRIPTION OF EXAMPLE EMBODIMENTS

Example embodiments relate to artificial kidneys, for example portable artificial kidneys (PAK) or wearable artificial kidneys (WAK). In an example, the artificial kidney is an ultrafiltration artificial kidney or a hemofiltration artificial kidney.

As per convention, reference to red means away from the heart (patient) and reference to blue means towards the heart (patient).

In some examples, the wearable artificial kidney is used to perform dialysis on a patient. A user of the artificial kidney can be the patient himself/herself, or can be a practitioner or caregiver who is assisting with operation of the artificial kidney on the patient.

In some examples, the artificial kidney can be configured to automatically or semi-automatically perform priming, procedure running, purging, flushing, and procedure ending. In an example, the artificial kidney can be configured to perform alert event detection, start a timer, and take steps to resolving the alert event. The steps can include automated steps and can include instructions to be manually performed by the user (or the patient). If the alert event is resolved within a set time, the artificial kidney can continue to perform procedure running. If the alert event is not resolved within the set time, the artificial kidney performs the procedure ending.

In some examples, the artificial kidney includes: a garment for supporting at least part of the artificial kidney; a blood inlet circuit; a 3-port, 2-position blood inlet stopcock connected to the blood inlet circuit and for connection to a patient inlet circuit; a saline circuit for providing saline and connected to the 3-port, 2-position blood inlet stopcock; a hemofilter connected to the blood inlet circuit; a blood outlet circuit connected to the hemofilter; a blood pump for circulating through the blood inlet circuit, the hemofilter, and the blood outlet circuit; a waste circuit for waste removal; a 3-port, 2-position blood outlet stopcock connected to the blood outlet circuit and to the waste circuit and for connection to a patient outlet circuit; a first actuator for controlling the 3-port, 2-position blood inlet stopcock; a second actuator for controlling the 3-port, 2-position blood outlet stopcock; and a controller for controlling operation of at least the first actuator, the second actuator, and the blood pump.

Figure 1:
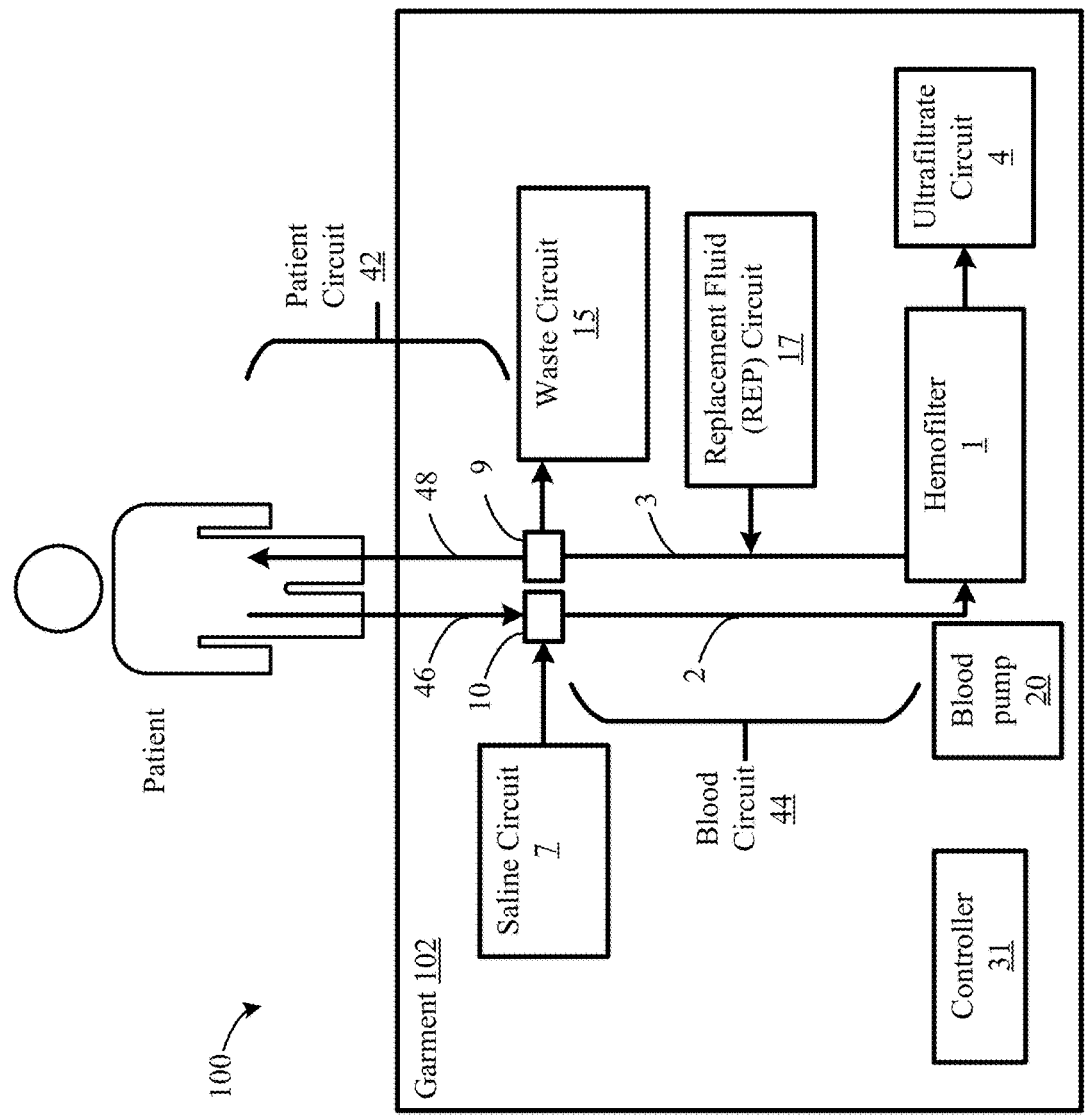
FIG. 1 illustrates a diagrammatic view of an artificial kidney, in accordance with an example embodiment.

FIG. 1 illustrates a diagrammatic view of an artificial kidney 100, in accordance with an example embodiment. Generally, the artificial kidney 100 includes a controller 31 that controls a blood pump 20, a blood inlet stopcock 10 and a blood outlet stopcock 9. The blood inlet stopcock 10 and a blood outlet stopcock 9 are used to route flow of the artificial kidney 100, in accordance with an example embodiment. The controller 31 can operate the blood pump 20, blood inlet stopcock 10, and the blood outlet stopcock 9 (and other components) to operate the artificial kidney 100 in various modes of operation. Example modes of operation include priming procedure, procedure running, purging procedure, flushing procedure, and procedure ending. In an example, the controller 31 can be configured to perform alert event detection, start a timer, and take steps to operate the blood pump 20, blood inlet stopcock 10, and the blood outlet stopcock 9 (and other components) to resolve the alert event. If the alert event is remedied within a set time, the controller 31 can then operate the blood pump 20, blood inlet stopcock 10, and the blood outlet stopcock 9 (and other components) to continue the procedure running of the artificial kidney 100. For example, when the alert event is remedied within the set time, the artificial kidney 100 does not need to removed from the patient and disassembled, and the entire dialysis procedure does not need to be restarted from the beginning. As well, disposables do not need to be replaced when the procedure running resumes. If the alert event is not remedied within the set time, the controller 31 can then end the dialysis procedure, e.g. operate the blood pump 20, blood inlet stopcock 10, and the blood outlet stopcock 9 (and other components) to perform the procedure ending of the artificial kidney 100. Then, the dialysis procedure may need to start over from the beginning, including re-performing the priming procedure, resetting the start time to perform the particular dialysis procedure, and possibly replacing any disposables.

In an example, the artificial kidney 100 includes a garment 102 for supporting at least part of the artificial kidney 100. For example, one or more medical devices (also called medical device modules) of the artificial kidney 100 are attached to or carried on the garment 102. In an example, the garment 102 supports all or substantially all of the medical devices of the artificial kidney 100. In an example, the garment 102 is a vest, illustrated in greater detail in FIG. 4A. In an example, the garment 102 is a cummerbund, illustrated in greater detail in FIG. 4B. The patient can wear the garment 102 with the artificial kidney 100 operating in procedure running while the patient is ambulating, doing tasks, lying down, sitting, standing, etc. As well, the purging procedure and flushing procedure can be formed in any patient orientation. Examples of the medical devices of the artificial kidney 100 include catheter, cannula, modules, user interface devices, sensors (detectors), pumps, filters, waste separation, and fluid circuits, such as tubing, connector, waste bag, blood clot filter, infusion ports. More or fewer medical devices may be used in some examples.

Figure 8C:
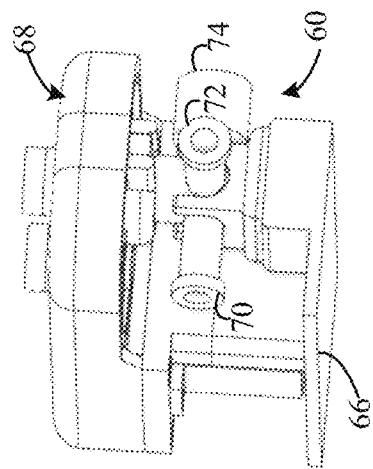
FIG. 8C illustrates an assembled perspective view of the stopcock and actuator of FIG. 8A.
Figure 8A:
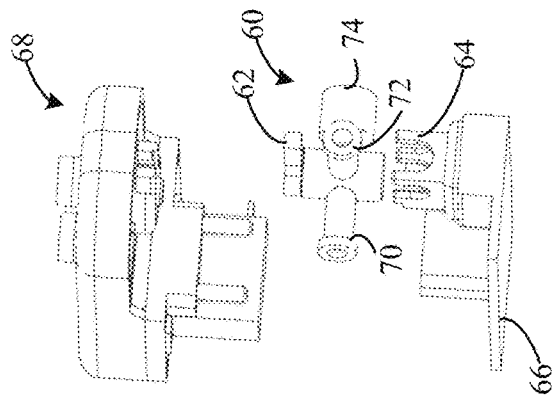
FIG. 8A illustrates an exploded perspective view of a stopcock and actuator for routing flow of the artificial kidney, in accordance with an example embodiment.
Figure 8B:
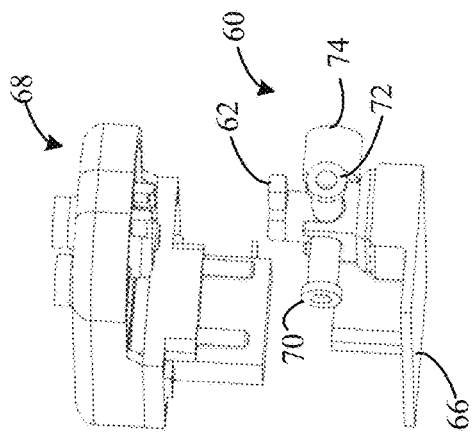
FIG. 8B illustrates a partially assembled perspective view of the stopcock and actuator of FIG. 8A.

In an example, the blood inlet stopcock 10 is a 3-port, 2-position stopcock (also known as red stopcock or 3-port, 2-position blood inlet stopcock). In an example, the blood outlet stopcock 9 is a 3-port, 2-position stopcock (also known as blue stopcock or 3-port, 2-position blood outlet stopcock). The blood inlet stopcock 10 and the blood outlet stopcock 9 are each controllable by the controller 31 to define a stopcock passage between two of the three ports. A detailed example of the blood inlet stopcock 10 and the blood outlet stopcock 9 are shown in FIGS. 8A, 8B and 8C.

In an example, the artificial kidney 100 includes a patient circuit 42, which includes a patient inlet circuit 46 and a patient outlet circuit 48. In an example, the artificial kidney 100 includes a saline circuit 7 for providing saline and connected to the blood inlet stopcock 10.

In an example, the artificial kidney 100 includes a blood circuit 44, which includes a blood inlet circuit 2 and a blood outlet circuit 3. The blood inlet circuit 2 is connected to the blood inlet stopcock 10.

A filter such as a hemofilter 1 is connected to the blood inlet circuit 2. In examples, the hemofilter 1 can include or be part of: a semi-permeable membrane, a hemoconcentrator, a hemodialyzer, a hemofiltration device, or a blood hemofilter. The hemofilter 1 includes a membrane 58 (FIGS. 2 and 3) that has a particular pore size. The blood outlet circuit 3 is connected to the hemofilter 1. The blood pump 20 is for circulating through the blood inlet circuit 2, the hemofilter 1, and the blood outlet circuit 3. As well, the blood pump 20 therefore circulates through the patient circuit 42. Accordingly, blood from the patient flows through the patient inlet circuit 46, the blood inlet stopcock 10, the blood inlet circuit 2, the hemofilter 1 (in which ultrafiltrate is filtered out from the blood), the blood outlet circuit 3, the blood outlet stopcock 9, the patient outlet circuit 48, and returns to the patient.

A waste circuit 15 is connected to the blood outlet stopcock 9. The blood outlet stopcock 9 is therefore connected to the blood outlet circuit 3, the patient outlet circuit 48, and a waste circuit 15. The waste circuit 15 is for waste removal from the blood outlet circuit 3. The waste can include blood, saline and air. The waste circuit 15 and the saline circuit 7 can be used for procedures of the artificial kidney 100 such as a priming procedure (PRIME), a purging procedure (PURGE), and a flushing procedure (FLUSH). Generally, the waste circuit 15 and the saline circuit 7 are not used during procedure running of the artificial kidney 100.

When the blood inlet stopcock 10 is in a position that defines a passage between the saline circuit 7 and the blood inlet circuit 2, the position of the blood inlet stopcock 10 can be denoted as PRIME or PURGE or first position (the passage can be denoted first blood inlet stopcock passage). When the blood inlet stopcock 10 is in a position that defines a passage between the patient inlet circuit 46 and the blood inlet circuit 2, the position of the blood inlet stopcock 10 can be denoted as RUN or RUNNING or second position (the passage can be denoted second blood inlet stopcock passage).

When the blood outlet stopcock 9 is in a position that defines a passage between the blood outlet circuit 3 and the waste circuit 15, the position of the blood outlet stopcock 9 can be denoted as PURGE or first position (the passage can be denoted first blood outlet stopcock passage). When the blood outlet stopcock 9 is in a position that defines a passage between the patient outlet circuit 48 and the blood outlet circuit 3, the position of the blood outlet stopcock 9 can be denoted as RUN or RUNNING or second position (the passage can be denoted second blood outlet stopcock passage).

In an example, the blood pump 20 is a peristaltic pump. The peristaltic pump in example embodiments include a peristaltic pump head attached to a gear motor (not shown), and flow of the peristaltic pump is controlled by a combination of pump speed and internal diameter of the tubing inside the pump head. In an example, the blood pump 20 is a clamp-on pump which is installed by clamping the blood pump 20 to the tubing of the blood inlet circuit 2. Therefore, in an example, the blood pump 20 does not need to be installed in-line to the blood inlet circuit 2. The clamp-on pump is hygienic and does not contact the blood of the patient. In an example, the blood pump 20 is controllable by the controller 31 to operate at constant flow rate from 5 mL/minute (min) to 250 mL/min. In an example, the blood pump 20 is controllable by the controller 31 to operate at constant flow rate of on or about 50 mL/min. In an example, the blood pump 20 is a peristaltic pump. In an example, the blood pump 20 is both a clamp-on pump and a peristaltic pump.

In some examples, reference to circuit means one or more components in which fluid, blood or air can flow, such as tubing, and other parts such as controllers, connectors, disposables, non-disposables, bags, pumps, sensors, holders, clamps, etc. In some examples, the tubing can be flexible or rigid. In some examples, the circuit does not include tubing. In some examples, the circuit can be closed loop or can be open loop.

The controller 31 can be a microcontroller, processor, microprocessor, central processing unit (CPU), programmable logic controller (PLC), mobile device (e.g., phone or tablet computer), etc. The controller 31 can include one or more controllers. In an example, the artificial kidney 100 includes a non-transitory computer-readable medium that stores instructions that, when executed by the controller 31, causes the controller 31 to control the artificial kidney. In an example, the controller 31 has wired connection to one or more of the medical devices. In other examples, the controller 31 is configured with wireless communication with one or more of the medical devices.

In an example, the artificial kidney 100 does not replace other natural kidney functions such as stimulation of red blood cell production, blood pressure regulation and bone mineral metabolism.

Figure 2:
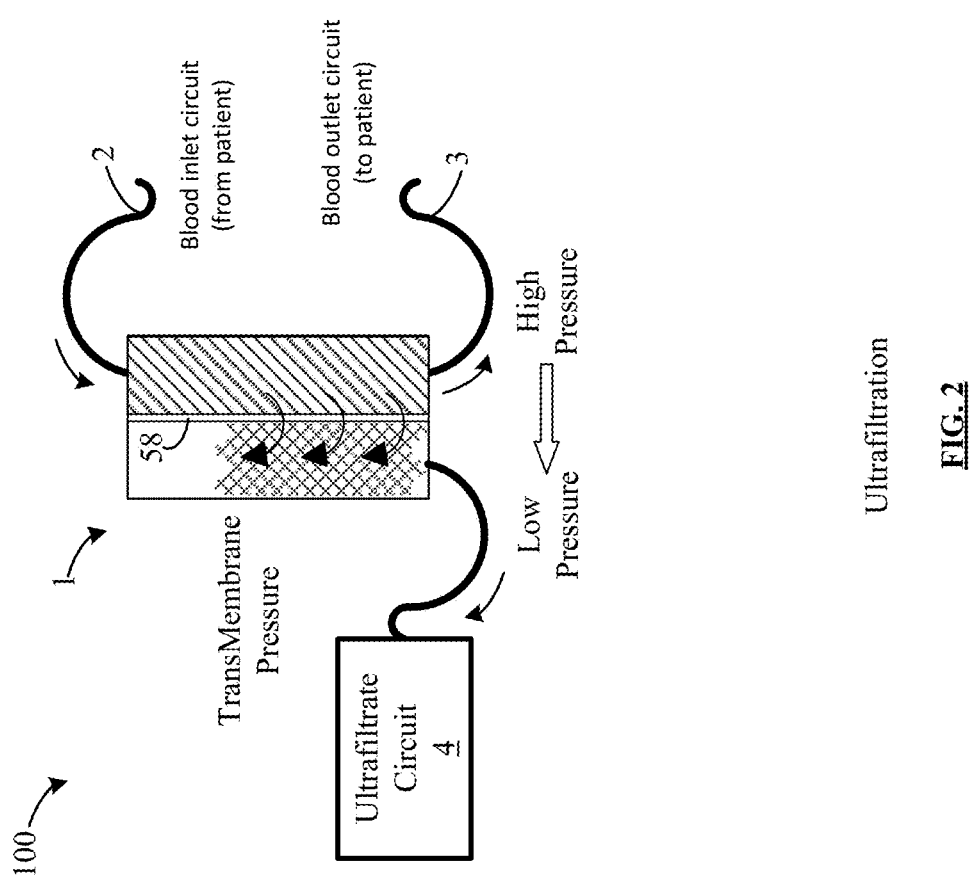
FIG. 2 illustrates a diagrammatic view of the artificial kidney embodied as an ultrafiltration artificial kidney, in accordance with an example embodiment.

FIG. 2 illustrates a diagrammatic view of the artificial kidney 100 embodied as an ultrafiltration artificial kidney, in accordance with an example embodiment. The hemofilter 1 relies on the pressure of the blood from the blood inlet circuit 2, caused by the blood pump 20 and the natural pressure from the patient. The hemofilter 1 filters out ultrafiltrate from the blood from the blood inlet circuit 2. An ultrafiltrate circuit 4 is connected to the hemofilter 1 for removal of the ultrafiltrate that was filtered out by the hemofilter 1 from the blood of the patient. In an example, for the ultrafiltration artificial kidney, fluids are not replenished in the patient during procedure running, nor is fluid introduced in the blood inlet circuit 2 during procedure running.

The ultrafiltration artificial kidney performs ultrafiltration, which is the movement of water across the membrane 58 (which is a semi-permeable membrane 58 having hollow fibers), because of a pressure gradient (hydrostatic, osmotic or oncotic). The semi-permeable membrane 58 can be cylindrical tubular, defining an inner chamber and an exterior. Pressure within the inner chamber of the hollow fibers is positive, while the pressure exterior the hollow fibers is lower. Increased negativity can be generated exterior the hollow fibers by using an ultrafiltrate pump 23 (FIG. 6) to increase the fluid removal rate. The difference between the pressure inside the hollow fibers and outside is the Trans-Membrane Pressure (TMP). The TMP determines the rate of ultrafiltration (ultrafiltration rate). In an example, the semi-permeable membrane 58 is cylindrical and the blood through the interior of the cylindrical semi-permeable membrane 58.

For the hemofilter 1, different filter membrane properties can produce different ultrafiltration rates at a constant TMP. A filter membrane 58 that is more permeable to water will allow more water to travel across the membrane 58 at a given TMP. A filter membrane 58 with a high permeability to water is called a high flux filter.

In an example, the ultrafiltration artificial kidney performs slow continuous ultrafiltration (SCUF), and can be denoted slow continuous ultrafiltration wearable artificial kidney (SCUF-WAK). In an example, SCUF is a Continuous Renal Replacement Therapy (CRRT) generally used to remove fluid from overloaded patients suffering acute kidney failure. CRRT are dialysis treatments can provide continuous prolonged therapy (e.g., up to 24 hour per day). In an example, slow can mean the blood pump 20 is on or about 50 mL/min, or below 200 mL/min. In some examples, the SCUF-WAK uses SCUF on top of (as a supplement to) standard intermittent hemodialysis therapy in order to assist with uremic toxin removal and provide a more constant state with respect to both patient biochemistry and fluid-volume control.

Figure 3:
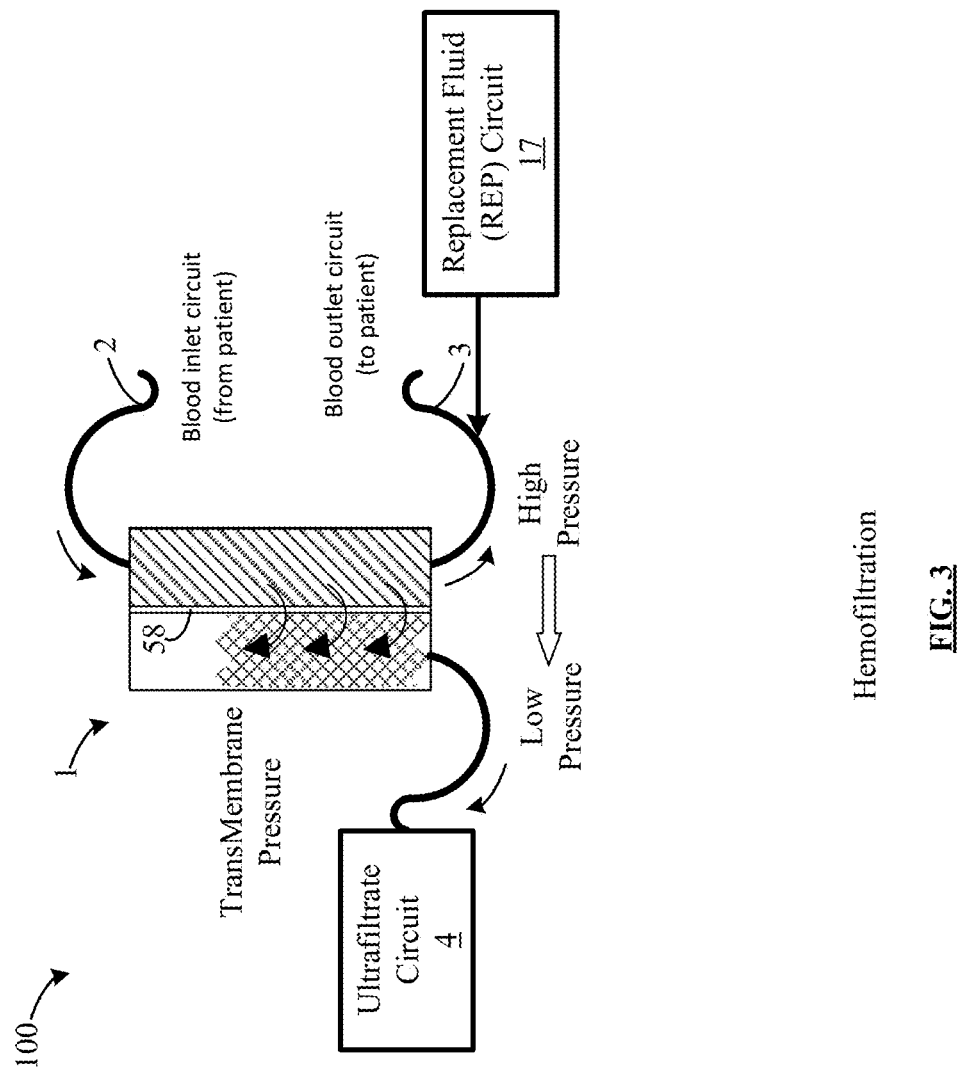
FIG. 3 illustrates a diagrammatic view of the artificial kidney embodied as a hemofiltration artificial kidney, in accordance with an example embodiment.

FIG. 3 illustrates a diagrammatic view of the artificial kidney 100 embodied as a hemofiltration artificial kidney, in accordance with an example embodiment. The hemofiltration artificial kidney includes the same ultrafiltrate circuit 4 as shown in FIG. 2. The ultrafiltrate circuit 4 is connected to the hemofilter 1 for removal of the ultrafiltrate that was filtered out by the hemofilter 1 from the blood of the patient. In an example, the semi-permeable membrane 58 of the hemofilter 1 is cylindrical and the blood through the interior of the cylindrical semi-permeable membrane 58.

The difference to the ultrafiltration artificial kidney is that the hemofiltration artificial kidney also includes a replacement fluid circuit 17 (replacement fluid can also be denoted as REP). The replacement fluid circuit 17 is connected to the blood outlet circuit 3 for providing replacement fluid to the blood outlet circuit 3. The replacement fluid from the replacement fluid circuit 17 is therefore provided to the patient during procedure running, through the blood outlet circuit 3 and to the patient outlet circuit 48.

In an example of the hemofiltration artificial kidney, the hemofilter 1 pulls volumes of water across the semi-permeable membrane 58 creates a convective current that "drags" solutes from blood, called the convective solute clearance. The rate of convective clearance is directly related to the ultrafiltration rate. While diffusion is more effective at removing small molecules than convection the latter enhances the removal of mid-sized and larger molecules. Thus, convection added to the diffusion of artificial kidney dialysis will enhance total solute removal. The ultrafiltration artificial kidney and the hemofiltration artificial kidney do not employ diffusion. The hemofiltration artificial kidney increases solute removal as compared to the ultrafiltration artificial kidney by increasing the ultrafiltration rate. To prevent hypovolemia, the volume of fluid (water) removed during hemofiltration is returned to the blood before the blood reaches the patient. Replenishing the removed water is achieved by the replacement fluid circuit 17 providing replacement fluid to the patient. In an example, the replacement fluid is a physiological solution approved for intravenous administration. The relative rates of ultrafiltration and replacement fluid infusion can be adjusted according to the patient's fluid volume status and need for fluid removal or replacement. An ultrafiltration rate of 1 L/hr means 1 L/hr of fluid is removed from the patient's blood and eliminated; if 1 L/hr of replacement fluid is returned to the blood circuit a net neutral fluid balance for the patient is achieved. With a fluid volume overloaded patient an ultrafiltration rate of 1 L/hr and a replacement fluid rate of 800 mL/hr will mean a 200 mL/hr removal of the excess fluid.

In some examples, the replacement fluid is infused into the blood circuit 44 post—the hemofilter 1.

In an example, the hemofiltration artificial kidney can be used as an adjunct (not replacement) to dialysis for treating the symptoms of kidney failure. Current evidence suggests that both volume overload (prior to a dialysis treatment) and aggressive fluid removal (during dialysis) can induce circulatory stress and multi organ injury. More frequent dialysis treatments at lower flow rates result in better outcomes.

In an example, the hemofiltration artificial kidney performs slow continuous ultrafiltration with hemofiltration and can be denoted hemofiltration wearable artificial kidney (also known as HF-WAK or HeF-WAK).

Figure 4B:
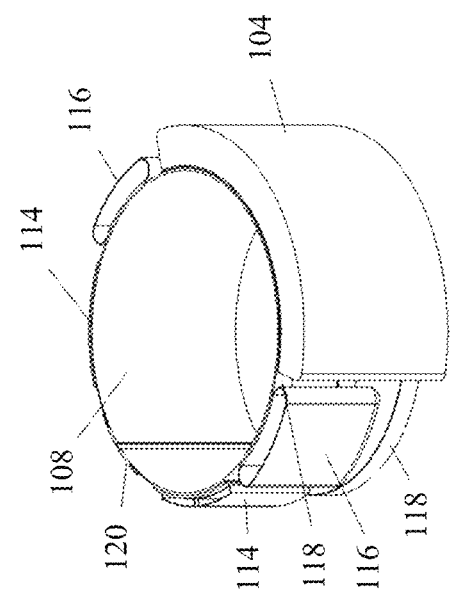
FIG. 4B illustrates a front perspective view of a garment embodied as a cummerbund for wearing the artificial kidney, in an example embodiment.
Figure 4A:
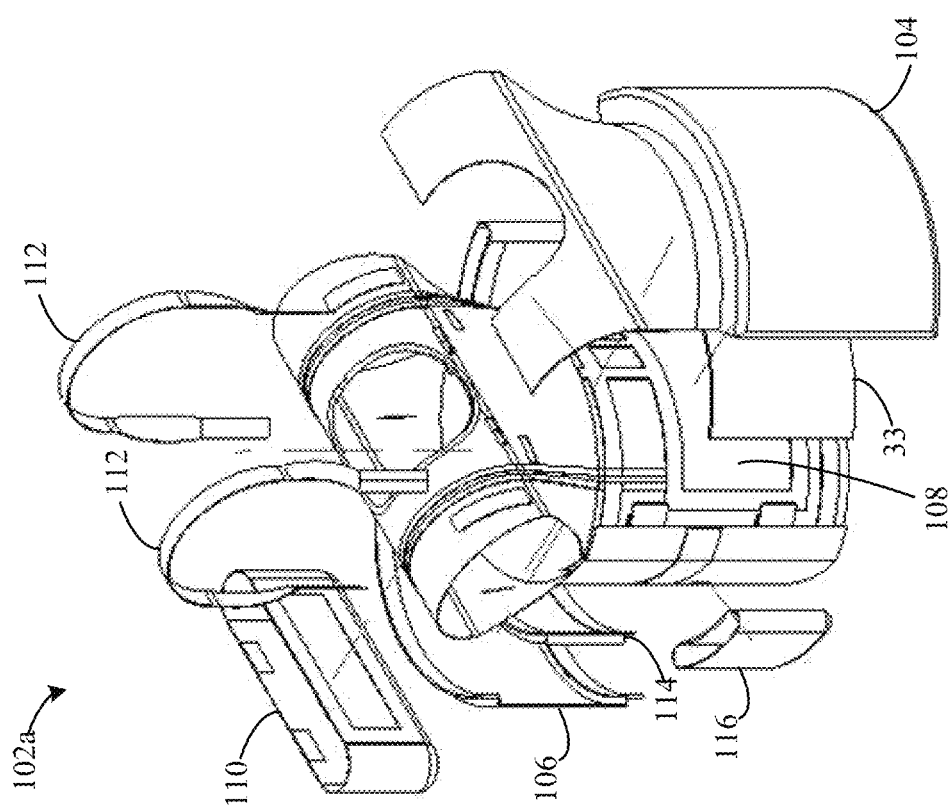
FIG. 4A illustrates a front perspective view of a garment embodied as a vest for wearing the artificial kidney, in an example embodiment.

FIG. 4A illustrates a front exploded perspective view of the garment 102a embodied as a vest for wearing the artificial kidney 100, in an example embodiment of the garment 102. The vest is worn around the shoulders and body of the patient. The garment 102a is used to carry or attach one or more medical devices of the artificial kidney 100. In an example, the garment 102 includes a front cover 104 and a back cover 106 for protecting the artificial kidney 100. In an example, the garment 102a includes an inner core layer 108 which is worn by the patient. The inner core layer 108 may be formed from fabric, polyester, cotton, nylon, etc. A mounting panel 33 is used to mount one or more of the medical devices. The mounting panel 33 is removably attachable to the inner core layer 108. One or more of the medical devices are fixedly attached, or in other examples are removably attachable, to the mounting panel 33. In an example, the mounting panel 33 is formed of plastic, thermoplastic or rubber. In an example, the mounting panel 33 is formed to conform to the shape of the waist of the patient.

Figure 6:
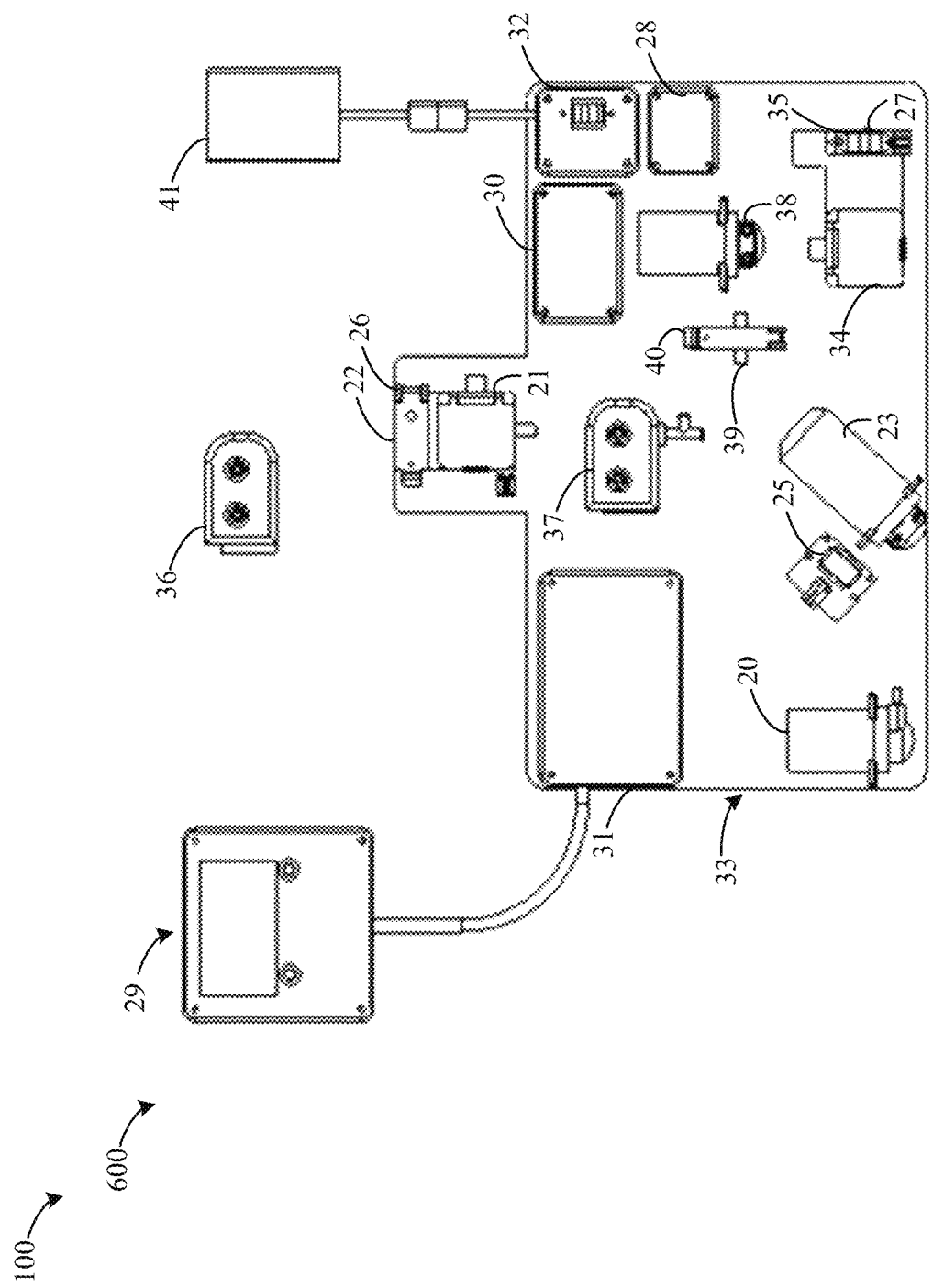
FIG. 6 illustrates a front view of non-disposable components of the artificial kidney.

The battery pack 114 includes at least one battery 41 (FIG. 6, not shown here). Wiring (not shown) connects the battery 41 to the controller 31 and one or more of the medical devices. The wiring can be positioned over-the-shoulder of the garment 102a. The wiring cover 112 covers the wiring. In other example, a power source carried in the battery pack 114 can be electrical, pneumatic, fuel cell, radioactive, thermal radiation, solar, etc.

At least one pocket 116 (one shown) is removably attachable to the inner core layer 108. In an example, the pocket 116 is relocatable to different parts of the inner core layer 108. The pocket 116 can be used to hold bags or other medical devices. A pouch 110 is removably attachable to the back cover 106. The pouch 110 can be used to hold bags or other medical devices.

In an example, the mounting panel 33 is attached to the inner core layer 108 using attachment strips having hook and loop fasteners, such as Velcro®. Alternately, the attachment strips may be snap-on buttons, a zipper, larger garment hooks or another suitable fastener. Hook and loop fasteners include a first counterpart, being a strip or material that includes one of the hook or loop, and a second counterpart, being a strip or material that includes the other of the hoop or loop. A strip or material of felt or fabric can be the loop (first counterpart or second counterpart). In an example, one or more of the medical devices are mounted to the mounting panel 33 using hook and loop fasteners, such as Velcro®. For example, the mounting panel 33 can be formed of the loops (e.g., felt), and a base of each of the medical devices can have a strip containing the hooks, or vice-versa.

The artificial kidney 100 is broken down into modular component parts, while still operative together to perform the procedure running of the dialysis and other procedures on the patient. Such a modular configuration can be distributed over a larger area, making the artificial kidney 100 flatter and easier to conceal and allows the patient to walk, sit, lie down, etc. The use of resilient but bendable material for the mounting panel 33 helps to stabilize the position of the medical devices during ambulation activities by the patient.

FIG. 4B illustrates a front perspective view of the garment 102b embodied as a cummerbund for wearing the artificial kidney 100, in an example embodiment of the garment 102. The cummerbund is worn around the waist of the patient.

The garment 102b is used to carry or attach one or more medical devices of the artificial kidney 100. In an example, the garment 102b includes a front cover 104. In an example, the garment 102b includes an inner core layer 108 which is worn around the waist of the patient. A mounting panel 33 (not shown here) is used to mount one or more of the medical devices. The mounting panel 33 is removably attachable to the inner core layer 108. One or more of the medical devices are removably attachable to the mounting panel 33. The battery pack 114 is used to hold at least one battery 41 (not shown here). At least one pocket 116 (two shown) is removably attachable to the inner core layer 108. In an example, the pocket 116 is relocatable to different parts of the inner core layer 108. The pocket 116 can be used to hold bags or other medical devices. The pocket 116 may be used to hold or store various items, such as a remote control or a mobile phone.

Inner core layer 108 also has a pair of attachment strips 118 lining the outside edges of the inner core layer 108. The attachment strips 118 can be a counterpart of a hook and loop fastener. An elasticized fastener 120 is used to adjust the circumference of the cummerbund, for fitting around the patient.

Figure 5:
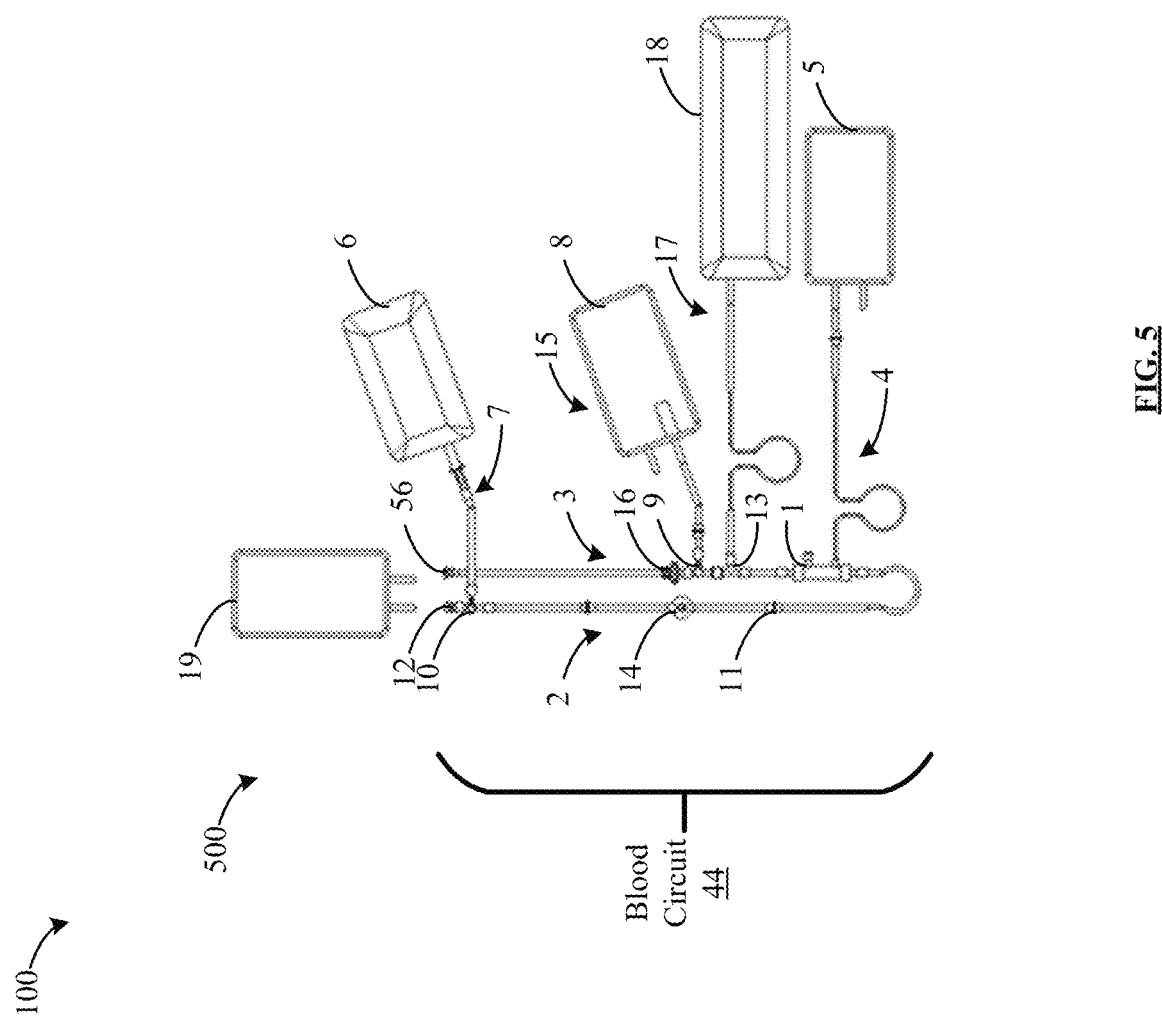
FIG. 5 illustrates a front view of disposables of the artificial kidney.
Figure 7:
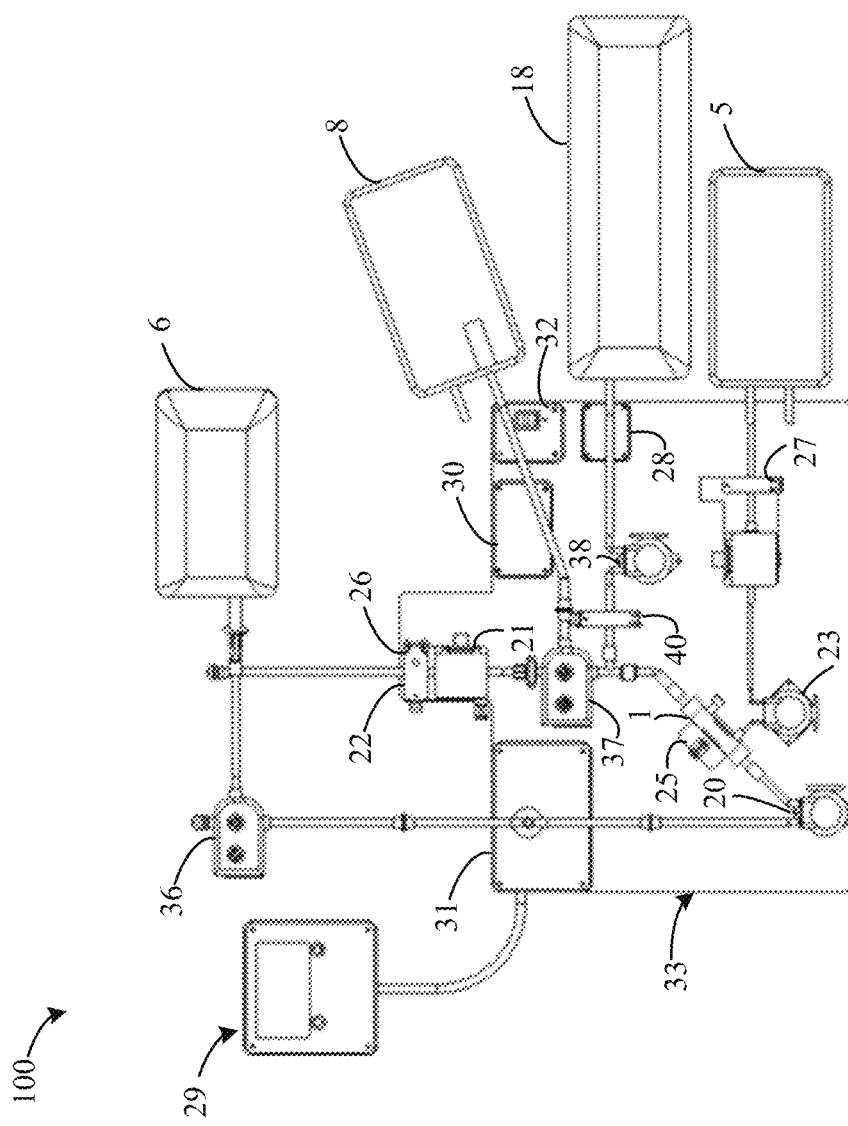
FIG. 7 illustrates a front view of the disposables and the non-disposable components of the artificial kidney.

FIG. 5 illustrates the disposables 500 of the artificial kidney 100. FIG. 6 illustrates non-disposable components 600 of the artificial kidney 100. FIG. 7 illustrates both the disposables 500 (FIG. 5) and the non-disposable components 600 (FIG. 6), assembled together to form the artificial kidney 100.

FIG. 5 illustrates a diagrammatic view of the disposables 500 of the artificial kidney 100. For example, the disposables 500 can include medical devices which contact the blood of the patient, or other fluids or contaminants. In an example, at least some of the disposables 500 are supported or attached to the garment 102 (FIGS. 4A and 4B). In some examples, tubing is clamped to the mounting panel 33 of the garment 102. In an example, as shown in FIG. 5, the disposals include the hemofilter 1, the blood inlet circuit 2, the blood outlet circuit 3, the ultrafiltrate circuit 4, ultrafiltrate bag 5, saline bag 6, saline circuit 7, waste bag 8, the blood outlet stopcock 9, blood inlet stopcock 10, collar 11 on the tubing of the blood inlet circuit 2, inlet insert-to-open valve connector 12, outlet insert-to-open valve connector 56, TEE fitting 13, injection port 14, the waste circuit 15, blood clot filter 16, the replacement fluid circuit 17, replacement fluid bag 18, and the prime collection bag 19. In examples, all blood contacting components are blood biocompatible and/or medical grade materials.

Disposables not shown include the patient inlet circuit 46 and the patient outlet circuit 48, each of which can include a respective inlet cannula and outlet cannula in an example. The inlet cannula and the outlet cannula can be inserted into a blood vessel of the patient. In some examples, there are more or few of the illustrated disposables 500 for the artificial kidney 100. In some examples, not all of the disposables 500 are shown in FIG. 5. In some examples, the injection port 14 is optional or is connected to a different part of the artificial kidney 100, such as the blood outlet circuit 3 or the saline circuit 7.

In an example, the hemofilter 1 separates the ultrafiltrate from whole blood received from the blood inlet circuit 2. The flow of ultrafiltrate is determined by the pore cut-off and total pore area. In an example of the hemofilter 1, the pore cut-off is on or about 50 kDa. In another example of the hemofilter 1, the pore cut-off is on or about 15 kDa.

Examples of biomarker solutes that can be removed by the hemofilter 1 during ultrafiltration or hemofiltration by size in kilo-Daltons (kDa) include: Sodium (0.023); Phosphorus (0.031); Potassium (0.035); Urea (0.06); Phosphate (0.8); Creatine (0.11); Uric acid (0.17); Glucose (0.18); Aluminum/Desferoxamine Complex (0.7); Vitamin B12 (1.4); Inulin (5.2); Beta2 Microglobulin (11.8). Other biomarker solutes can be removed depending on the pore size of the hemofilter 1, such as Albumin (55-60).

In an example, the saline bag 6 contains saline and, in some examples, contains other substances (e.g. electrolytes).

The inlet insert-to-open valve connector 12 and the outlet insert-to-open valve connector 56 each include a housing (not shown) with a separate normally closed bi-leaflet (duckbill) valves at both ends of the housing that open when a male threaded connector is inserted.

The injection port 14 includes a housing with a self-closing port to allow the insertion and withdraw of needles, for the infusion of substances (e.g. anti-coagulant) into the blood circuit 44, for example the blood inlet circuit 2 (as shown) or the blood outlet circuit 3.

In an example, the blood clot filter 16 includes a housing with a 10 μm to 100 μm porous mesh filter insert that prevents the passage of blood clots to or through the patient outlet circuit 48, therefore preventing blood clots from entering the patient. In other examples, the porous mesh filter insert ranges from 10 μm to 50 μm. Alternatively, a blood clot detector (e.g., ultrasound or electromagnetic technology) can be inserted in place of blood clot filter 16, with the capability to detect blood clots from a size of 10 μm to 100 μm that activates an autonomous flush procedure or mode (FLUSH) of the blood circuit 44 using saline. The FLUSH mode can be used to clear a fouled or clogged hemofilter 1.

In an example, the replacement fluid bag 18 is a bag which contains a patient-specific formulation comprised of sterile water, electrolytes and other substances.

Figure 12A:
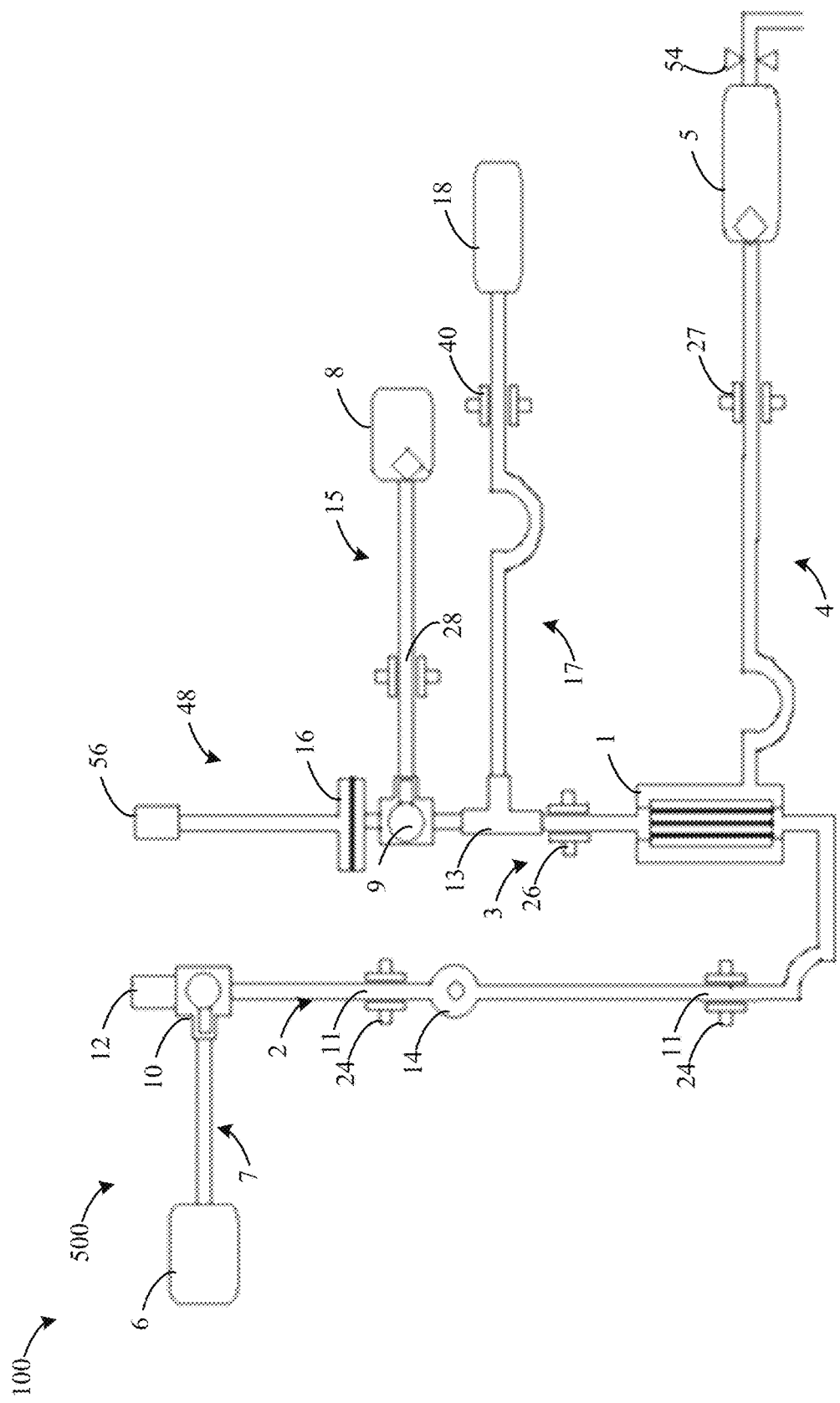
FIG. 12A illustrates a diagrammatic view of the disposables of the artificial kidney, in accordance with an example embodiment.

FIG. 12A illustrates a diagrammatic view of the disposables 500 of the artificial kidney 100, in accordance with an example embodiment. Some non-disposable components 600 are also shown in FIG. 12A, for clarity.

Figure 12B:
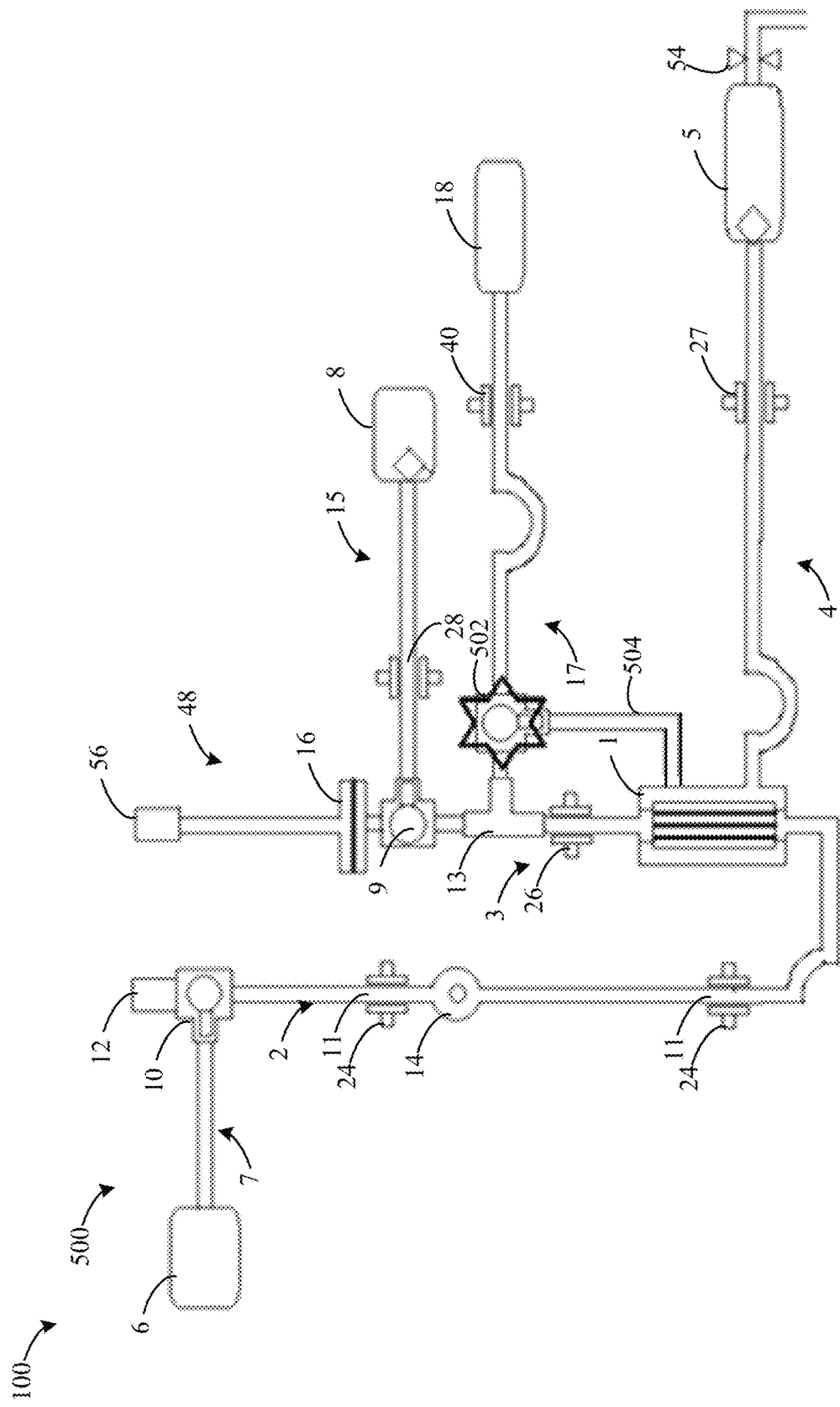
FIG. 12B illustrates a diagrammatic view of an alternate example embodiment the disposables of the artificial kidney.

FIG. 12B illustrates a diagrammatic view of an alternate example embodiment of the disposables 500 of the artificial kidney 100. In the example of FIG. 12B, the artificial kidney 100 further includes a backwash stopcock 502 and a backwash circuit 504, which are used for performing a flushing (FLUSH) procedure or mode of the artificial kidney 100, specifically the hemofilter 1. The FLUSH can be performed while the artificial kidney 100 is connected to the patient, for example the RUNNING is temporarily stopped (while still connected to the patient), the FLUSH is performed, and the RUNNING resumes performing dialysis on the patient. The remaining parts are the same or similar to those in FIG. 12A.

FIG. 6 illustrates a front view of non-disposable components 600 of the artificial kidney 100. In an example, one or more of the non-disposal components 600 are electronic components that interact with the controller 31. In an example, the non-disposal components 600 do not directly contact the blood of the patient, and can therefore be reused for more than one dialysis procedure (procedure running) for the patient. In an example, at least some of the non-disposable components 600 are supported or attached to the garment 102 (FIGS. 4A and 4B). In some examples, at least some of the non-disposable components 600 are attached to the mounting panel 33 of the garment 102, and the mounting panel 33 is removably attached to the inner core layer 108. In some examples, at least some of the non-disposable components 600 are clamp-on to the tubing of the artificial kidney 100 so as not to directly interact with blood or fluids.

In an example, as shown in FIG. 6, the non-disposal components 600 include blood pump 20, blood flow sensor 21, air detector 22, ultrafiltrate pump 23, hemofilter holder 25, holder 26 (e.g. strain relief latch lid), holder 27 (e.g. strain relief latch lid), blood detector 35 (to detect blood leakage in the ultrafiltrate circuit 4), user interface device 29, voltage regulator 30, controller 31, ON/OFF switch 32, ultrafiltrate flow sensor 34, first actuator 36 (for controlling the blood inlet stopcock 10), second actuator 37 (for controlling the blood outlet stopcock 9), replacement fluid pump 38, replacement fluid flow sensor 39, holder 40 (e.g. strain relief latch lid), battery 41. A waste pump (not shown here) can be used to circulate through the waste circuit 15 to the waste bag 8. Another blood detector (not shown here) can be used to detect blood leakage in the waste circuit 15. In some examples, the first actuator 36 and the second actuator 37 can each include a servo motor or a servo-positioner. In some examples, there are more or few of the illustrated non-disposable components 600 for the artificial kidney 100. In some examples, not all of the non-disposable components 600 are shown in FIG. 6. Some non-disposable components 600 not shown include an inlet manual clamp 50, an outlet manual clamp 52, and an ultrafiltrate manual clamp 54, which can each be a pinch clamp for manual pinching of respective tubing by the user.

In an example, the air detector 22 detects air bubbles in the blood of the patient outlet circuit 48. The air detector 22 is clamp-on in an example. In an example, the air detector 22 can be in other positions, or more air detectors can be used in the artificial kidney 100. In an example, the air detector 22 detects air bubbles as small as 1 mm, and in response sends a signal to the controller 31 which triggers an alert event. When an air alert event is activated by the controller 31, the air in the blood circuit 44 (and the patient outlet circuit 48) can be purged using a purge procedure (PURGE) with saline from the saline bag 6 into the waste bag 8. Note that the PURGE can be accomplished when the blood circuit 44 is in any orientation. For conventional hemodialysis devices and other types of wearable artificial kidneys, the air trap is typically required to be in the vertical orientation. The purge procedure is described in greater detail in relation to FIG. 17A. When the purge procedure is performed successfully by the controller 31 within a set time (e.g. 3 minutes), the controller 31 can proceed to procedure running of the artificial kidney 100 without requiring a full reset from the beginning of the dialysis procedure. In some examples, in response to the air flow sensor 34 detecting no flow due to suspected air in the UF circuit (4) during RUNNING, a flush procedure (FLUSH) is performed though the ultrafiltrate circuit 4, by first temporarily suspending running while the artificial kidney 100 is connected to the patient. The FLUSH procedure is described in greater detail in relation to FIG. 17B.

The ultrafiltrate flow sensor 34 is used to detect flow in the ultrafiltrate circuit 4. The ultrafiltrate flow sensor 34 is clamp-on in some examples. The ultrafiltrate flow sensor 34 detects abnormal low or high blood flow as well as no flow and triggers an alert event by sending a signal to the controller. Alternatively, the ultrafiltrate flow sensor 34 sends flow data to the controller 31 and the controller 31 detects (triggers) the alert event. In an example, an ultrafiltrate air detector (not shown) detects whether air has entered the ultrafiltrate circuit 4. When air enters the ultrafiltrate circuit 4, the controller 31 can trigger an alert event (alarm) or ignore. Although air in the ultrafiltrate circuit 4 is not a safety concern, the air may be an indicator that a connection is leaking air, that the hemofilter 1 is fouled or that the negative pressure in the ultrafiltrate circuit 4 (denoted Puf) has caused reversed air dissolution causing the appearance of air bubbles and air bubble coalescence. For longer RUN times (e.g. 2 hours or more at 2 mL/min or more), the ultrafiltrate circuit 4 may increase in negative Puf, causing bubbles to appear. The reduced or no flow in the UF circuit air nullifies the efficacy of slow continuous ultrafiltration (SCUF). In an example, if/when an alert is activated the FLUSH is autonomously performed or the procedure ends if the no UF flow persists. Two example ways for a FLUSH include: the first way is an interior rinse of the blood circuit 44 (including hemofilter 1) and ultrafiltrate circuit 4, which is a forward FLUSH; the second way is a backwash of the hemofilter 1 using replacement fluid, which is a backwash FLUSH.

The blood detector 35 is used to detect when blood is leaking into the ultrafiltrate circuit 4, and sends a signal to the controller 31 in response. In an example, the blood detector 35 is clamp-on. The cause of blood in the ultrafiltrate circuit 4 is typically a failure of the hemofilter 1.

The replacement fluid flow sensor 39 is used to detect the flow in the replacement fluid circuit 17. In an example, the replacement fluid flow sensor 39 is clamp-on. The replacement fluid flow sensor 39 is configured to detect abnormal low or high blood flow as well as no flow and triggers an alert event by sending a signal to the controller. In another examples, the replacement fluid flow sensor 39 sends flow data to the controller 31 and the controller 31 triggers the alert event.

A replacement fluid air detector (not shown) can be used to detect air in the replacement fluid circuit 17. The replacement fluid air detector can be similar to the air detector 22 for the patient outlet circuit 48, described herein. When an air alert event in the replacement fluid circuit 17 is activated, the air in the replacement fluid circuit 17 can be purged using a purge procedure (PURGE) with solution from the replacement fluid bag 18 into the waste bag 8. Note that the PURGE can be accomplished when the blood circuit 44 is in any orientation, e.g., the patient is ambulating, standing, sitting or lying down.

FIG. 7 illustrates a front view of the artificial kidney 100 (without the front cover 104), including both the disposables 500 (FIG. 5) and the non-disposable components 600 (FIG. 6), assembled together to form the artificial kidney 100. For FIGS. 1 and 7, details of the saline circuit 7, the ultrafiltrate circuit 4, the replacement fluid circuit 17, and the waste circuit 15 are now described in greater detail, referring now to FIG. 14.

Figure 14:
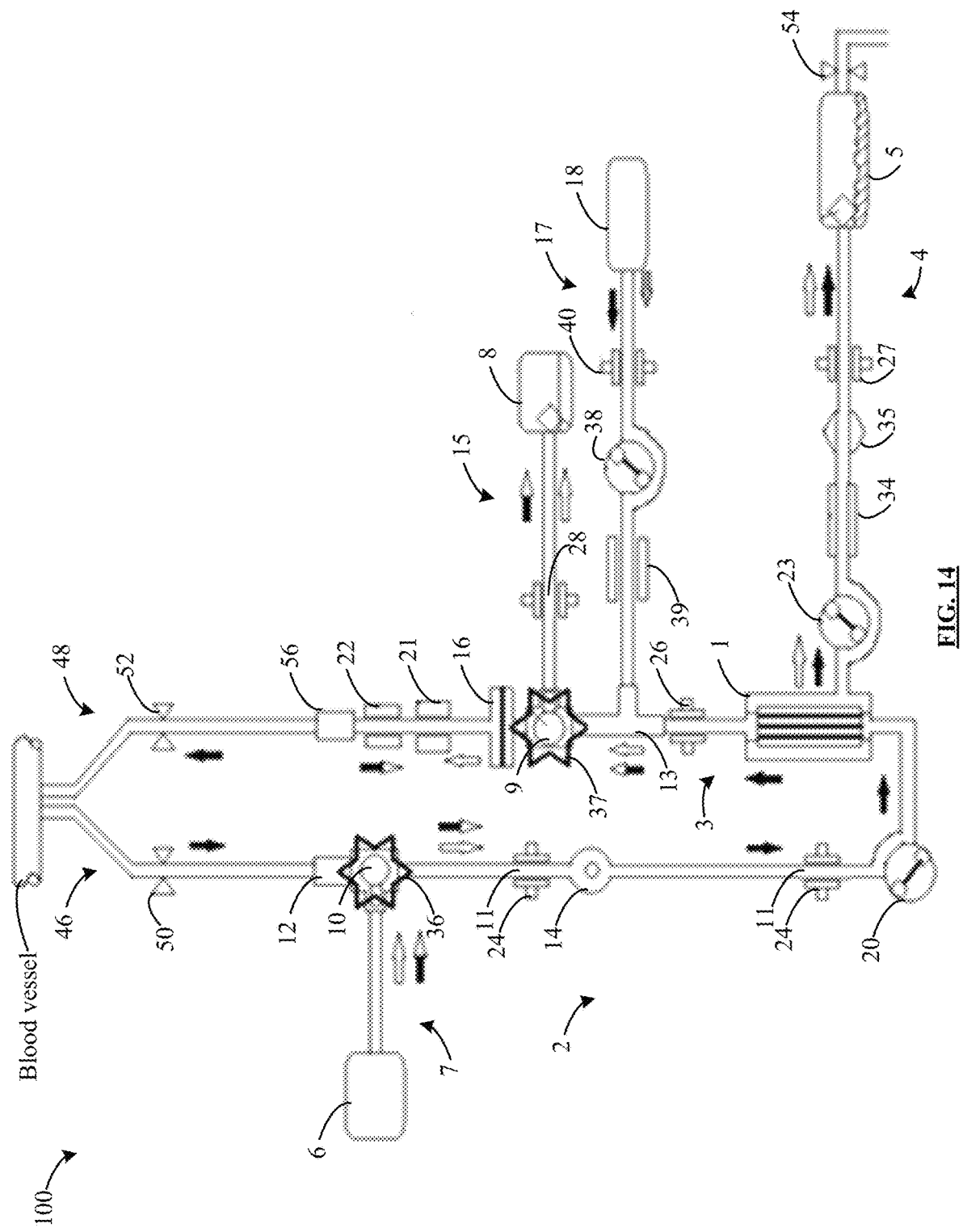
FIG. 14 illustrates a detailed diagrammatic view of the artificial kidney, in accordance with an example embodiment.

Referring to FIG. 14, in an example, the saline circuit 7 is used for priming procedures, purging procedures, and other procedures of the artificial kidney 100. In some examples, the saline circuit 7 is not used for procedure running of the artificial kidney 100, and is not used to introduce pre-membrane pressure to the hemofilter 1. The saline circuit 7 is connected to the blood inlet stopcock 10 to provide saline to the blood inlet stopcock 10, and therefore can provide saline to the blood inlet circuit 2 (and the entire blood circuit 44). In an example, the saline circuit 7 includes the saline bag 6 and saline tubing. In some examples, a holder 24 (not shown here) is used to removably attach the saline tubing to the garment 102 and to provide strain relief.

In an example, the ultrafiltrate circuit 4 includes the ultrafiltrate pump 23 for circulating through the ultrafiltrate circuit 4, the ultrafiltrate flow sensor 34, the ultrafiltrate bag 5 for storage of the ultrafiltrate, the blood detector 35 for detecting blood leakage in the ultrafiltrate circuit 4. The ultrafiltrate flow sensor 34 is for detecting flow through the ultrafiltrate circuit 4, for detecting a connection leaking air or that the hemofilter 1 is fouled or plugged The ultrafiltrate circuit 4 also includes an ultrafiltrate manual clamp 54 for manually controlling draining of the ultrafiltrate bag 5. The ultrafiltrate circuit 4 includes ultrafiltrate tubing. The ultrafiltrate circuit 4 includes the holder 27 for removably securing the ultrafiltrate tubing to the garment 102 and to provide strain relief.

In an example, the ultrafiltrate flow sensor 34 is a clamp-on flow sensor. In an example, the ultrafiltrate bag 5 includes an anti-backflow valve or preventer (not shown) integrated in the ultrafiltrate bag 5. In an example, the ultrafiltrate pump 23 is a peristaltic pump. In an example, the ultrafiltrate pump 23 is a clamp-on pump which is installed by clamping the ultrafiltrate pump 23 to the ultrafiltrate circuit 4. In an example, the ultrafiltrate pump 23 is controllable by the controller 31 to operate at constant flow rate from 1 mL/min to 20 mL/min. In an example, the ultrafiltrate pump 23 is controllable by the controller 31 to operate at constant flow rate increments from 1 to 20 mL/min. In an example, the user can select the constant flow rate using the user interface device 29.

In an example, the replacement fluid circuit 17 is connected to the blood outlet circuit 3 using a TEE fitting 13. In an example, the replacement fluid circuit 17 includes a replacement fluid pump 38 for circulating through the replacement fluid circuit 17. In an example, the replacement fluid flow sensor 39 is for detecting flow through the replacement fluid circuit 17. In an example, a replacement fluid bag 18 is for storage of the replacement fluid and provides the replacement fluid to the TEE fitting 13 (and therefore the blood outlet circuit 3, and to the patient). In an example, the replacement fluid circuit 17 includes replacement fluid tubing. In an example, the waste tubing of the waste circuit 15 includes a collar 40 for being held by the holder (not shown) to provide strain relief.

In an example, the replacement fluid pump 38 is a peristaltic pump. In an example, the replacement fluid pump 38 is a clamp-on pump which is installed by clamping the replacement fluid pump 38 to the replacement fluid tubing of the replacement fluid circuit 17. In an example, the replacement fluid pump 38 is controllable by the controller 31 to operate at constant flow rate increments from 0 to 20 mL/min. In an example, the user can select the constant flow rate using the user interface device 29.

The hours per day and days per week of the artificial kidney 100 can be individualized to each patient. In an example, each HF-WAK session lasts 4-6 hours per day between hemodialysis (day or nocturnal) sessions. If tolerated, then HF-WAK daily duration can be increased which could allow a decrease in in number hemodialysis sessions per week. The additional SCUF or hemofiltration (HF) using the artificial kidney 100 on top of standard intermittent hemodialysis therapy can assist in uremic toxin removal and provide a more constant state with respect to both patient biochemistry and fluid-volume control. The patient can perform reasonable activities of daily living (no athletics) while wearing the artificial kidney 100 during CRRT. The artificial kidney 100 can perform either SCUF or HF. The HF can provide increased convective clearance of uremic toxins.

The replacement fluid circuit 17 is used when the artificial kidney 100 is the hemofiltration artificial kidney. In some examples, when the artificial kidney 100 is the ultrafiltration artificial kidney, there is no replacement fluid circuit 17.

In an example, the waste circuit 15 is used for priming procedures, purging procedures, and other procedures of the artificial kidney 100. In an example, the waste circuit 15 is connected to the blood outlet stopcock 9. The waste circuit 15 is for waste removal, for example during a prime procedure or a purge procedure of the artificial kidney 100. In an example, the waste circuit 15 includes waste tubing and a waste bag 8 for receiving waste from the waste tubing. In an example, the waste tubing includes a collar 28 for being held by the holder (not shown) to provide strain relief. In an example, the waste bag 8 includes an anti-backflow valve or preventer (not shown) integrated in the waste bag 8.

FIGS. 8A, 8B and 8C illustrate an example stopcock 60 for routing flow of the artificial kidney 100, and a servo-positioner 68 for controlling (switching positions of) the stopcock 60. The stopcock 60 can be an example of the blood outlet stopcock 9, the blood inlet stopcock 10, or both. The servo-positioner 68 can be an example of the first actuator 36 (for controlling the blood inlet stopcock 10), the second actuator 37 (for controlling the blood outlet stopcock 9), or both.

In an example, the stopcock 60 is a 3-port, 2-position stopcock. The stopcock 60 includes a first port 70, a second port 72, and a third port 74. The stopcock 60 can include a first stopcock position (or configuration) which defines a first stopcock passage between the first port 70 and the second port 72. The stopcock 60 can include a second stopcock position (or configuration) which defines a second stopcock passage between the first port 70 and the third port 74. The connection of particular medical devices to the first port 70, the second port 72, and the third port 74 can be selected in dependence of which stopcock passage is required to fluidly connect between the particular medical devices. It would be appreciated that reference to a 3-port, 2-position stopcock can include more than three ports, and more than 2 positions.

The stopcock 60 includes a stopcock lever 62. Pivoting of the stopcock lever 62 switches the stopcock 60 between the first stopcock position and the second stopcock position. In an example, the servo-positioner 68 is dimensioned to fit to the stopcock lever 62, and can control (pivot) the stopcock lever 62. The servo-positioner 68 is controlled by the controller 31 (FIG. 1) in an example.

In an example, the stopcock 60 includes a holder 64 dimensioned to hold the first port 70, the second port 72, and the third port 74. A base 66 is connected to the holder 64. In some examples, the base 66 can include a counterpart of a loop and hook fastener, for removable attachment to the mounting panel 33 (FIGS. 4A and 4B).

In an example, the servo-positioner 68 is a closed-loop device that produces motion in response to a command from the controller 31. In some examples, the servo-positioner 68 includes electric motors, piezoceramics, pneumatics, or hydraulics. In some examples, the servo-positioner 68 uses an electronic feedback loop to regulate the speed and direction of the motion using a feedback device to generate a position, velocity or force signal.

By way of example (FIGS. 8A and 12), when the stopcock 60 is the blood inlet stopcock 10, the first port 70 is connected to the patient inlet circuit 46, the second port 72 is connected to the blood inlet circuit and the third port 74 is connected to the saline circuit 7.

By way of example, when the stopcock 60 is the blood outlet stopcock 9, the first port 70 is connected to the blood outlet circuit 3, the second port 72, is connected to the blood outlet circuit 3 and the third port 74 is connected to the waste circuit 15.

FIGS. 8A to 8C illustrate an example of the stopcock 60 in which the third port 74 is on the right side of the stopcock 60. In other examples, for the stopcock 60, the third port 74 is on the left side of the stopcock 60 (see, for example, blood inlet stopcock 10 in FIG. 12A).

Figure 9B:
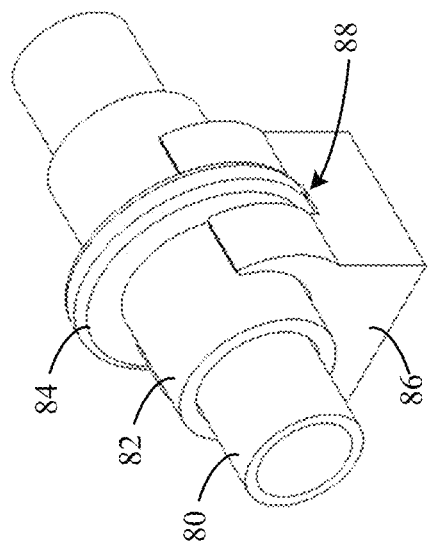
FIG. 9B illustrates an assembled perspective view of FIG. 9A.
Figure 9A:
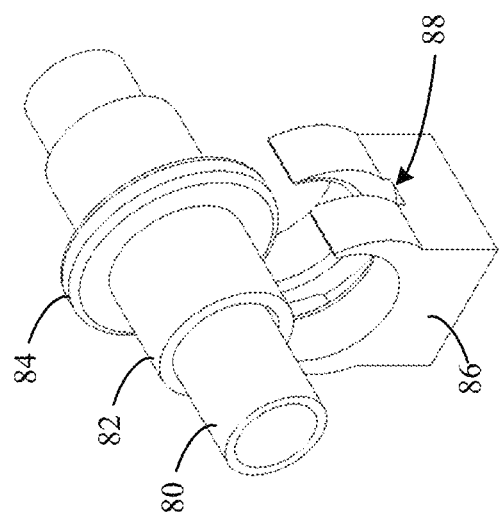
FIG. 9A illustrates an exploded perspective view of a holder for securing tubing of the artificial kidney to the garment, having a flange-and-groove connection, in accordance with an example embodiment.

FIGS. 9A and 9B illustrates a holder 86 for removably attaching tubing 80 of the artificial kidney 100 to the garment 102, having a flange-and-groove connection, in accordance with an example embodiment. The holder 86 provides strain relief for the tubing 80 at particular connections to alleviate potential pulling out and twisting of the tubing 80. For example, the holder 86 can be any of the described holders herein that are used to secure the tubing 80 to the garment 102 or the mounting panel 33.

The tubing 80 includes a collar 82 that circumscribes the tubing 80. In an example, the collar 82 is bonded or unbonded to the tubing 80. The collar 82 includes a flange 84 that circumferentially extends from the collar 82. The holder 86 is dimensioned to receive and hold the collar 82. The holder 86 includes a groove 88 that is dimensioned to receive and hold the flange 84. Accordingly, when the tubing 80 is held in the holder 86, the tubing 80 is secured from moving longitudinally, therefore providing strain relief to the tubing 80 and any connections adjacent to the tubing 80. In an example, the holder 86 can be removably attachable to the garment 102. In an example, the holder 86 can include a counterpart of a loop and hook fastener, for removable attachment to the mounting panel 33 (FIGS. 4A and 4B). In an example, the holder 86 is positioned close to a connection point of the tubing 80. Accordingly, the tubing 80 provides strain relief for the tubing 80 at particular connections.

Figure 10:
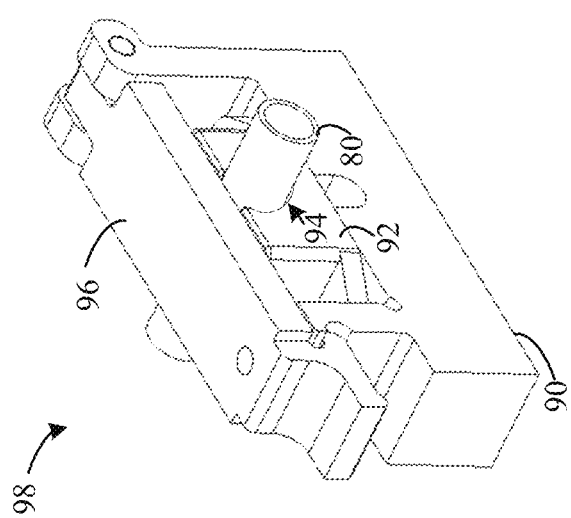
FIG. 10 illustrates a perspective view of another example holder for securing the tubing to the artificial kidney, which is a clamp, in accordance with another example embodiment.

FIG. 10 illustrates another example holder 98 for removably attaching the tubing 80 and a component 29 to the garment 102, which is a clamp, in accordance with another example embodiment. In an example, the component 92 is any one of the described flow sensors, blood detectors, air detectors, etc. For example, the holder 98 can be any of the described holders herein that are used to secure the tubing 80 to the garment 102 or the mounting panel 33. The holder 98 is dimensioned to receive and hold the tubing 80. The holder 98 includes a component 92 that defines a channel 94. The channel 94 is dimensioned to receive and hold the tubing 80. A base 90 holds the component 92. A snap-lid 96 is hingedly connected to the base 90 and is configured to snap-close. Accordingly, when the tubing 80 is held in the holder 98, the tubing 80 is secured to the holder 98 and is clamped to the garment 102, therefore providing strain relief to the tubing 80 and any connections adjacent to the tubing 80. The snap-lid 96 prevents the tubing 80 from being accidently removed from the component 92. In an example, the base 90 can be removably attachable to the garment 102. In an example, the base 90 can include a counterpart of a loop and hook fastener, for removable attachment to the mounting panel 33 (FIGS. 4A and 4B). In an example, the holder 86 is positioned close to a connection point of the tubing 80. Accordingly, the tubing 80 provides strain relief for the tubing 80 at particular connections.

FIG. 11 illustrates a front view of the user interface device 29, in accordance with an example embodiment. In an example, the user interface device 29 has wired connection to the controller 31. In other examples, the user interface device 29 is configured with wireless communication with the controller 31. In another example, the user interface device 29 is a mobile device such as a phone or tablet computer. The user interface device 29 includes input devices and output devices to interact with the patient or user. In some examples, the user interface device 29 outputs instructions or steps to the patient or user for the user to manually perform on the artificial kidney 100. Examples of manual instructions or steps including clamping, bag draining, bag replacement, battery replacement, and other activities.

In an example, the user interface device 29 includes a display 202. The display 202 can include a response 210 from the controller 31, and a timer 204 (e.g., in seconds) when an alert event is detected by the controller. The user interface device 29 can includes a first button 206 and a second button 208. The first button 206 can correspond to the response 210 on the display 202. Similarly, the second button 208 can correspond to a response (not shown here) on the display 202. In an example, the display 202 is a touchscreen, and there can be soft buttons on the touchscreen rather than the first button 206 and the second button 208. In an example, the timer 204 is displayed when an alert event is detected by the controller 31. The timer 204 can display a timer for a set time such as a 3-minute countdown (or forward count-up). Other example of the set time can be set by the controller 31 or the user, e.g. for 30 second increments up to 5-minutes. If the alert event is remedied prior to expiry of the set time, the controller 31 can start or continue the event running of the dialysis procedure, without having to reset the entire procedure. If the set time expires without resolving of the alert event, the running of the artificial kidney 100 (dialysis procedure) ends, and needs to start over from the beginning (which may include replacing the disposables 500). In an example, the user interface device 29 includes a speaker (not shown). The speaker can output an audible beep, a series of beeps, or a continuous tone.

In an example, when the controller outputs an instruction or action to be performed by the user, such as turning a stopcock lever 62 or a manual clamp, the text will read "Done" above the first button 206 or the second button 208 for the user to select after completion of the instruction or action.

During manual and semiautonomous modes, the control of the artificial kidney 100 is performed through the user interface device 29 uses a prompting/response technique to guide the user. The control sequences for user interactions described in greater detail herein below. A message is displayed in the upper/middle of the display 202 of the user interface device 29, and one or two responses are at the bottom of the display 202. A single beep means that the device is paused awaiting a response. The user selects/presses the first button 206 or the second button 208 located beneath the respective response. For example, when the user interface device 29 displays the message "Patient Connect", "Red to Patient Red", "Blue to Patient Blue" and response "Done", a single beep is emitted, and the user interface device 29 awaits a response from the user. When the first button 206 or the second button 208 adjacent to one of the responses is pressed the user interface device 29 goes to the next step.

For prompts involving a critical step, a continuous series of beeps (instead of a single beep) is emitted from the speaker to reduce the potential for a missed step. When an alert event is activated, a continuous tone is emitted from the speaker.

Example prompts with respective responses include: prompt for disposals 500 replaced (prevent reuse of disposables 500); prompt for fresh battery 41; prompt for saline fluid attached (saline circuit 7 or saline bag 6); and prompt for correct disposables 500 installed.

Figure 13:
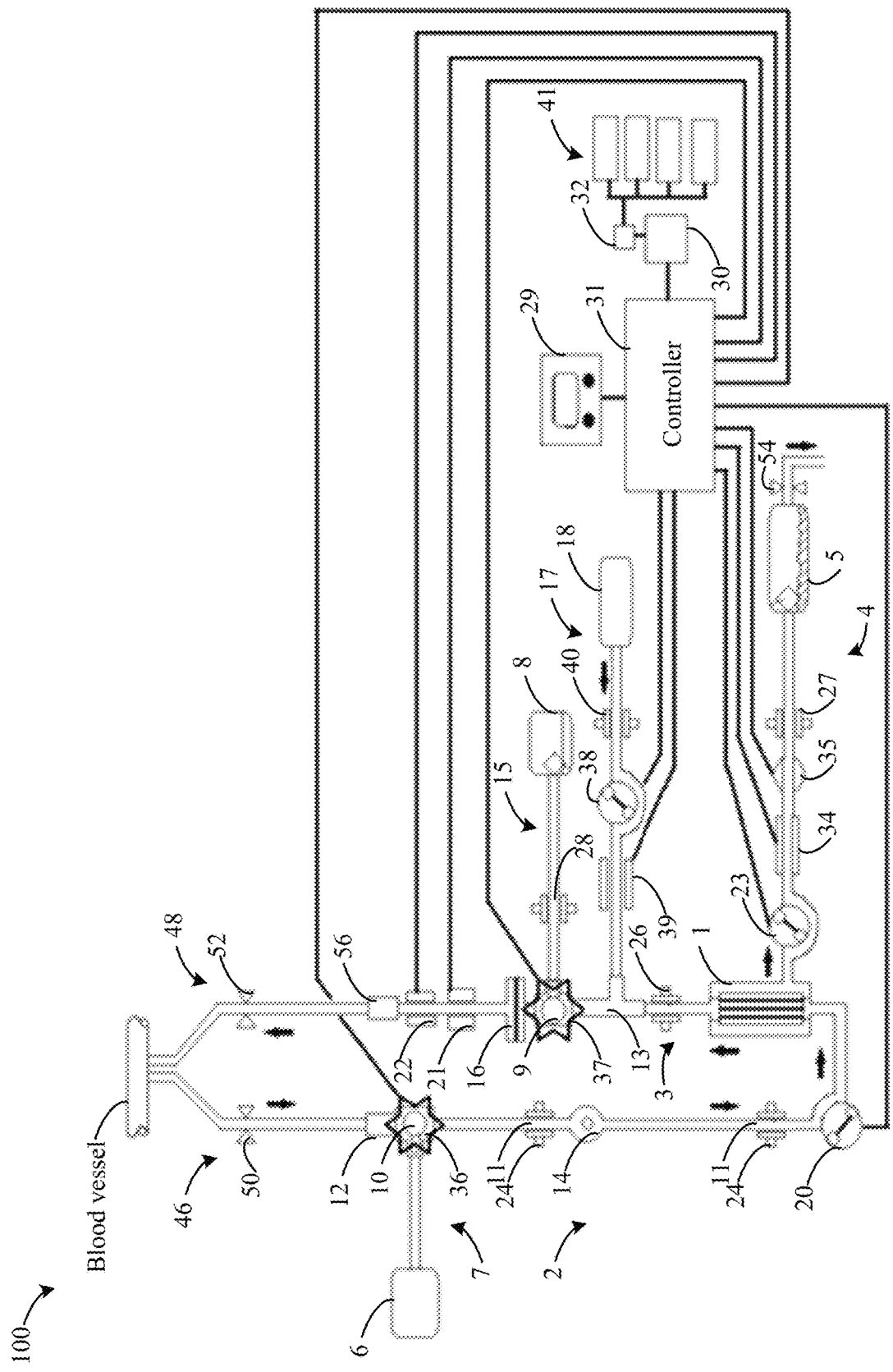
FIG. 13 illustrates a control diagram of the artificial kidney, in accordance with an example embodiment.

FIG. 13 illustrates a control diagram of the artificial kidney 100, in accordance with an example embodiment. FIG. 13 illustrates non-disposable components 600 of the artificial kidney 100, including electronic components. The main control is performed by the controller 31. FIG. 13 illustrates black arrows showing flow during procedure running (RUN or RUNNING) (i.e., the dialysis procedure) performed by the controller 31. The controller 31 is configured to be in communication with some of the medical devices of the artificial kidney 100. The controller 31 can receive signals, such as sensor data from the flow sensors, blood sensors, air detectors, etc. The controller 31 can output signals (control signals), such as an actuation command to the first actuator 36 and the second actuator 37, or a start or stop command to pumps of the artificial kidney 100. The control signals can be variable control signals such as to control pump speed. The controller 31 can interact with the user through the user interface device 29. The controller 31 can receive inputs from the user interface device 29 and output information to the display 202.

In an example, during operation of the artificial kidney 100, at each prompting/response step the electronic components are in a state of: i) Ready—awaiting activation; ii) Active—component powered, activated; or iii) Inactive—not powered, not activated, potential to be turned on when needed by the controller 31.

The electronic components of the artificial kidney include: blood pump 20, blood flow sensor 21, air detector 22, ultrafiltrate pump 23, user interface device 29, voltage regulator 30, controller 31, ON/OFF switch 32, ultrafiltrate flow sensor 34, blood detector 35, first actuator 36, second actuator 37, replacement fluid pump 38, replacement fluid flow sensor 39, battery 41, replacement fluid air detector (not shown), ultrafiltrate air detector (not shown), and waste pump (not shown). The artificial kidney 100 may include more or fewer electronic components than those listed here. In some examples, not all of the electronic components are shown in FIG. 13.

An example procedure from the user interface device 29 is the prompting/response steps for Priming. A first step of priming is called "Prime-1". A second step of priming is called "Prime-2". At the step "Press START Prime-1", "START" (above first button 206 or second button 208 for START), while the user interface device 29 awaits a response (i.e. selecting of first button 206 or second button 208), the electronic components statuses are:

i) Inactive-battery 41, priming timer 204 (e.g., 3-minute timer), blood flow sensor 21, air detector 22, blood pump 20, ultrafiltrate pump 23, ultrafiltrate flow sensor 34, blood detector 35;

ii) Ready-main buzzer (speaker), first button 206 and second button 208; and iii) Active-user interface device 29, priming timer 204 activated (currently 2.5-minute, range 0.5 to 5 minutes), first actuator 36 (for blood inlet stopcock 10), second actuator 37 (for blood outlet stopcock 9), ON/OFF switch 32.

When the first button 206 or the second button 208 near "START" is pressed, the electronic components statuses are changed to:

i) Inactive-first button 206 and second button 208, battery 41, blood flow sensor 21, air detector 22, ultrafiltrate flow sensor 34, blood detector 35, 3-minute timer 204;

ii) Ready-main buzzer (speaker); and iii) Active-user interface device 29, blood pump 20, ultrafiltrate pump 23, priming timer 204 (End timer-go to next step), ON/OFF switch 32, first actuator 36 (for blood inlet stopcock 10), second actuator 37 (for blood outlet stopcock 9).

For the prompting/response step for Prime-1, the blood pump 20 is pumping saline from the saline circuit 7 into the waste circuit 15 and the ultrafiltrate pump 23 is pumping saline through the ultrafiltrate circuit 4 into the ultrafiltrate bag 5 for a set time, e.g. 2.5 minutes. Since the air detector 22 and blood flow sensor 21 are both positioned on the blood outlet circuit 3 and the ultrafiltrate flow sensor 34 is positioned on the ultrafiltrate circuit 4, air and flow alerts would be activated as the air is displaced by saline. These alerts are not necessary during the priming procedure. In an example, by temporarily inactivating the air detector 22, blood flow sensor 21, and ultrafiltrate flow sensor 34 (and other sensors and detectors as applicable), nuisance alerts can be avoided.

The controller 31 (e.g., a programmable micro-controller) regulates the status of each electronic component. The control sequences for the electronic components are described in greater detail herein. In an example, there are about 120 prompting/response steps for electronic functions and alerts of the artificial kidney 100. The individual status prompts for each of the electronic functions during each control sequence step are not all described herein, for clarity and for being readily understood by those skilled in the art.

Referring still to FIG. 13, in an example, there are three main circuits: voltage regulator 30, user interface device 29 (e.g., board for the display 202, first button 206, second button 208, etc.) and a main control board with the controller 31.

In an example, the voltage regulator 30 includes a regulator board which is connected to the battery pack 114. In an example, the battery pack 114 includes four 2200 mA batteries 41 connected in parallel. The example battery pack 114 has ampere hours of up to 8800 mAh. The example battery pack 114 gives an average voltage of 3.7V.

In an example, the voltage regulator 30 is a step-up boost voltage regulator which increases the 3.7V to 12V for the main control board (controller 31). In an example, the voltage regulator 30 uses a pulse width modulation (PWM) step up controller. In an example, the regulator board of the voltage regulator 30 has three different connections. A first connection is the input power from the batteries 41. A second connection connects to the main control board (controller 31) for the controller 31 to determine battery voltage of the batteries 41, and a third connection supplies the 12V power to the main control board (controller 31).

For the user interface device 29 and the display 202, there can be two boards for the display 202: a button board and a screen display board. The button board is attached to the buttons (first button 206 and second button 208). The button board connects to the screen display board, which is for the display 202. In an example, the screen display board is connected to the main control board (controller 31) through a 20-pin ribbon cable. The screen display board contains a liquid crystal display (LCD) screen (display 202), speaker (buzzer) and an LED 212 to indicate on (e.g. green) and off (e.g. no light), or to provide other indications (e.g. red) for alert). Alternatively, the LED can be a single colour with no light during normal operation or a flashing light indicating an alert. In an example, the display 202 is a LCD 4-line by 20-character display powered by 5V from the main control board (controller 31).

The main control board houses the controller 31. The main control board includes two voltage regulators. A first voltage regulator converts 12V to 5V for the controller 31 and other devices that require 5V, and a second voltage regulator converts 5 V to 3.3 V for a memory such as a Secure Digital (SD) card. The main control board monitors the batteries 41 and motor voltage, measures the flow from the ultrafiltrate flow sensor 34 as well as the blood flow sensor 21, the air detector 22, and other sensors and detectors.

The speed of the motors (i.e. flow rate) of the pumps use the PWM. The main control board is configured to send information to the display screen board (for display 202) and receive control signals from the buttons (first button 206 and second button 208) on the button board. In an example, the following pumps are connected to the main control board: blood pump 20, ultrafiltrate pump 23, replacement fluid pump 38, and waste pump (not shown). In an example, the controller 31 sends a 5V DC signal to the gate of a dual Metal Oxide Semiconductor Field Effect Transistor (MOSFET), which in turn controls the motor voltage to the DC motors of the pumps.

The blood detector 35 for the ultrafiltrate circuit 4 uses Transistor-Transistor Logic (TTL) from 0V low to 5V high levels for calibration and output signals. The blood detector 35 is directly connected to the main control board (controller 31).

The ultrafiltrate flow sensor 34 runs on 12V supplied by the main control board (controller 31) and the ultrafiltrate flow sensor 34 will give a 0V to 10V output depending on the detected flow. The voltage is converted to 0 to 5V with a voltage divider and this is connected to one of the ADC (analog to digital converter) on the controller 31.

In an example, the blood flow sensor 21 uses 12V supply and outputs a 4 to 20 mA signal in proportion to the detected flow. The current signal is converted to a voltage with a 250 ohm resistor and is connected to an ADC on the controller 31. The air detector 22 uses TTL voltages and is interfaced directly to the controller 31 using a 5V supply.

The electronic circuits for the replacement fluid flow sensor 39, waste flow sensor (not shown), the first actuator 36, the second actuator 37, and other electronic components can operate in a similar manner or would be understood to a skilled person in the art.

FIG. 14 illustrates a detailed diagrammatic view of the artificial kidney 100, in accordance with an example embodiment. Grey-filled arrows are flows for replacement fluid purge procedure (REP PURGE) and replacement fluid priming procedure (REP PRIME). White-filled arrows are flows for blood and ultrafiltrate priming procedure (UF PRIME). A priming procedure (PRIME) is described in greater detail in relation to FIG. 15. Black-filled arrows are flows for procedure running (RUN or RUNNING), described in greater detail in relation to FIG. 16. Half-filled arrows are flows for blood and ultrafiltrate purging procedure (UF PURGE), described in greater detail in relation to FIG. 17A.

As shown in FIG. 14, the patient inlet circuit 46 (e.g., inlet cannula) and the patient outlet circuit 48 (e.g., outlet cannula) attach to a blood vessel, which can be a central venous circuit of the patient. In an example, the cannulas are passed through a vein of the patient to end up in the thoracic (chest) portion of the vena cava or in the right atrium of the heart. Another example is arterio-venous fistulae and grafts. The inlet insert-to-open valve connector 12 and the outlet insert-to-open valve connector 56 include connectors with separate normally closed bi-leaflet (duckbill) valves at both ends that open when a male threaded connector is inserted. The inlet insert-to-open valve connector 12 and the outlet insert-to-open valve connector 56 interface between the artificial kidney 100 and the cannulas to create a mechanically and microbiologically closed system. When the patient inlet circuit 46 is disconnected from the inlet insert-to-open valve connector 12, the inlet manual clamp 50 prevents blood leak when the inlet insert-to-open valve connector 12 is not connected. When the patient outlet circuit 48 is disconnected from the outlet insert-to-open valve connector 56, the outlet manual clamp 52 prevents blood leak when the outlet insert-to-open valve connector 56 is not connected. The inlet insert-to-open valve connector 12 and the outlet insert-to-open valve connector 56 are another safety measure. When the inlet insert-to-open valve connector 12 and the outlet insert-to-open valve connector 56 are disconnected from either the patient cannulas or end connectors, the inlet insert-to-open valve connector 12 and the outlet insert-to-open valve connector 56 are automatically closed. In an example, the blood outlet stopcock 9 and the blood inlet stopcock 10 each include a Luer-Lock connector for connecting to the respective inlet insert-to-open valve connector 12 or the outlet insert-to-open valve connector 56. Attachment of the Luer-Lock connector to the respective inlet insert-to-open valve connector 12 or the outlet insert-to-open valve connector 56, opens the respective insert-to-open valve connector to allow flow.

Figure 15:
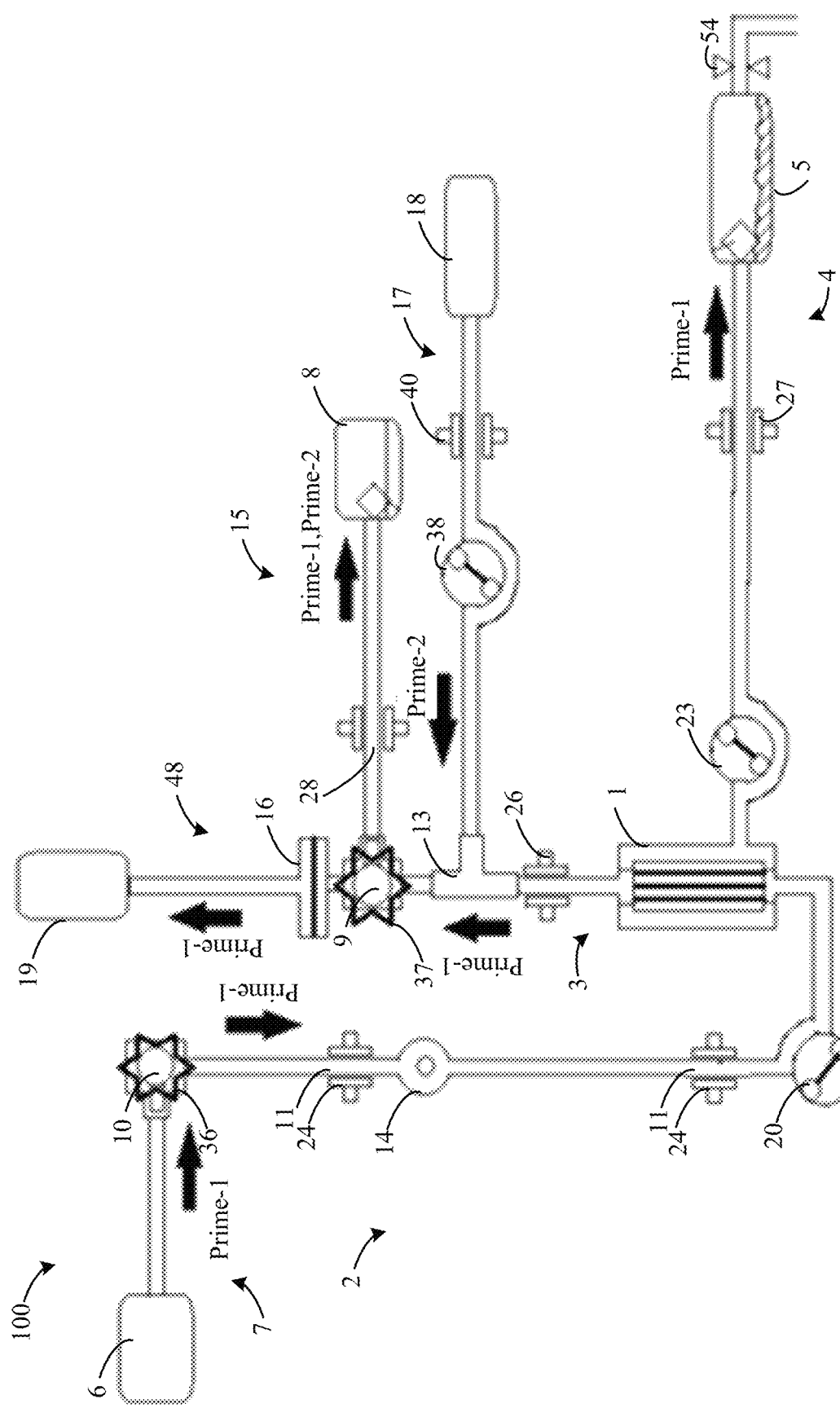
FIG. 15 illustrates a detailed diagrammatic view of a method for priming (PRIME or PRIMING) of the artificial kidney, in accordance with an example embodiment.

FIG. 15 illustrates a detailed diagrammatic view of a priming procedure (PRIME or PRIMING) of the artificial kidney 100, in accordance with an example embodiment. PRIMING is an initial step of the dialysis procedure that displaces air in the extracorporeal circuits (including the blood circuit 44) with saline during the initiation of the artificial kidney 100 before RUNNING. In an example, saline is used to avoid blood coagulation caused by pure water mixed with blood. In an example, the artificial kidney 100 is mounted to the mounting panel 33 and the garment 102 but not connected to the blood vessel of the patient. The priming procedure can be performed with the patient wearing the garment 102 carrying the artificial kidney 100, or with the artificial kidney 100 on a hanger. The black arrows indicate fluid flows for a first priming procedure (Prime-1) and a second priming procedure (Prime-2).

As described above, when the blood inlet stopcock 10 is in a position that defines a passage between the saline circuit 7 and the blood inlet circuit 2, the position of the blood inlet stopcock 10 can be denoted as PRIME or PURGE (the passage can be denote first blood inlet stopcock passage). When the blood inlet stopcock 10 is in a position that defines a passage between the patient inlet circuit 46 and the blood inlet circuit 2, the position of the blood inlet stopcock 10 can be denoted as RUN (the passage can be denote second blood inlet stopcock passage). When the blood outlet stopcock 9 is in a position that defines a passage between the patient outlet circuit 48 and the blood outlet circuit 3, the position of the blood outlet stopcock 9 can be denoted as RUN (the passage can be denote second blood outlet stopcock passage). When the blood outlet stopcock 9 is in a position that defines a passage between the blood outlet circuit 3 and the waste circuit 15, the position of the blood outlet stopcock 9 can be denoted as PURGE (the passage can be denote first blood outlet stopcock passage).

Prime-1 is as follows. Blood inlet stopcock 10 is set to PURGE. Blood outlet stopcock 9 is set to RUN. Temporarily deactivate the air detector 22 and the flow sensor 21 (not shown here) to avoid nuisance false alarms. Both the blood pump 20 and the ultrafiltrate pump 23 are active. Saline flows at e.g. 50 mL/min from the saline bag 6 through blood inlet stopcock 10 into the blood inlet circuit 2 and through the blood outlet circuit 3, exiting through the blood outlet circuit 3, into a prime collection bag 19. The prime collection bag 19 is removable. As well, saline flows due to a flow rate of the ultrafiltrate pump 23 from the saline bag 6 into the ultrafiltrate circuit 4, exiting into the ultrafiltrate bag 5.

Prime-2 is as follows. Blood inlet stopcock 10 set to PURGE. Blood outlet stopcock 9 set to PURGE. Both the replacement fluid pump 38 and the waste pump (not shown, and optional in an example) are active. Both the blood pump 20 and the ultrafiltrate pump 23 are inactive (the inlet manual clamp 50, outlet manual clamp 52, and ultrafiltrate manual clamp 54 are clamped to prevent flow in their respective circuits). The replacement fluid flows at 10 mL/min from the replacement fluid bag 18 through the TEE fitting 13 and blood outlet stopcock 9 into the waste circuit 15 and the waste bag 8. Activate the air detector 22 and the flow sensor 21.

After priming (Prime-1 and Prime-2), the air detector 22 is activated and checked to confirm that the air detector 22 is working and is able to detect air in the blood of the blood outlet circuit 3. The same can be performed in any other air detectors of the artificial kidney 100 (not shown here).

Figure 16:
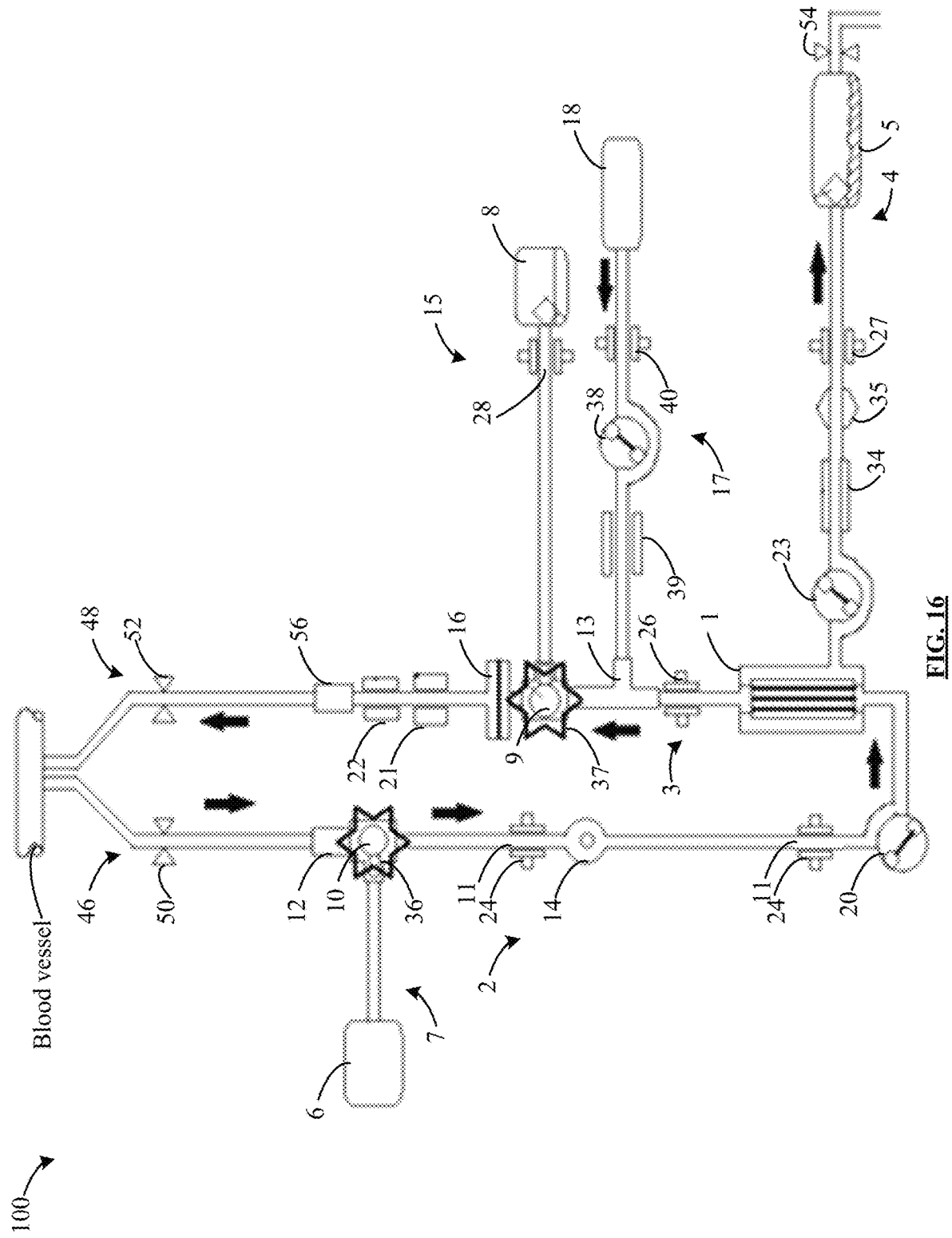
FIG. 16 illustrates a detailed diagrammatic view of a method for procedure running (RUN or RUNNING) of the artificial kidney, in accordance with an example embodiment.

FIG. 16 illustrates a detailed diagrammatic view of procedure running (RUNNING) of the artificial kidney 100, in accordance with an example embodiment. RUNNING is the normal operation of the artificial kidney 100 performing Continuous Renal Replacement Therapy (CRRT). Blood flows (50 mL/min typical) from patient inlet circuit 46, through the blood inlet circuit 2 (inlet cannula) and blood inlet stopcock 10 into the blood inlet circuit 2 and through the blood outlet circuit 3 (through the hemofilter 1 and TEE fitting 13), exiting through blood outlet stopcock 9 into the patient outlet circuit 48 with the blood clot filter 16, the blood flow sensor 21, the air detector 22, through the patient outlet circuit 48 (outlet cannula) and returns to the patient. The stopcock lever positions of the Blood outlet stopcock 9 and the blood inlet stopcock 10 are set to RUN. The ultrafiltrate is separated from the blood by the hemofilter 1, flowing through the ultrafiltrate circuit 4 into the ultrafiltrate bag 5. The replacement fluid flows from the replacement fluid bag 18 into the blood of the blood outlet circuit 3 through the TEE fitting 13. In an example, the saline bag 6 and the waste bag 8 along with the saline circuit 7 and the waste circuit 15 are not part of RUNNING. In an example, there is no introduction of pre-filter fluids which would increase pressure at the membrane 58 prior to the hemofilter 1.

Figure 17A:
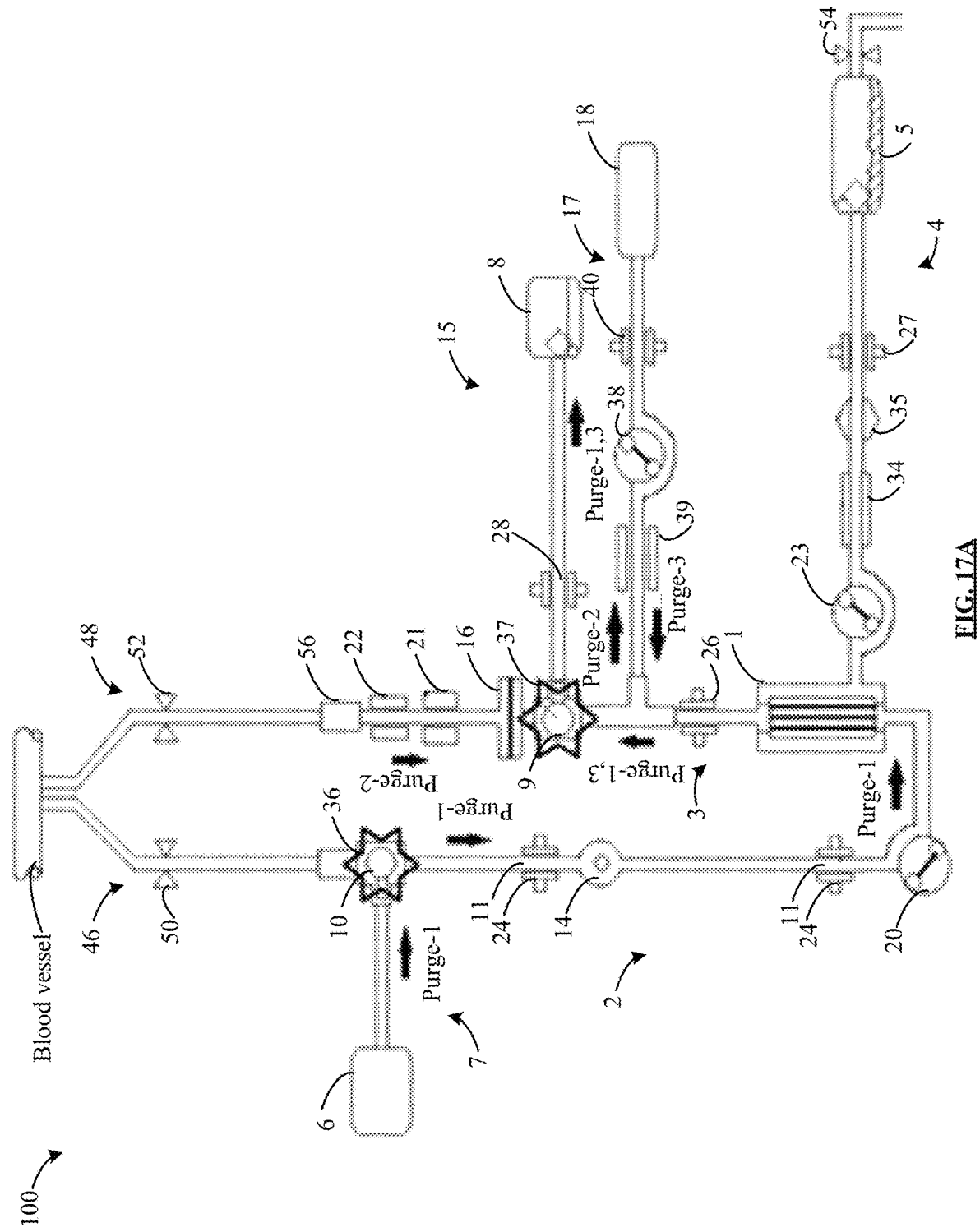
FIG. 17A illustrates a detailed diagrammatic view of a method for purging (PURGE or PURGING) of the artificial kidney, in accordance with an example embodiment.

FIG. 17A illustrates a detailed diagrammatic view of a purging procedure (PURGE or PURGING) of the artificial kidney 100, in accordance with an example embodiment. In an example, air is detected by the air detector 22 in the patient outlet circuit 48 (or the blood outlet circuit 3) and information is sent to the controller 31. For purging the blood from the blood circuit 44 and other extracorporeal circuits, the saline flows from the saline circuit 7, through the blood inlet circuit 2 and the blood outlet circuit 3 into the waste circuit 15. In an example, the ultrafiltrate circuit 4 is not purged since air infiltration is not harmful and a blood in ultrafiltrate alert event requires the procedure end. For purging the replacement fluid circuit 17, replacement fluid flows from the replacement fluid bag 18, through the replacement fluid circuit 17 and TEE fitting 13 into the waste circuit 15. In an example, the purging procedure can include three steps, Purge-1, Purge-2, and Purge-3.

Step Purge-1. Both the blood outlet stopcock 9 and the blood inlet stopcock 10 are positioned to PURGE. Blood pump 20 is forward. Other pumps (ultrafiltrate pump 23, replacement fluid pump 38) are inactive. Saline flows from the saline bag 6 through blood inlet stopcock 10 into the blood inlet circuit 2 and blood outlet circuit 3, exiting through blood outlet stopcock 9, into the waste circuit 15 and waste bag 8.

Step Purge-2. Blood inlet stopcock 10 is positioned to PURGE (not have a role in step Purge-2). Blood outlet stopcock 9 is positioned RUN. Replacement fluid pump 38 is reverse. Blood and air flows from the blood outlet circuit 3, back through the blood outlet stopcock 9 into the replacement fluid circuit 17. Other pumps (ultrafiltrate pump 23, replacement fluid pump 38) are inactive.

Step Purge-3. Both the blood outlet stopcock 9 and the blood inlet stopcock 10 are positioned to PURGE. Replacement fluid pump 38 is forward flow. Other pumps (ultrafiltrate pump 23, replacement fluid pump 38) inactive. Blood and Air flows from the replacement fluid circuit 17 through the TEE fitting 13, through blood outlet stopcock 9, into the waste circuit 15 and waste bag 8. Optionally, a waste pump (not shown) is also in forward flow away from the blood outlet stopcock 9 and towards the waste bag.

Both the air detection by the air detector 22 and the purging procedure of FIG. 17A can be accomplished with the artificial kidney 100 in any orientation. That means that the person wearing the artificial kidney 100 can be ambulating, standing, lying down or other orientations.

When air is detected by the air detector 22 the pumps (blood pump 20, ultrafiltrate pump 23, and replacement fluid pump 38) stop and an alert event is activated. From experimentation it was found the air bubbles smaller than the inside diameter of the extracorporeal tubing (typically ⅛" or 3.2 mm) have a volume of about 0.005 mL. When the orientation of the artificial kidney 100 (and the disposables 500) is vertical these bubbles will float upward. These bubbles can be allowed to enter the patient without causing harm to the patient. When the orientation of the artificial kidney 100 (and the disposables 500) is vertical, bubbles that touch the inside of the tubing do not float upward but remain stationary. Therefore, these larger bubbles can be withdrawn into the replacement fluid circuit 17 and expelled into the waste bag 8 without causing harm to the patient.

Figure 17B:
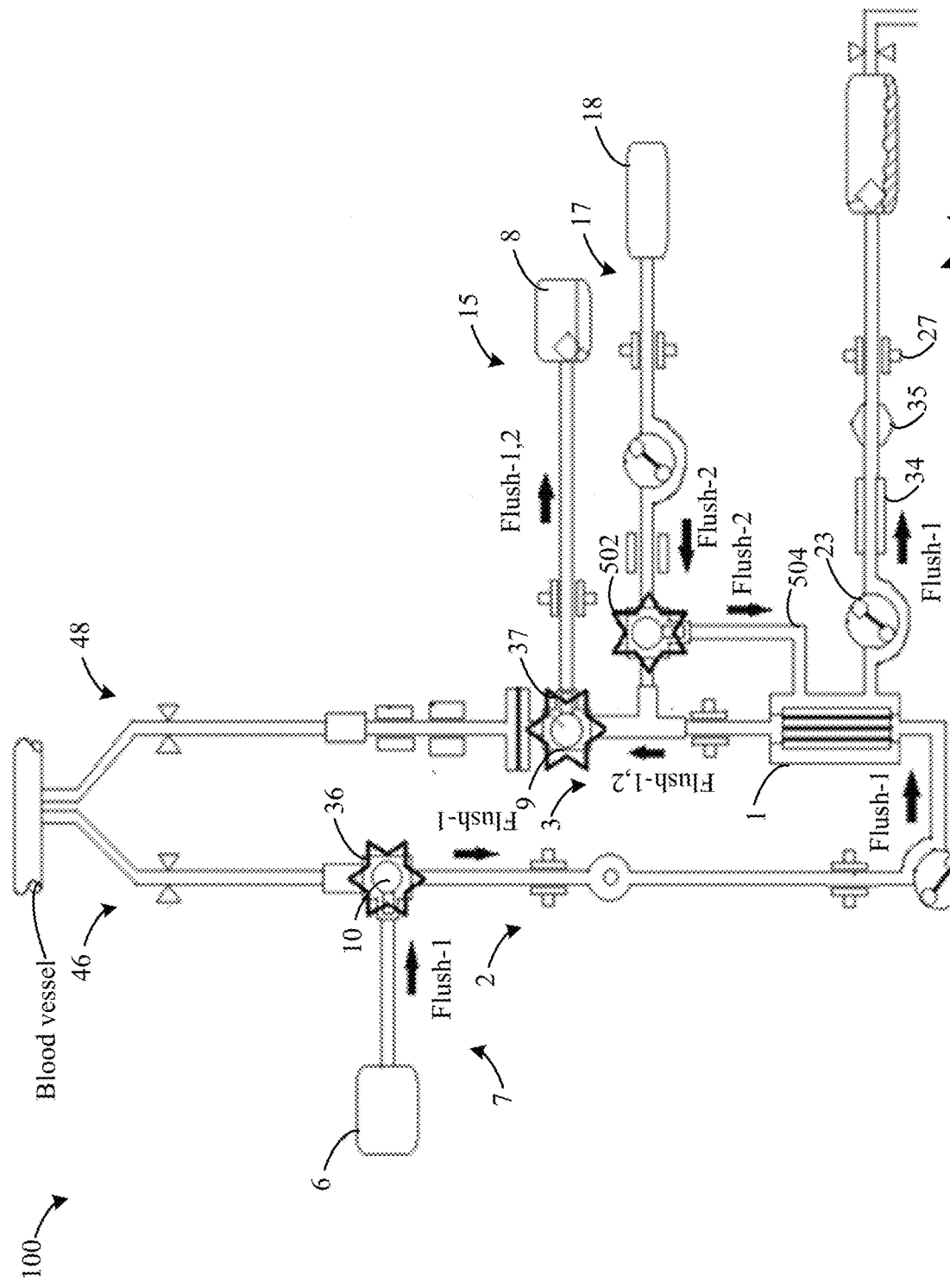
FIG. 17B illustrates a detailed diagrammatic view of an alternate example embodiment of the artificial kidney for flushing (FLUSH or FLUSHING) of a hemofilter of the artificial kidney.

FIG. 17B illustrates a detailed diagrammatic view of the alternate example embodiment of the artificial kidney 100 for flushing (FLUSH or FLUSHING) of the hemofilter of the hemofilter 1 and the ultrafiltrate circuit 4 (the disposables 500 for this example are also illustrated in FIG. 12B). In the example of FIG. 17B, the artificial kidney 100 further includes the backwash stopcock 502 and the backwash circuit 504. The FLUSH can be performed while the artificial kidney 100 is connected to the patient, by first temporarily suspending the RUNNING process and then performing the FLUSH. The remaining parts are the same or similar to those in FIG. 17A.

The backwash fluid circuit 504 can include tubing and connectors.

A backwash servo positioner (similar to servo-positioner 68 described above) can be used to control the backwash stopcock 502. In an example, the backwash servo positioner, and therefore the backwash stopcock 502, is controllable by the controller 31 (FIG. 1). In an example, the backwash stopcock 502 is 3-port, 2-position stopcock. A first position of the backwash stopcock 502 (RUN) defines a passage between the replacement fluid circuit 17 and the blood outlet circuit 3 (and post hemofilter 1), for fluid replenishment to the patient using replacement fluid. A second position of the backwash stopcock 502 (FLUSH) defines a passage between the replacement fluid circuit 17 and the hemofilter 1, for the FLUSH mode. For example, in the second position, the replacement fluid flows to perform backwashing into the hemofilter 1. For example, there may be bubble of impurities in the hemofilter 1 that may be washed using the FLUSH mode while the artificial kidney 100 is still connected to the patient.

It was observed that during RUNNING air bubbles may appear in the ultrafiltrate circuit 4. The probable causes are a leaking connector, fouling/partial plugging of the hemofilter 1 or that the negative pressure in the ultrafiltrate circuit 4 (denoted Puf) has reversed air dissolution causing the appearance of air bubbles and air bubble coalescence. For longer RUN times (e.g. 2 hours or more at 2 ml/min or more) Puf may increase (negative pressure or vacuum), until bubbles appear. This defeats the efficacy of Slow Continuous Ultrafiltration. An alert (e.g., UF LOW FLOW) can be activated which initiates a FLUSH, or the procedure ends if the air persists after repeated flushes. There are two example methods for a FLUSH, denoted Flush-1 and Flush-2. Flush-1 is an interior rinse of the blood line within the hemofilter 1 and the ultrafiltrate circuit 4 (tubing and components). Flush-1 is a forward rinse. Flush-2 is a backwash rinse of the hemofilter 1 using the replacement fluid from the replacement fluid bag 18 of the replacement fluid circuit 17. In examples, only one of the two FLUSH methods is implemented at a given time.

Referring to FIG. 17B, for Flush-1, the saline from the saline bag 6 flows through the saline circuit 7, through the blood inlet stopcock 10 suitably servo-positioned to the blood inlet circuit 2, through the hemofilter 1, to the blood outlet circuit 3 to the blood outlet stopcock 9 suitable servo-positioned to the waste circuit 15, and then disposed into the waste bag 8. As well, the saline from the saline bag 6 flows through the ultrafiltrate circuit 4.

Referring to FIG. 17B, for Flush-2, the replacement fluid from the replacement fluid bag 18 flows through the replacement fluid circuit 17 to the backwash stopcock 502 suitably servo-positioned to the backwash fluid circuit 504 to the hemofilter 1 (in direction opposite to the normal running fluids, called backwash). The replacement fluid then flows to the blood outlet circuit 3 to the blood outlet stopcock 9 suitable servo-positioned to the waste circuit 15, and then disposed into the waste bag 8.

FIGS. 18 to 35 illustrate methods for operating the artificial kidney 100. References contained in pentagons, A, B, 300, 302, 304, 306, 308, 310, 312, 314, 316, 318, 320, 322, 324, 326, 328, 330, 332, 334, 336, 338, 340, are used to indicate continuity between particular Figures, as indicated.

Figure 18:
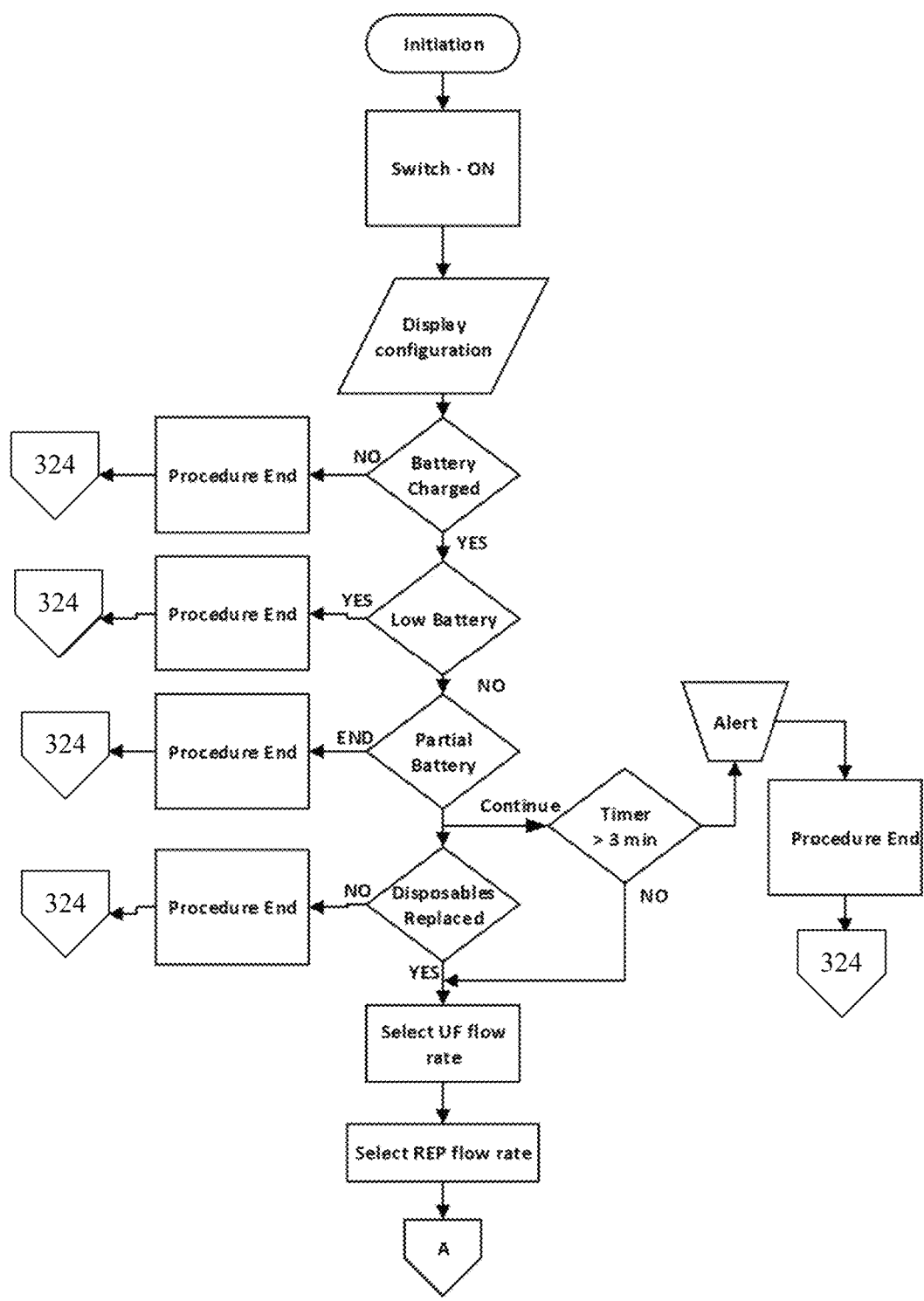
FIG. 18 illustrates a flow diagram of a method for initiation of the artificial kidney, in accordance with an example embodiment.

FIG. 18 illustrates a flow diagram of a method for initiation of the artificial kidney 100, in accordance with an example embodiment. When the ON/OFF switch 32 is turned to ON, the user interface device 29 displays the current configuration (e.g. "CONFIG 3-1 Clinical") and a series of checks are performed requiring user input END or CONTINUE: i) Confirm desired display configuration (or software configuration)? ii) Confirm battery charged? iii) Low battery check. iv) Partial battery (3 hrs) check with message. v) Confirm disposables replaced? vi) Select the desired ultrafiltrate flow rate (e.g., range 1 to 20 mL/min) of the ultrafiltrate pump 23. After making a selection the user is asked to confirm the selection. vii) Select the desired replacement fluid flow rate (flow rate increments from 0 to 20 ml/min) of the replacement fluid pump 38. After making a selection the user is asked to confirm the selection.

Figure 19:
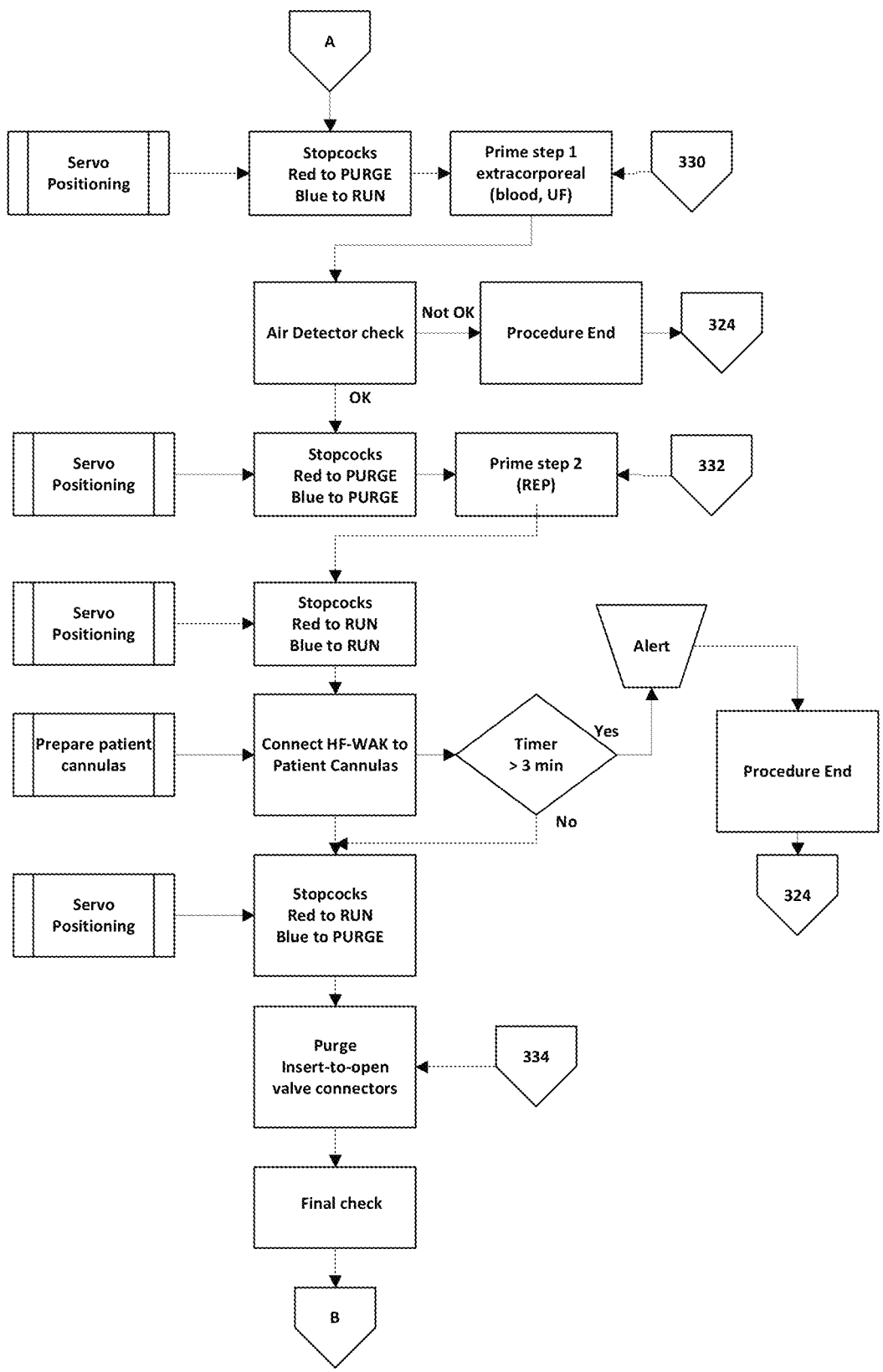
FIG. 19 illustrates a flow diagram of the method for priming the artificial kidney, in accordance with an example embodiment.

FIG. 19 illustrates a flow diagram of the method for priming the artificial kidney 100, in accordance with an example embodiment. During priming of the blood circuit 44 (step Prime-1) and other extracorporeal circuits, saline flows from the saline bag 6 through blood inlet stopcock 10 into the blood inlet circuit 2 and blood outlet circuit 3, through blood outlet stopcock 9 and exiting through the blood outlet circuit 3 into the prime collection bag 19. Temporarily deactivate the air detector 22 and the flow sensor 21 (not shown here) to avoid nuisance false alarms. In the control sequence shown in FIG. 19, the Blood inlet stopcock 10 is servo-positioned to Purge and the blood outlet stopcock 9 is servo-positioned to RUN, ultrafiltrate manual clamp 54 is adjusted to closed, and the saline blood priming of step Prime-1 is performed.

During priming of the replacement fluid circuit 17 (i.e., step Prime-2), replacement fluid flows from the replacement fluid bag 18 through the TEE fitting 13 and blood outlet stopcock 9, into the waste circuit 15 (and into the waste bag 8). In the control sequence shown in FIG. 19, the blood inlet stopcock 10 is servo-positioned to Purge and the blood outlet stopcock 9 is servo-positioned to Purge, ultrafiltrate manual clamp 54 is adjusted to closed, and the priming of the replacement fluid circuit 17 (i.e., step Prime-2) is performed.

After completion of set Prime-2, the blood inlet stopcock 10 is servo-positioned to Run and the blood outlet stopcock 9 is servo-positioned to Run. The Routine On procedure is a series of user steps to clear and purge both patient cannulas (patient inlet circuit 46 and patient outlet circuit 48) using syringes before connecting. The "Connect HF-WAK to Patient Cannulas" is the connection of the patient to the artificial kidney 100. A 3-minute Stop Time Exceeded timer is started through the user interface device 29 which continues until the user selects Start. The blood inlet stopcock 10 is servo-positioned to Run and the blood outlet stopcock 9 is servo-positioned to Purge. The "Purge insert-to-open valve connectors" is a series of steps which control servo positioning of the blood inlet stopcock 10 and the blood outlet stopcock 9 that purges a small bubble of air trapped in the insert-to-open valve connectors (e.g., a commercial product called TEGO®) to prevent the air from entering the patient. An air detector check is performed on the air detector 22 to confirm that the blood air detector 22 is functioning OK. If not OK, control is transferred to PROCEDURE END (step 324). A flow sensor check similarly can be performed on the flow sensor 21.

Figure 20:
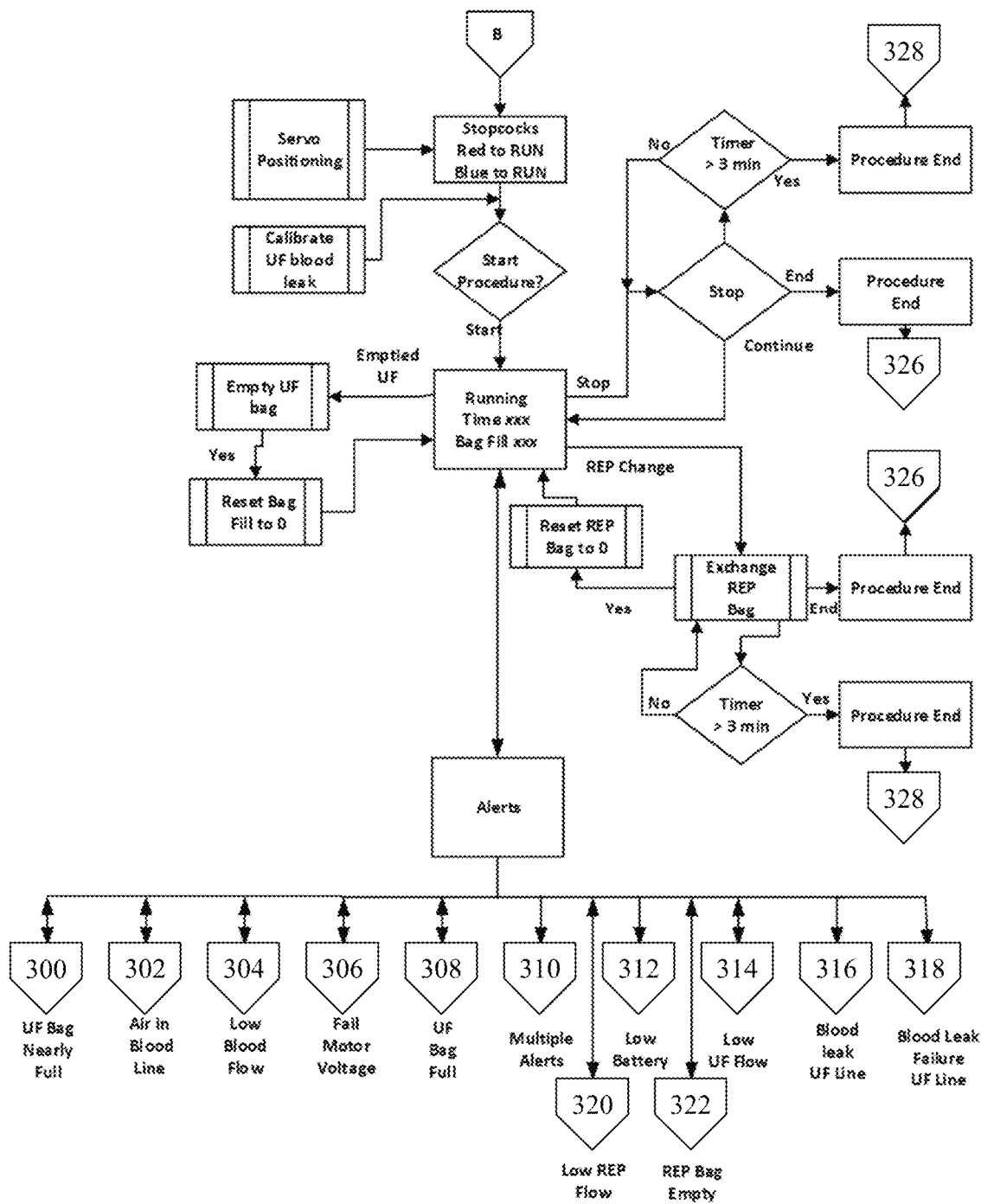
FIG. 20 illustrates a flow diagram of the method for procedure running of the artificial kidney, in accordance with an example embodiment.

FIG. 20 illustrates a flow diagram of a method for procedure running of the artificial kidney 100, in accordance with an example embodiment. The blood inlet stopcock 10 is servo-positioned to Run and the blood outlet stopcock 9 is servo-positioned to Run. The "Start Procedure?" is a final step for the user to begin the procedure. A Final Check is performed that confirms that the air detector 22 detects fluid (not air). If air is detected, then the purge procedure for the blood circuit 44 and replacement fluid circuit 17 are performed, as in FIG. 24.

In the present example, the procedure running is slow continuous hemofiltration. In another example, not shown here, the procedure running is slow continuous ultrafiltration (SCUF) without replacement fluid. During procedure running, blood flows from the patient inlet circuit 46 (arterial patient cannula) through the blood inlet stopcock 10 into the blood inlet circuit 2 and through the blood outlet circuit 3, exiting through the blood outlet stopcock 9 into the patient outlet circuit 48 (venous patient cannula). The ultrafiltrate flows from the hemofilter 1 through the ultrafiltrate circuit 4 to the ultrafiltrate bag 5. The replacement fluid flows from the replacement fluid bag 18, through the replacement fluid circuit 17, TEE fitting 13 and into the blood outlet circuit 3.

The step Running, Time xxx, Bag Fill xxx shows the time duration (Time xxx) from the start and the amount of ultrafiltrate in the ultrafiltrate bag 5 (Bag Fill xxx). At any time while the procedure is running the user may choose SELECTS (first button 206) for options stop (Stop), empty ultrafiltrate (Emptied UF) or ultrafiltrate bag 5 exchange (Exchange REP Bag) (selected via second button 208). In order to end the procedure, the user selects Stop then END (goes to Procedure End).

Select Stop includes the following: i) allows the user to pause Running for any reason. ii) blood pump 20, ultrafiltrate pump 23 and replacement fluid pump 38 are inactive (stopped). iii) all sensors/detectors remain active. iv) 3-minute Stop Time Exceeded timer is activated. At the end of 3-minutes control is transferred to Procedure End (Procedure Aborted). v) The user can elect to Continue which transfers back to Running with the same Time xxx and Bag Fill xxx as when Stop was selected. vi) The user can elect End which transfers to Voluntary Procedure End (see Procedure End).

Select Emptied UF (ultrafiltrate) includes the following: i) The user empties the UF bag (with or without a reminder alert). ii) The user selects Yes. iii) Running continues. iv) ultrafiltrate bag fill resets to zero.

Select Exchange REP Change includes the following: i) Blood pump 20, ultrafiltrate pump 23 and replacement fluid pump 38 are inactive (stopped). ii) All sensors/detectors remain active. iii) 3-minute Stop Time Exceeded timer is activated. At the end of 3-minutes control is transferred to Procedure End (Procedure Aborted). iv) The user can elect to Yes which transfers back to Running with the same Time xxx and Bag Fill xxx as when REP Change was selected and REP bag volume reset to "full". v) The user can elect End which transfers to Voluntary Procedure End (see Procedure End).

Figure 21:
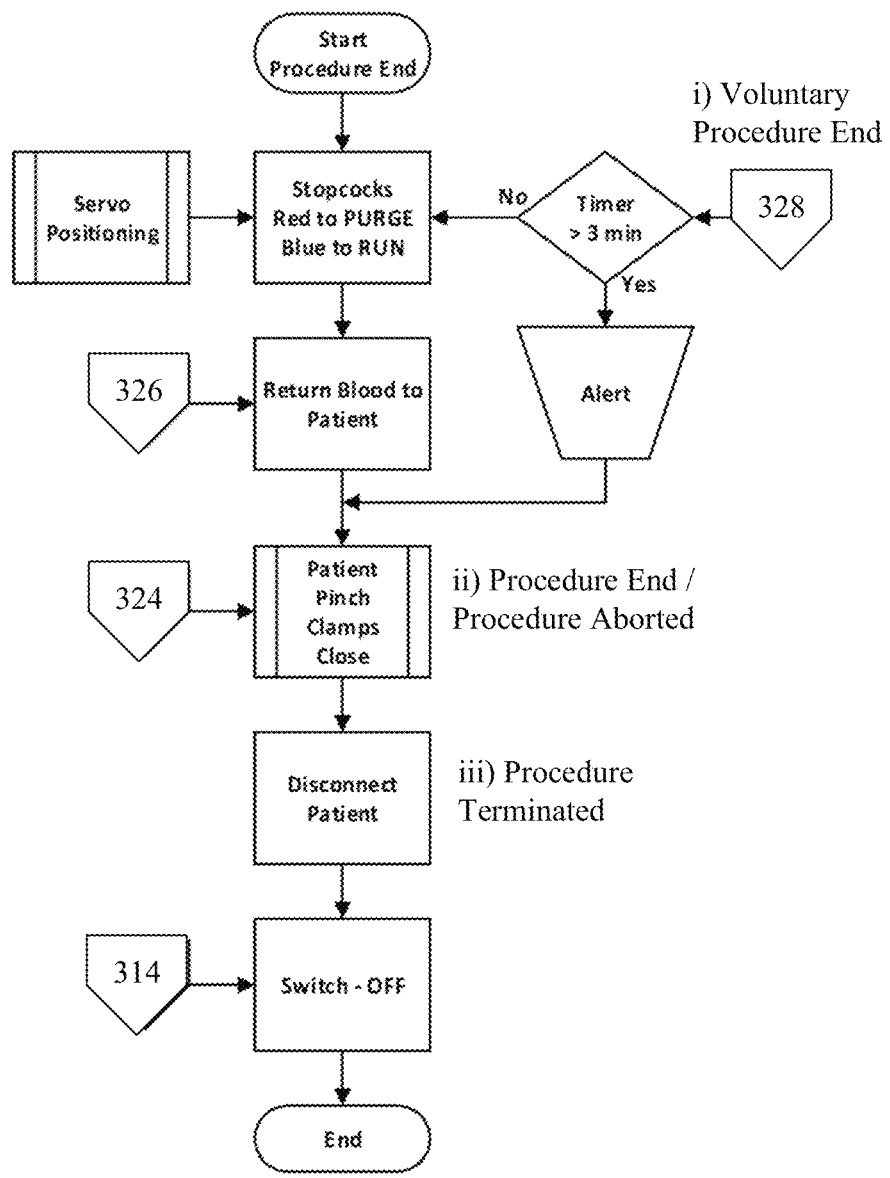
FIG. 21 illustrates a flow diagram of a method for procedure ending of the artificial kidney, in accordance with an example embodiment.

FIG. 21 illustrates a flow diagram of a method for procedure ending of the artificial kidney 100, in accordance with an example embodiment. In an example, there are 3 Procedure End functions:

i) Voluntary Procedure End. Transfer from Procedure Stop or Purge Blood Line, No or Purge REP Line, No or Blood Purge Exhaust or REP Purge Exhaust or Low Battery or Low Blood Flow or Low REP Flow or Voltage Regulator along with the remaining time of the 3-minute Stop Time Exceeded Timer. Blood contained in the disposables is returned to patient. Turn ON/OFF switch 32 to OFF. Inlet manual clamp 50 (inlet cannula) and outlet manual clamp 52 (outlet cannula) are closed. Artificial kidney 100 removed from patient. If during Voluntary Procedure End the timer exceeds 3-minutes, control transfers to Procedure End (Procedure aborted).

ii) Procedure Aborted. Transfer from Stop Time Exceeded. Turn ON/OFF switch 32 to OFF. Inlet manual clamp 50 (inlet cannula) and outlet manual clamp 52 (outlet cannula) are closed. Inlet cannula and outlet cannula disconnected from patient (blood vessel). Artificial kidney 100 removed from patient.

iii) Procedure Terminated. Transfer from Set-Up Mode. Turn ON/OFF switch 32 to OFF. Artificial kidney 100 removed from patient.

Reference is again made to FIG. 20, which illustrates steps taken by the controller 31 in response to an alert event within a set time, e.g. 3 minutes. When there is no blood in the blood circuit 44, the controller 31 can wait indefinitely for a user button press (first button 206 or second button 208) via the user interface device 29. With blood in the blood circuit 44, there is a maximum 3-minute stop limit to press a button (first button 206 or second button 208), or complete a series of user steps, otherwise the controller 31 goes to Procedure End. When the controller 31 is in Standby, a Standby Reminder is provided to the user interface device 29 after a 2-minute wait. If no button is pressed at 3-minutes, the controller 31 exits to Procedure End.

As understood in the art, conventional hemodialysis machines impose a 3-minute stop limit. See, for example, the International standard under International Electrotechnical Commission (IEC) 60601-2-16 Medical electrical equipment, "Part 2-16: Particular requirements for the basic safety and essential performance of hemodialyzers, hemodiafiltration and hemofiltration equipment", May 2018, incorporated herein by reference, which imposes a 3-minute stop limit.

In an example, the controller 31 (artificial kidney 100) has a 3-minute stop limit for any stoppage of the artificial kidney 100 when blood flow is stopped. The 3-minute stop limit is a safety measure to avoid a prolonged stop during which blood clotting could occur and then be undesirably infused into the patient. When the 3-minute time limit is exceeded then the blood pump 20, the replacement fluid pump 38 and the ultrafiltrate pump 23 stop, clamping the blood circuit 44, replacement circuit 17 and ultrafiltrate circuit 4 which stop the respective flows. The controller 31 exits to Stop Time Exceeded Procedure End. When transferred to Voluntary Procedure End, the time remaining is also transferred and the timer 204 continues while blood is returned to the patient. During the 3-minute timer the user interface device 29 displays a countdown from 180 to 0 (seconds) on the timer 204 for the user to know the time remaining.

Referring again to FIGS. 18-20, in various examples, the 3-minute stop limit applies to at least one or all of (some are not shown in FIGS. 18-20):

i) Disposables Replaced. 3-minute timer starts at Disposable Replaced (FIG. 18).

Figure 23:
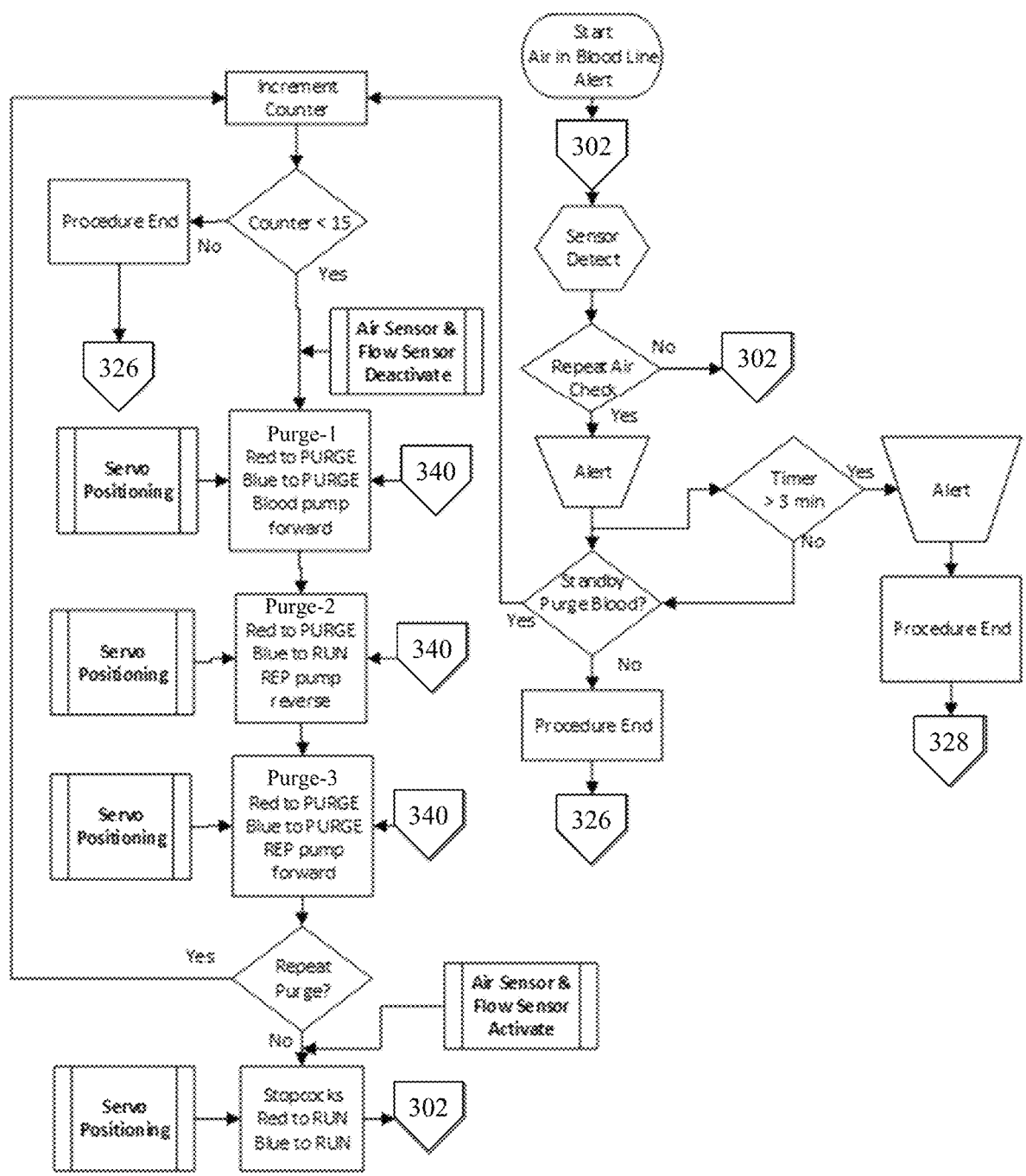
FIG. 23 illustrates a flow diagram of a method for air-in-blood circuit alert of the artificial kidney, in accordance with an example embodiment.

User interface device 29 shows a countdown display on the timer 204. If 3-minutes exceeded goes to Procedure End, turn the ON/OFF switch 32 to Off.

ii) Routine On Procedure. 3-minute timer starts at patient connect (Prepare patient cannulas, FIG. 19), inlet cannula to inlet insert-to-open valve connector 12, outlet cannula to outlet insert-to-open valve connector 56. User interface device 29 shows a countdown display on the timer 204. Remainder of 3-minute timer continues into Start Procedure (FIG. 20). 3-minute timer ends at Start Procedure, Yes. If 3-minute timer is exceeded, exits to Procedure End (Procedure Aborted).

iii) Procedure Stop. 3-minute timer starts at Procedure Stop xxx, Maximum 180 seconds. User interface device 29 shows a countdown display on the timer 204. For Continue button pressed, transfers to Running in FIG. 20 (3-minute timer ends). For End button pressed, transfers to Procedure End (Voluntary Procedure End, remainder of 3-minute timer transfers, FIG. 21). If 3-minute stop time is exceeded, transfers to Procedure End (Procedure aborted) in FIG. 21.

iv) Procedure End (FIG. 21). Option 1: at step 328, remainder of 3-minute timer transfers to Procedure End for Voluntary Procedure End, followed by Return blood to patient if within 3-minute timer. User interface device 29 shows a countdown display on the timer 204. If 3-minute timer exceeded during Procedure End (Voluntary Procedure End), then transfers to the Procedure Aborted, as there is no time for blood return to patient (then Patient Pinch Clamps are closed). Option 2: at step 324, directly to the Procedure Aborted, as there is no time remaining for blood return to patient (then Patient Pinch Clamps are closed).

v) Low Blood Flow alert (FIG. 20, step 304). Stop Time Exceeded timer starts at when Low Blood Flow alert is activated. User interface device 29 shows a countdown display on the timer 204. For Low Blood Flow Standby, Continue button pressed, transfers to Running in FIG. 20 (3-minute timer ends). For Low Blood Flow Standby, if the 3-minute timer is exceeded, transfers to Procedure End (Procedure Aborted) in FIG. 21.

vi) Air In Blood Line alert (FIG. 20, step 302). 3-minute timer starts at Air In Blood Line alert. User interface device 29 shows a countdown display on the timer 204. For "Air In Blood Line, Standby Mode Exit To Purge Blood," Exit button pressed, the remainder of the 3-minute timer transfers to Purge Blood Line (remainder of 3-minute timer continues) in FIG. 23. If 3-minute timer exceeded, transfers to Procedure End, (Procedure Aborted) in FIG. 21.

vii) Purge Blood Line (FIG. 23). The remainder of the 3-minute timer continues from Air In Blood Line alert. User interface device 29 shows a countdown display on the timer 204. "Exit To Running?", Exit button pressed, transfers to Running in FIG. 20 (3-minute timer ends). If 3-minute timer exceeded, transfers to Procedure End, (Procedure Aborted) in FIG. 21. Includes Purge of replacement fluid circuit 17.

viii) Low Battery alert (FIG. 20, step 312). 3-minute timer starts when Low Battery alert activated. User interface device 29 shows a countdown display on the timer 204. For Low Battery Standby, End button pressed, the remainder of 3-minute timer transfers to Procedure End (voluntary procedure end, FIG. 21). If 3-minute timer exceeded, transfers to Procedure End, (Procedure Aborted) in FIG. 21.

ix) Fail Motor Voltage (FIG. 20, step 306). 3-minute timer starts at Fail Motor Voltage alert activated. User interface device 29 shows a countdown display on the timer 204. For Check Blockage? Standby Mode, Done button pressed, transfers to where transfer occurred (3-minute timer ends). For "Check Blockage?" Standby Mode, End button pressed, transfers to Procedure End (Voluntary Procedure End, FIG. 21, remainder of 3-minute timer continues). If 3-minute timer exceeded, transfers to Procedure End, (Procedure Aborted) in FIG. 21.

x) Multiple Alerts alert (FIG. 20, step 310). The timer 204 starts at Multiple Alerts activated. User interface device 29 shows a countdown display on the timer 204. For Multiple Errors, go to Procedure End (FIG. 21), End button pressed, transfers to Procedure End (Voluntary Procedure End, FIG. 21, remainder of 3-minute timer continues).

xi) Ultrafiltrate Bag Full alert (400 mL) (FIG. 20, step 302). The timer 204 starts at UF Bag Full alert activated. User interface device 29 shows a countdown display on the timer 204. For Empty Ultrafiltrate Bag Standby Mode, Done button pressed, transfers to Running in FIG. 20 (3-minute timer ends). If 3-minute timer exceeded, transfers to Procedure End, (Procedure Aborted) in FIG. 21.

xii) Low REP Flow alert (FIG. 20, step 320). Stop Time Exceeded timer starts at when Low REP Flow alert is activated. User interface device 29 shows a countdown display on the timer 204. For Low REP Flow Standby, Continue button pressed, transfers to Running in FIG. 20 (3-minute timer ends). For Low REP Flow Standby, if the 3-minute timer is exceeded, transfers to Procedure End (Procedure Aborted) in FIG. 21.

xiii) REP Bag Empty alert (FIG. 20, step 322). User interface device 29 shows a countdown display on the timer 204. 3-minute time starts when REP Bag Empty alert is activated.

Figure 22:
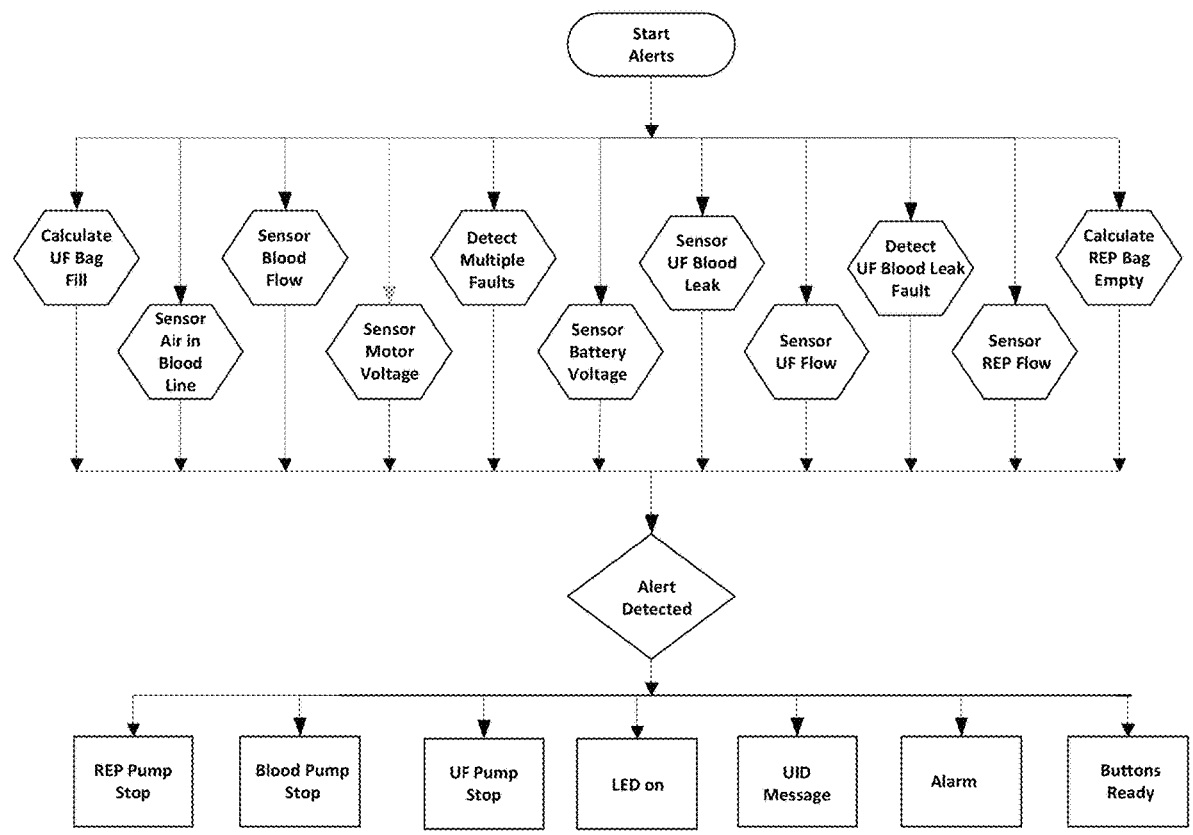
FIG. 22 illustrates a flow diagram of a method for alert event detection of the artificial kidney, in accordance with an example embodiment.

FIG. 22 illustrates a flow diagram of a method for alert event detection of the artificial kidney 100, in accordance with an example embodiment. When an alert event is detected, in some examples, the blood pump 20, the replacement fluid pump 38 and ultrafiltrate pump 23 automatically stop which clamps the blood circuit 44, replacement circuit 17 and ultrafiltrate circuit 4 to stop the flows, or the procedure ends. A message is displayed on the user interface device 29 and an audible alarm is activated. The control sequence in FIG. 22 illustrates the alert events that can be detected and the actions. The alert events shown in FIG. 20 with double arrow heads allow return to RUNNING. Single arrow heads automatically transfer to Procedure End (FIG. 21).

FIG. 23 illustrates a flow diagram of a method for air-in-blood circuit alert of the artificial kidney 100, in accordance with an example embodiment. The Procedure Running (FIG. 20) can be interrupted by the Air-in-Blood Line alert. The air detector 22 control sequence has detected air in the blood circuit 44. The blood pump 20, ultrafiltrate pump 23, and replacement fluid pump 38 stop automatically and immediately and clamp the respective circuits. Based on experimentation, a micro air bubble (0.005 mL) that is less than the internal diameter of the tubing in the blood circuit 44, detected at the air detector 22 would float upward and enter the patient before it could be Purged. This extremely small air bubble is insignificant. Any air that contacts the inside diameter of the tubing remains is stopped within the tubing in the blood circuit 44 at the air detector 22. To avoid unnecessary purge procedures caused by micro air bubbles, a Repeat Air Check (e.g. 5 seconds) of the air detector 22 is implemented before the AIR IN BLOOD LINE alert is activated. After the check (5 seconds), if no air is detected then RUNNING continues. If after the check air is detected, then the AIR IN BLOOD LINE alert is activated.

In an example, the PURGE mode in FIG. 23 can be performed as follows:

Perform Purge-1: Air before the blue stopcock 9 is removed to the waste circuit 15.

Perform Purge-2: Any air within the blood outlet circuit 3 is extracted to replacement fluid circuit 17.

Perform Purge-3: Any air in the replacement fluid circuit 17 is removed to waste.

A continuous alarm is sounded and the user interface device 29 displays (messages) AIR IN BLOOD LINE. The user can silence the alarm. Control is transferred to "AIR IN BLOOD LINE STANDBY MODE", "EXIT" to Purge blood. The user selects to perform one or more saline purges (transfer to Saline Purge) to remove the air or to Procedure End (Procedure aborted) in FIG. 21. The user is guided through the steps by prompts/responses. The blood inlet stopcock 10 and blood outlet stopcock 9 are servo-positioned. In an example, a limit of 15 purges are allowed for an entire dialysis procedure. In an example, during a purge, some alerts (Air-in-Blood Line, Low blood Flow, low REP flow) are inactive to avoid annoyance. A 3-minute Stop Time Exceeded timer is activated at the beginning of the alert and continues through the saline purge until the user selects to return to Running. If the timer exceeds 3-minutes, control is transferred to Procedure End (Procedure Aborted) in FIG. 21. If the user selects No to "Purge Blood Line?" control transfers to Procedure End in FIG. 21. If user selects No to Repeat Purge control returns to Running in FIG. 20.

Figure 24:
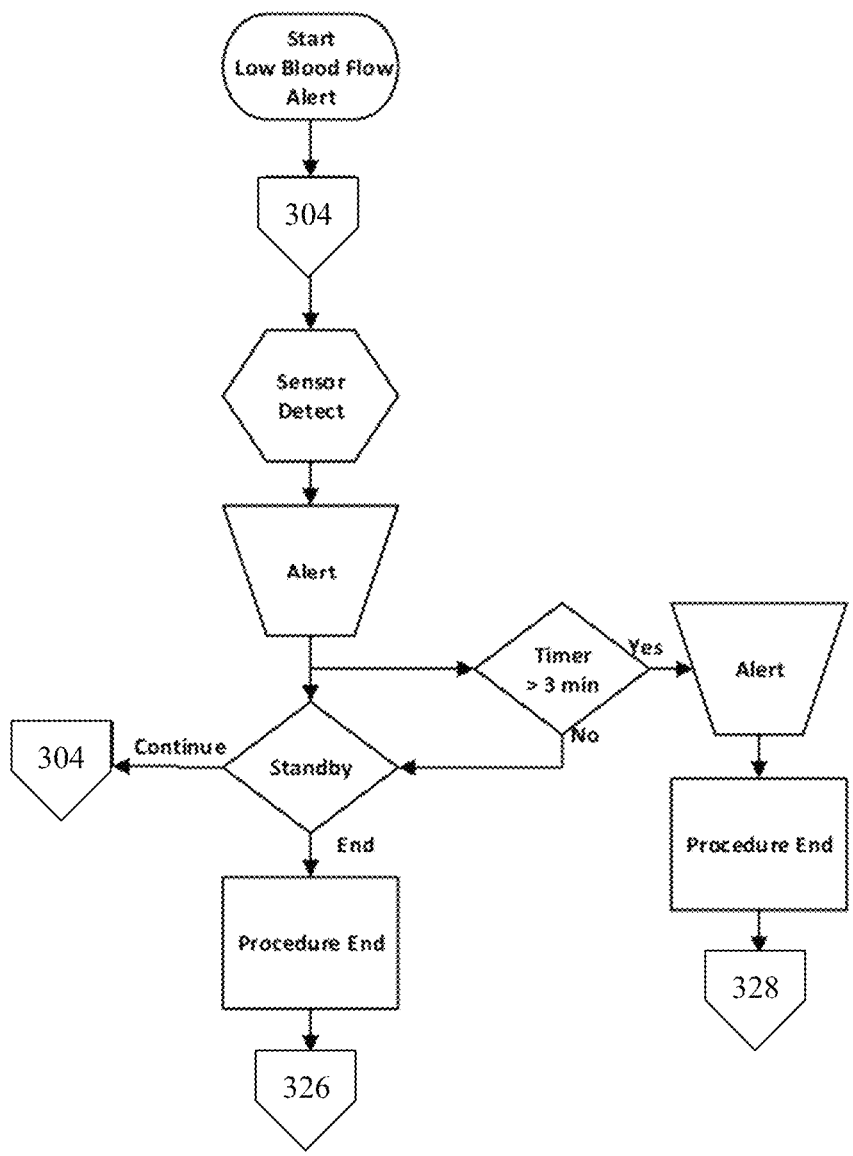
FIG. 24 illustrates a flow diagram of a method for low blood flow alert of the artificial kidney, in accordance with an example embodiment.

FIG. 24 illustrates a flow diagram of a method for low blood flow alert of the artificial kidney 100, in accordance with an example embodiment. In an example, the flow in the blood circuit 44 is detected by the blood flow sensor 21 to be less than e.g. 30 mL/min (normal is e.g. 50 mL/min). The blood pump 20, the replacement fluid pump 38 and ultrafiltrate pump 23 stop automatically and immediately clamp the respective circuits. A continuous alarm is sounded. The user can silence the alarm. Control is transferred to Low Blood Flow Standby allowing the user to check and perhaps resolve a problem. Possible causes are blood pump 20 stopped or running slow (user ends the procedure), a failure of one of the disposable components 500 allowing blood leak (potential for serious consequences) or the blood outlet stopcock 9 is incorrectly positioned at PURGE (blood diverted into waste circuit 15 and waste bag 8). After 2-minutes if no button selected, the user is reminded that they are in standby. A 3-minute Stop Time Exceeded timer is activated at the beginning of the alert and continues until the user selects to return to Procedure Running (FIG. 20). If the timer exceeds 3-minutes, control is transferred to Procedure End (Procedure Aborted) in FIG. 21. When the user selects Continue, control is returned to Procedure Running (FIG. 20).

Figure 25:
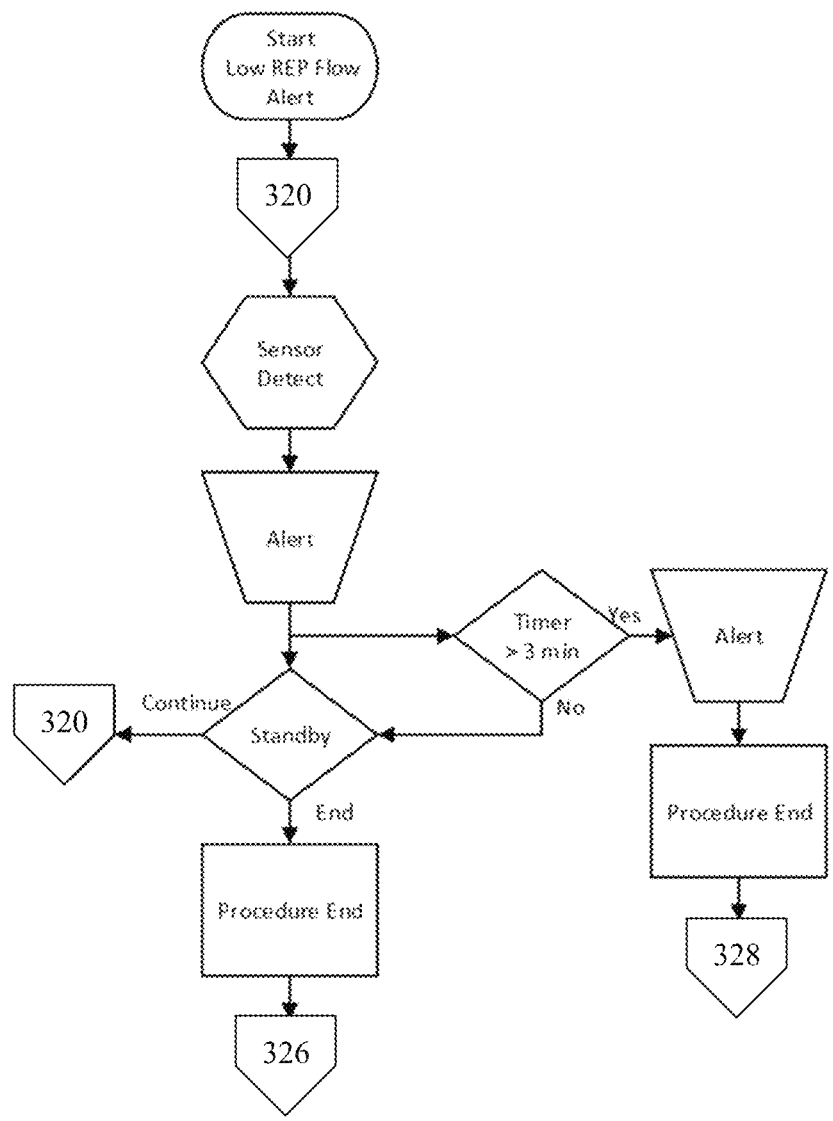
FIG. 25 illustrates a flow diagram of a method for low replacement fluid flow alert of the artificial kidney, in accordance with an example embodiment.

FIG. 25 illustrates a flow diagram of a method for low replacement fluid flow alert of the artificial kidney 100, in accordance with an example embodiment. The flow in the replacement fluid circuit 17 is less than e.g. 80% of a flow rate of the replacement fluid pump 38 selected by user. The blood pump 20, and ultrafiltrate pump 23 and replacement fluid pump 38 stop immediately and clamp the respective circuits. A continuous alarm is sounded. The user can silence the alarm. Control is transferred to Low REP Flow Standby allowing the user to check and perhaps resolve a problem. Possible causes are replacement fluid pump 38 stopped or running slow (user ends the procedure) or a failure of one of the disposable components 500 causing replacement fluid leak. After 2-minutes if no button selected, the user is reminded that they are in standby. A 3-minute Stop Time Exceeded timer is activated at the beginning of the alert and continues until the user selects to return to Procedure Running (FIG. 20). If the timer exceeds 3-minutes, control is transferred to Procedure End (Procedure Aborted) in FIG. 21. When the user selects Continue, control is returned to Procedure Running (FIG. 20).

Figure 26:
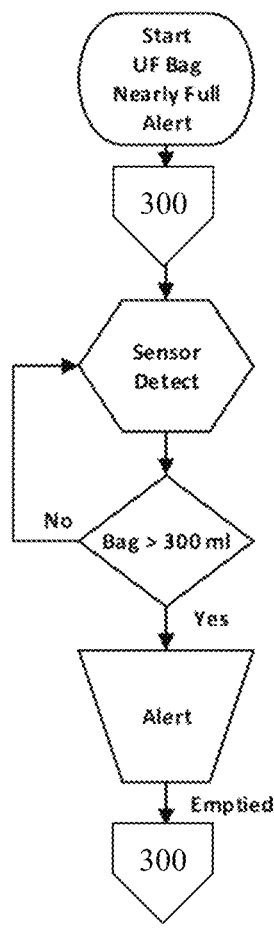
FIG. 26 illustrates a flow diagram of a method for ultrafiltrate bag nearly full alert of the artificial kidney, in accordance with an example embodiment.

FIG. 26 illustrates a flow diagram of a method for ultrafiltrate bag nearly full alert of the artificial kidney 100, in accordance with an example embodiment. In an example, ultrafiltrate bag 5 has reached e.g. 300 mL (maximum volume is e.g. 400 mL). A continuous alarm is sounded and the user interface device 29 displays (messages) Empty UF Bag, Nearly full. Procedure Running continues uninterrupted. The user can silence the alarm and either ignore the warning or empty the ultrafiltrate bag 5. When button pressed for Emptied the Ultrafiltrate Bag Fill volume is reset to zero.

Figure 27:
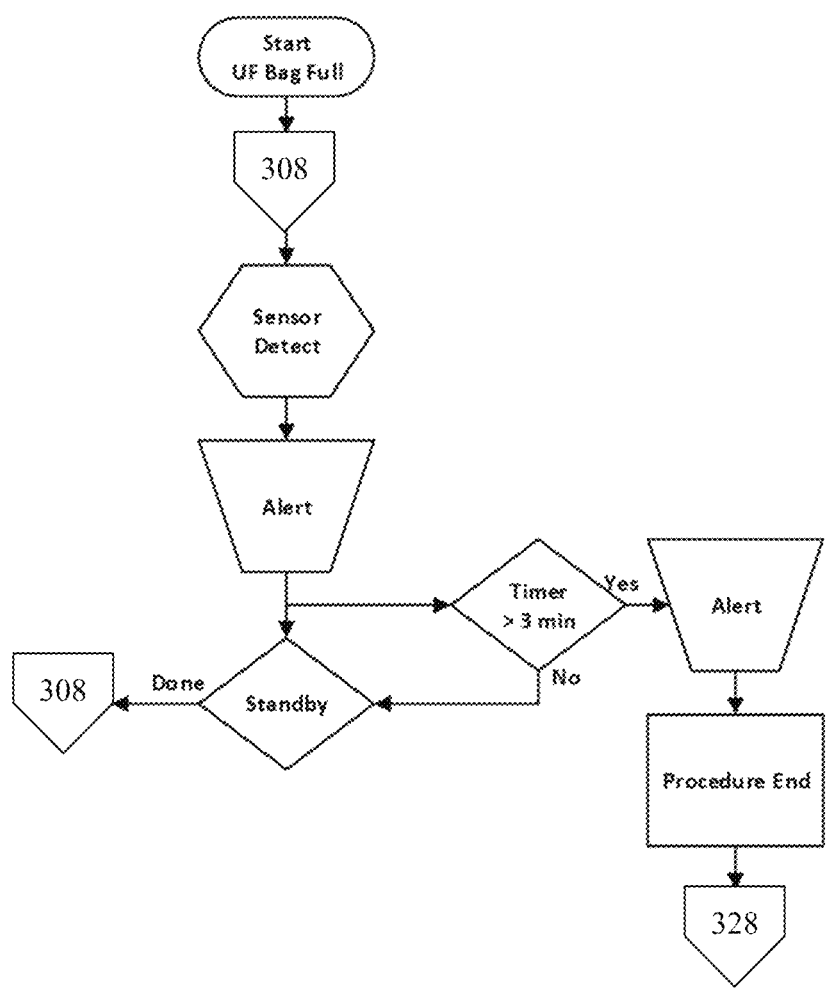
FIG. 27 illustrates a flow diagram of a method for ultrafiltrate bag full alert of the artificial kidney, in accordance with an example embodiment.

FIG. 27 illustrates a flow diagram of a method for ultrafiltrate bag full alert of the artificial kidney 100, in accordance with an example embodiment. In an example, the ultrafiltrate collection bag has reached maximum volume e.g. 400 mL. The blood pump 20, the replacement fluid pump 38, and ultrafiltrate pump 23 stop automatically and immediately and clamp the respective circuits. A continuous alarm is sounded and the user interface device 29 displays (messages) UF Bag Full. The user can silence the alarm. Control is transferred to Empty UF Bag, Standby Mode. After 2-minutes if no button selected, the user is reminded that they are in standby. A 3-minute Stop Time Exceeded timer is activated at the beginning of the alert and continues until the user selects to return to Procedure Running (FIG. 20). If the timer exceeds 3-minutes, control is transferred to Procedure End (Procedure Aborted) in FIG. 21. When the user selects Done (i.e. bag emptied), control is transferred to Procedure Running (FIG. 20). The volume of the Ultrafiltrate Bag Fill is reset to zero.

Figure 28:
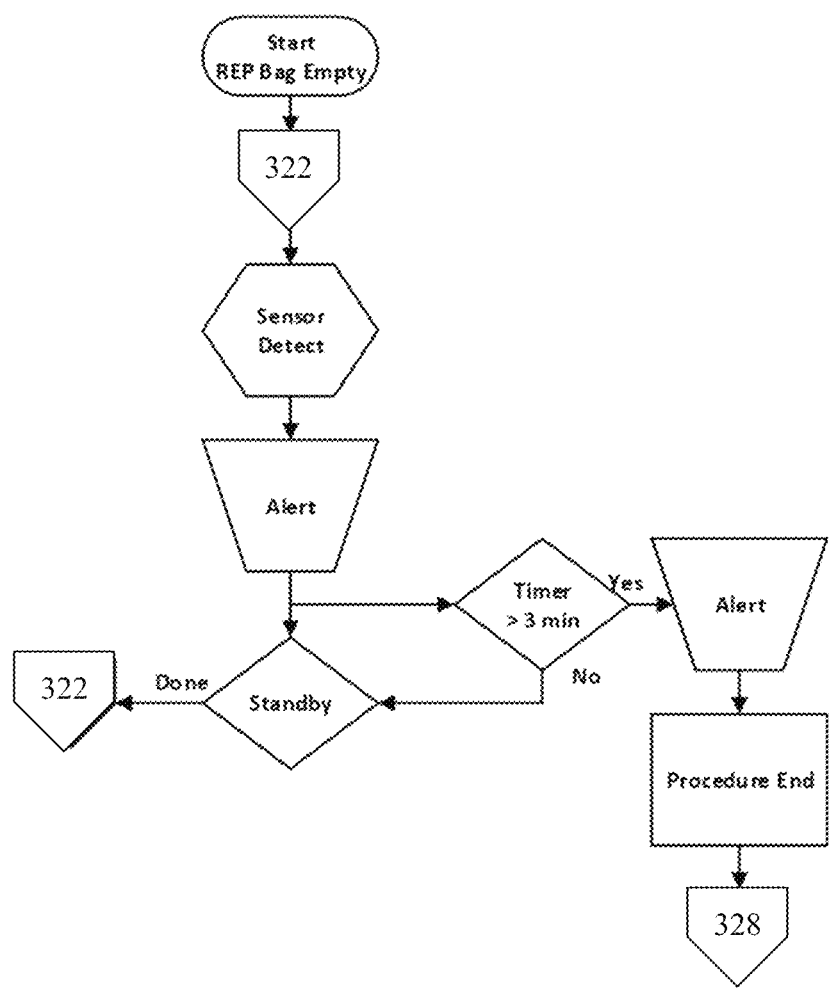
FIG. 28 illustrates a flow diagram of a method for replacement fluid bag empty alert of the artificial kidney, in accordance with an example embodiment.

FIG. 28 illustrates a flow diagram of a method for replacement fluid bag empty alert of the artificial kidney 100, in accordance with an example embodiment. In an example, the replacement fluid bag 18 has reached maximum volume e.g. 500 ml. The blood pump 20 and ultrafiltrate pump 23 continue. The replacement fluid pump 38 stops. A continuous alarm is sounded and the user interface device 29 displays (messages) REP Bag Empty. The user can silence the alarm. Control is transferred to Replace REP Bag, Standby Mode. After 2-minutes if no button selected, the user is reminded that they are in standby. A 3-minute Stop Time Exceeded timer is activated at the beginning of the alert and continues until the user selects to return to Procedure Running (FIG. 20). If the timer exceeds 3-minutes, control is transferred to Procedure End (Procedure Aborted) in FIG. 21. When the user selects Done (i.e. bag replaced), control is transferred to replacement fluid PURGE (e.g., FIG. 14).

Figure 29:
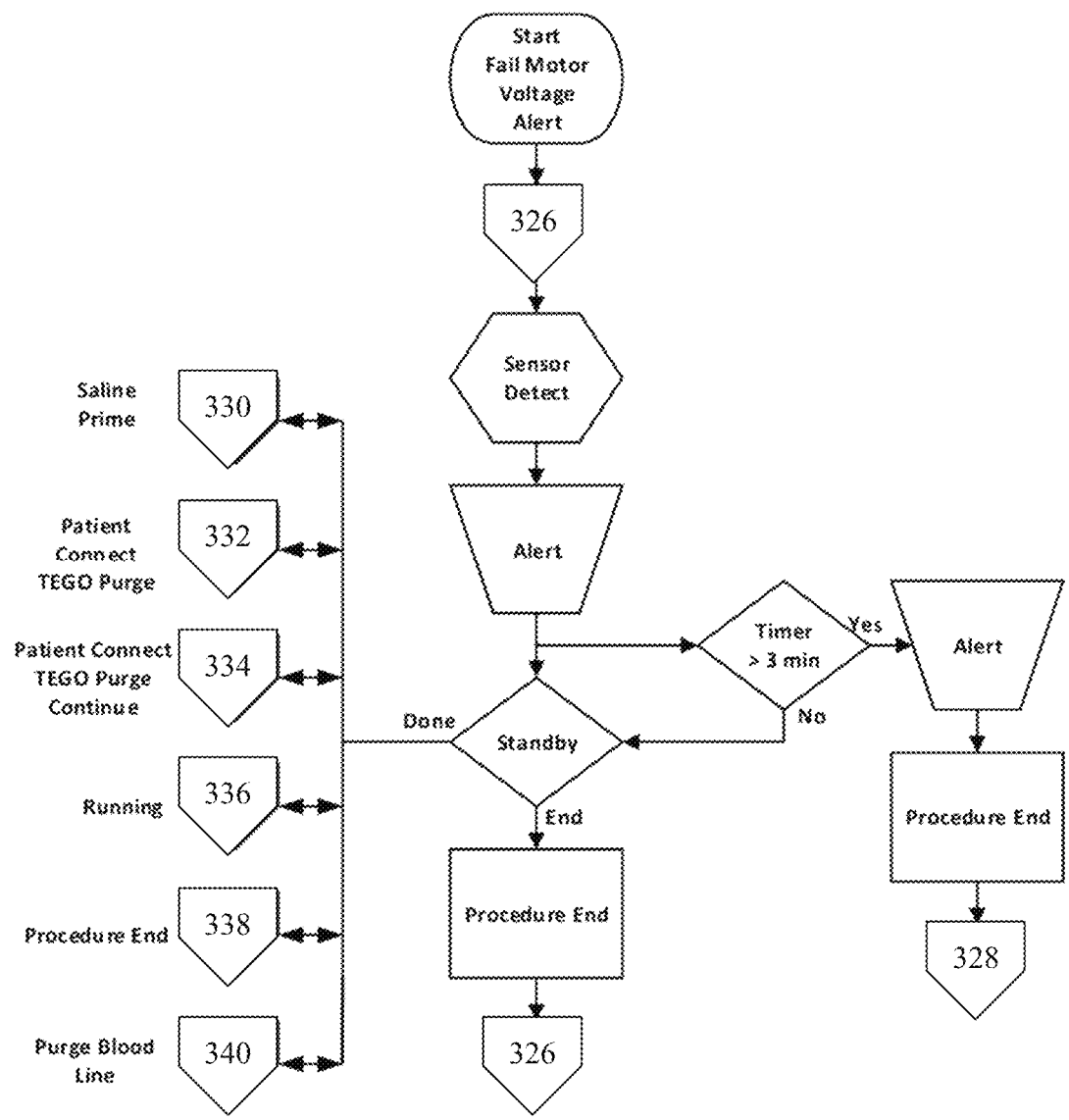
FIG. 29 illustrates a flow diagram of a method for fail motor voltage alert of the artificial kidney, in accordance with an example embodiment.

FIG. 29 illustrates a flow diagram of a method for fail motor voltage alert of the artificial kidney 100, in accordance with an example embodiment. In an example, a problem with the voltage regulator 30 has occurred. The blood pump 20, the replacement fluid pump 38, and ultrafiltrate pump 23 stop automatically and immediately and clamp the respective circuits. A continuous alarm is sounded and the user interface device 29 displays (messages) Fail Motor Voltage. The user can silence the alarm. Control is transferred to Fail Motor Voltage, Standby Mode. After 2-minutes if no button selected, the user is reminded that they are in standby. A 3-minute Stop Time Exceeded timer is activated at the beginning of the alert and continues until the user selects Done or End. If the timer exceeds 3-minutes, control is transferred to Procedure End (Procedure Aborted) in FIG. 21. When the user selects Done, control is transferred to the origin of the alert:

330—Saline Prime—Press START Saline Prime.
    332—Patient Connect—Arterial TEGO (inlet insert-to-open valve connector 12) Purge.
    334—Patient Connect—Arterial TEGO (inlet insert-to-open valve connector 12) Purge, Continue (10 sec).
    336—Procedure Running-Running, Bag fill: xxx mL, Time: xxx min.
    338—Procedure End—Blood Return Start? Yes.
    340—Purge Blood Line—Purge Blood Line? Yes/No.

When the user selects End, control is transferred to Procedure End (Voluntary Procedure End) in FIG. 21 along with the remainder of the 3-minute Stop Time Exceeded timer.

Figure 30:
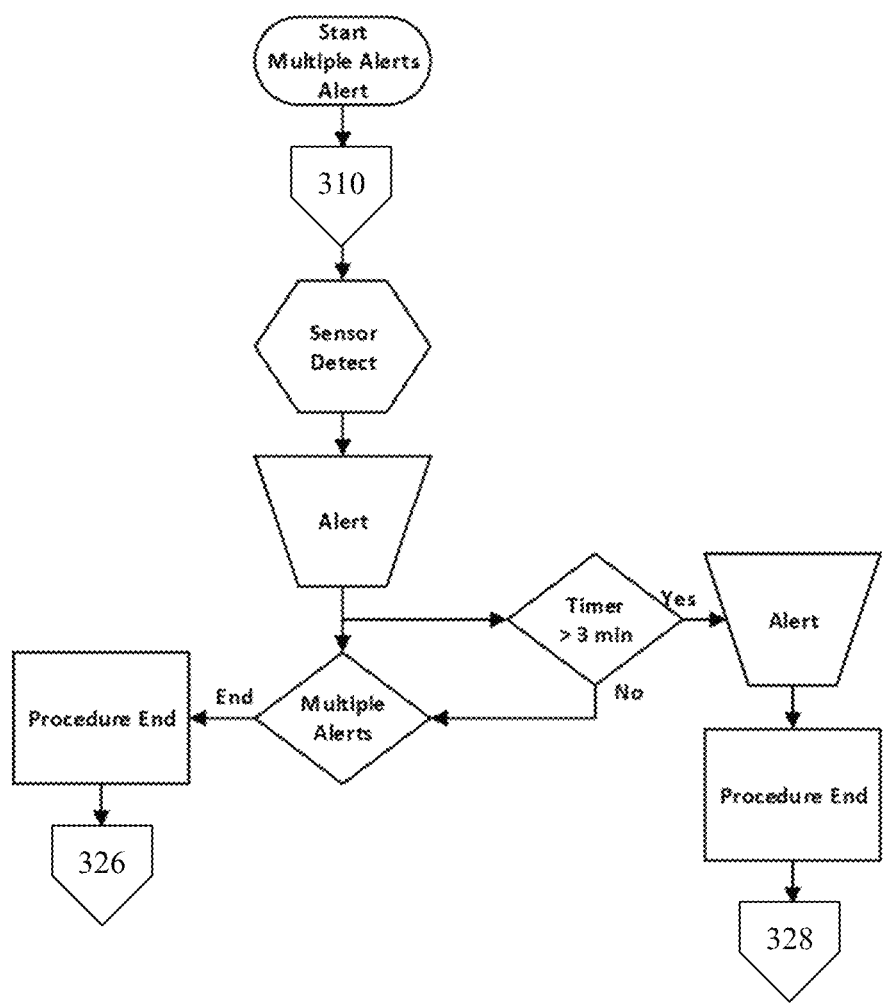
FIG. 30 illustrates a flow diagram of a method for multiple alerts of the artificial kidney, in accordance with an example embodiment.

FIG. 30 illustrates a flow diagram of a method for multiple alerts of the artificial kidney 100, in accordance with an example embodiment. Multiple alerts is detected when more than one alert event has occurred at the same time (or within the set time, 3 minutes). The blood pump 20, the replacement fluid pump 38, and ultrafiltrate pump 23 stop automatically and immediately and clamp the respective circuits. A continuous alarm is sounded and the user interface device 29 displays (messages) Multiple Errors, Procedure End. When the user selects End, control is transferred to Procedure End (Voluntary Procedure End) in FIG. 21 along with the remainder of the 3-minute Stop Time Exceeded timer.

Figure 31:
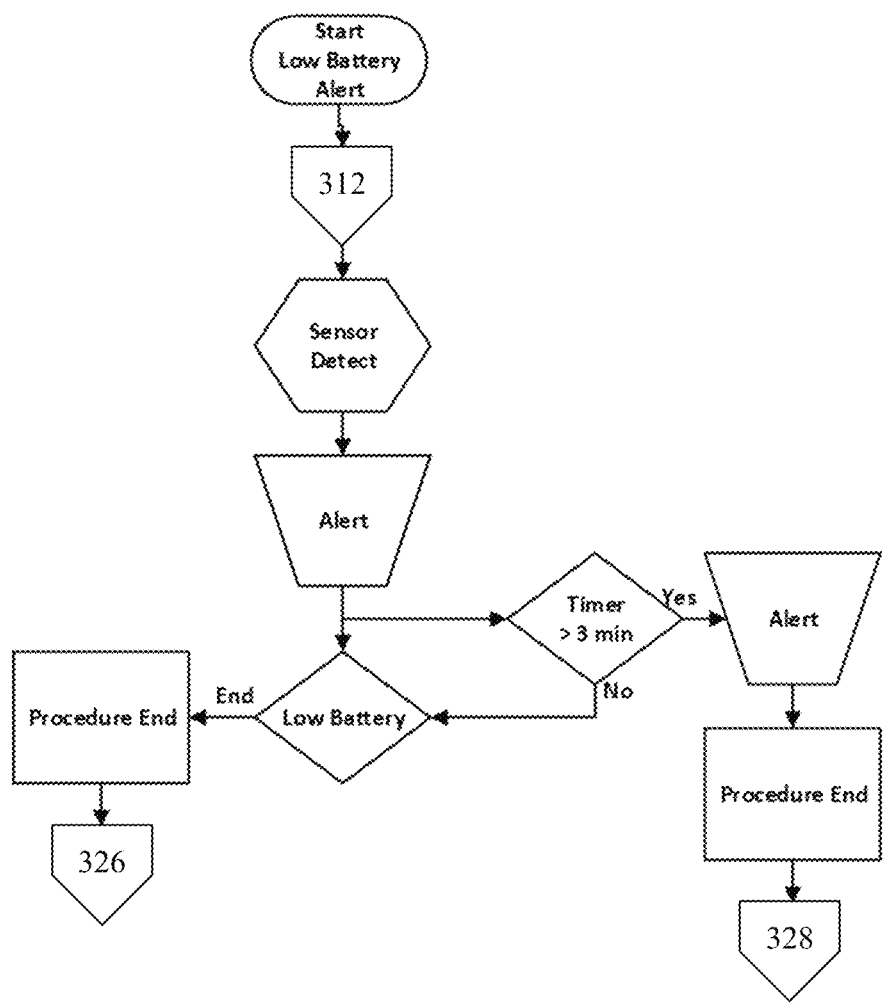
FIG. 31 illustrates a flow diagram of a method for low battery alert of the artificial kidney, in accordance with an example embodiment.

FIG. 31 illustrates a flow diagram of a method for low battery alert of the artificial kidney 100, in accordance with an example embodiment. For example, the batteries 41 are almost depleted. The low battery alert is active during Switch ON and RUNNING. In response, the procedure ends so that the user can replace the battery pack. A 3-minute time limit on the timer allows the user to begin the process of disconnecting the patient inlet cannula and outlet cannula. During RUNNING the blood pump 20, the replacement fluid pump 38, and ultrafiltrate pump 23 stop automatically and immediately and clamp the respective circuits. A continuous alarm is sounded and the user interface device 29 displays (messages) Low Battery. Control is transferred to Low Battery Standby. After 2-minutes if no button selected, the user is reminded that they are in standby. A 3-minute Stop Time Exceeded timer is activated at the beginning of the alert and continues until the user selects End. If the timer exceeds 3-minutes control transfers to Procedure End (Procedure Aborted) in FIG. 21. When user selects End control is transferred to Procedure End (Voluntary Procedure End) in FIG. 21 along with the remainder of 3-minute Stop Time Exceeded timer.

Figure 32:
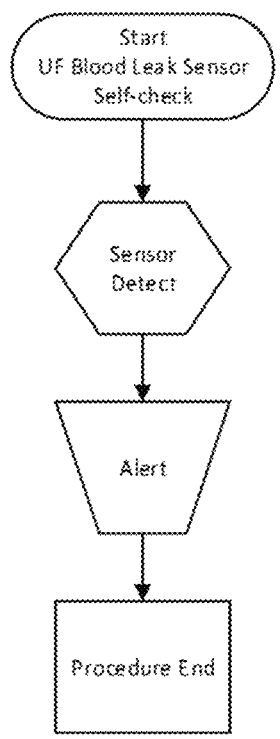
FIG. 32 illustrates a flow diagram of a method for ultrafiltrate blood leak detector failure self-test alert of the artificial kidney, in accordance with an example embodiment.

FIG. 32 illustrates a flow diagram of a method for ultrafiltrate blood leak detector failure self-test alert of the artificial kidney 100, in accordance with an example embodiment. In an example, a self-checking feature of the blood detector 35 for the ultrafiltrate circuit 4 has detected a fault. The blood pump 20, the replacement fluid pump 38, and ultrafiltrate pump 23 stop automatically and immediately and clamp the respective circuits. A continuous alarm is sounded and the user interface device 29 displays (messages) UF BLOOD LEAK FAIL, CONTACT HELP. Since there is typically no immediate recovery from this failure, transfers automatically to Procedure End (aborted) in FIG. 21.

Figure 33:
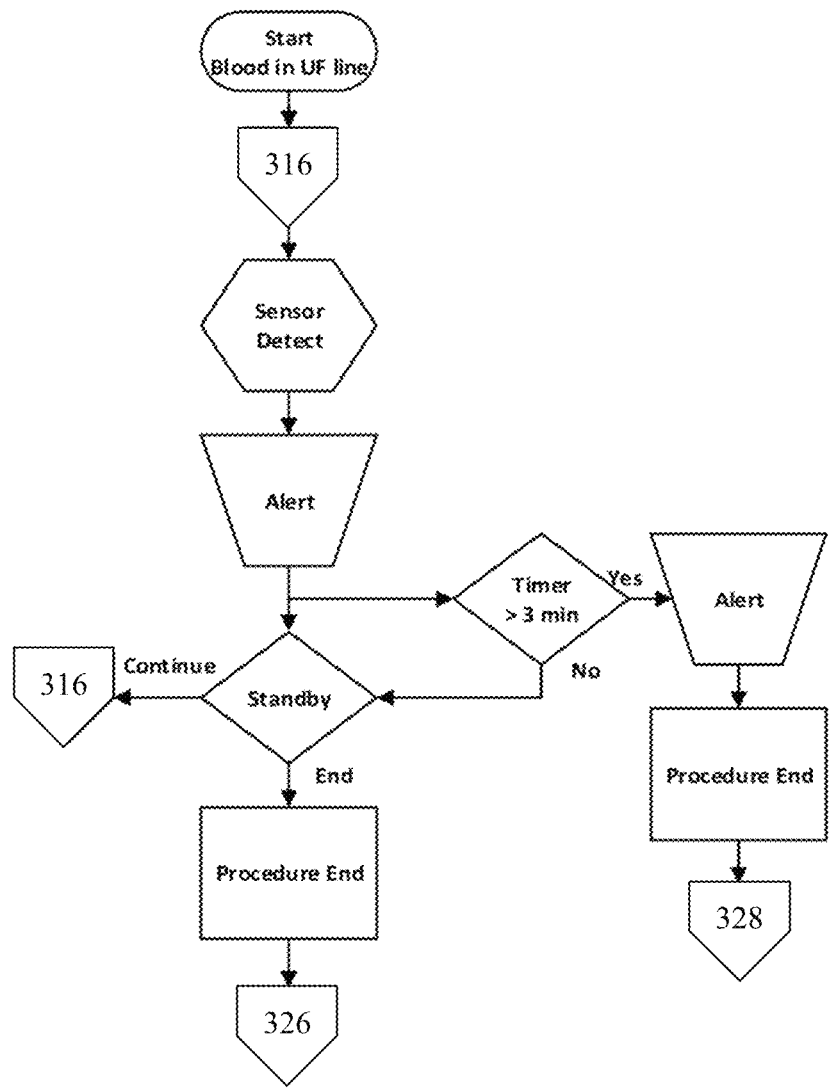
FIG. 33 illustrates a flow diagram of a method for ultrafiltrate circuit blood leak alert of the artificial kidney, in accordance with an example embodiment.

FIG. 33 illustrates a flow diagram of a method for ultrafiltrate circuit blood leak alert of the artificial kidney 100, in accordance with an example embodiment. In an example, blood in the ultrafiltrate circuit 4 has been detected by the blood detector 35 indicating that the hemofilter 1 is leaking blood. The blood pump 20 and ultrafiltrate pump 23 stop automatically and immediately and clamp the respective circuits. A continuous alarm is sounded and the user interface device 29 and which displays (messages) Blood in UF line. Control is transferred to Blood UF STANDBY. After 2-minutes if no button selected, the user is reminded that they are in standby. A 3-minute Stop Time Exceeded timer is activated at the beginning of the alert and continues until the user selects End. If the timer exceeds 3-minutes control transfers to Procedure End (Procedure Aborted) in FIG. 21. When user selects End control is transferred to Procedure End (Voluntary Procedure End) in FIG. 21, along with the remainder of 3-minute Stop Time Exceeded timer.

Figure 34A:
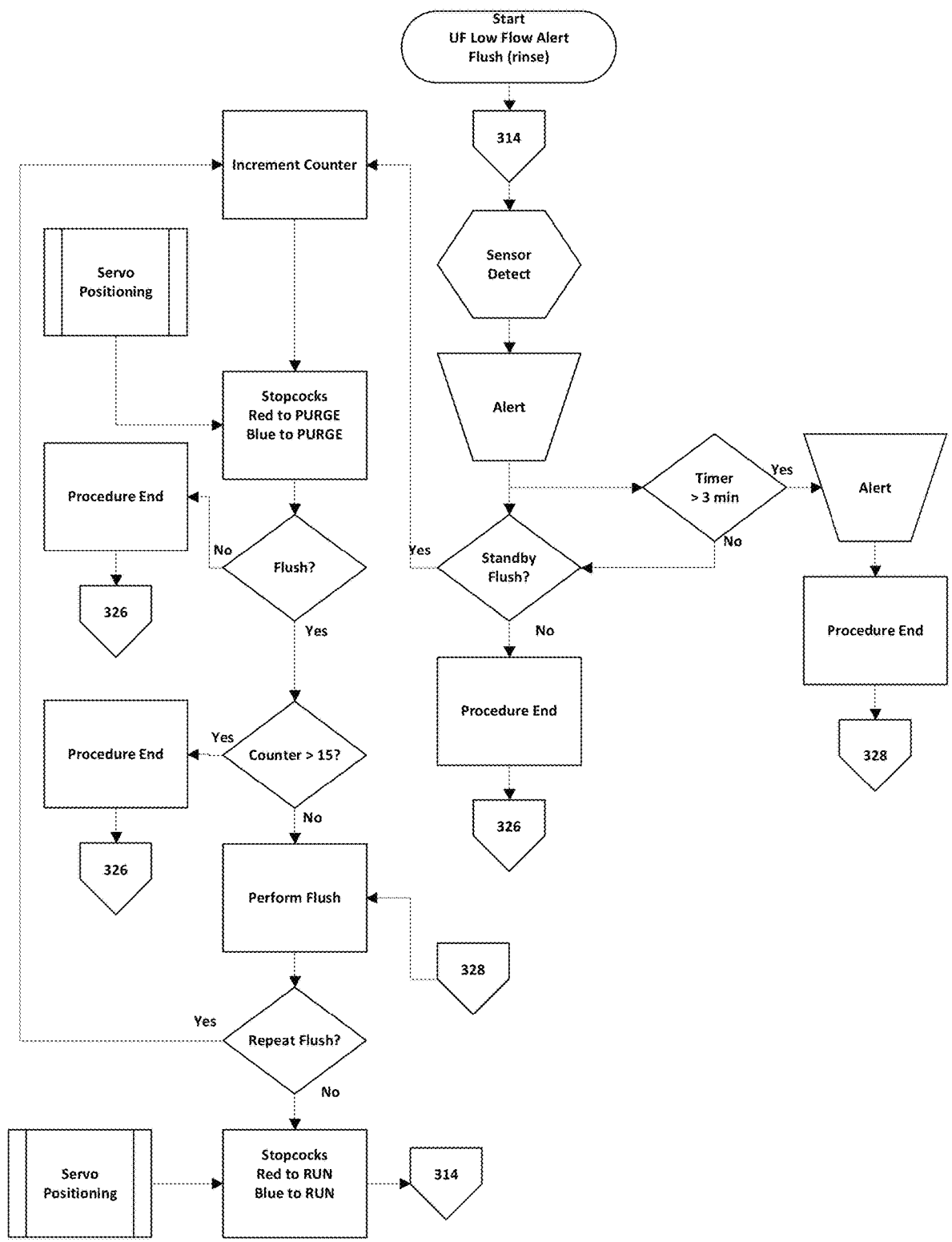
FIG. 34A illustrates a flow diagram of a first example method for ultrafiltrate low flow alert with hemofilter flush of the artificial kidney, with forward flush, in accordance with an example embodiment.

FIG. 34A illustrates a flow diagram of Flush-1, illustrating a method for ultrafiltrate low flow alert with hemofilter FLUSH of the artificial kidney 100, with forward flush, in accordance with an example embodiment. In an example, low flow in the ultrafiltrate circuit 4 is detected by the ultrafiltrate flow sensor 34. Possible causes are: the ultrafiltrate pump 23 has failed or there is air in the ultrafiltrate circuit 4 (indicates connector leak), or the hemofilter 1 has become plugged (partial, full). A continuous alarm is sounded and the user interface device 29 displays (messages) LOW UF FLOW. The user can silence the alarm. The blood pump 20, the replacement fluid pump 38, and ultrafiltrate pump 23 stop automatically and immediately and clamp the respective circuits. Control is transferred to "STANDBY FLUSH?". The user chooses either Yes (proceeds to Increment Counter) or No (proceeds to Voluntary Procedure End in FIG. 21). After 2-minutes if no button selected, the user is reminded that they are in standby. A 3-minute Stop Time Exceeded timer is activated at the beginning of the alert and continues until the user selects to return to Procedure Running (FIG. 29). If the timer exceeds 3-minutes, control is transferred to Procedure End (Procedure Aborted) in FIG. 21. The user selects YES to perform FLUSH then one or more saline flushes can be performed. If the user select NO to perform a FLUSH then control transfers to PROCEDURE END (Voluntary Procedure End) in FIG. 21. In an example, a specified limit such as 15 purges and flushes is allowed for a procedure. During a flush some alerts are inactive to avoid annoyance alarms. When the user selects NO to perform another FLUSH then control transfers to Procedure Running (FIG. 20).

Figure 34B:
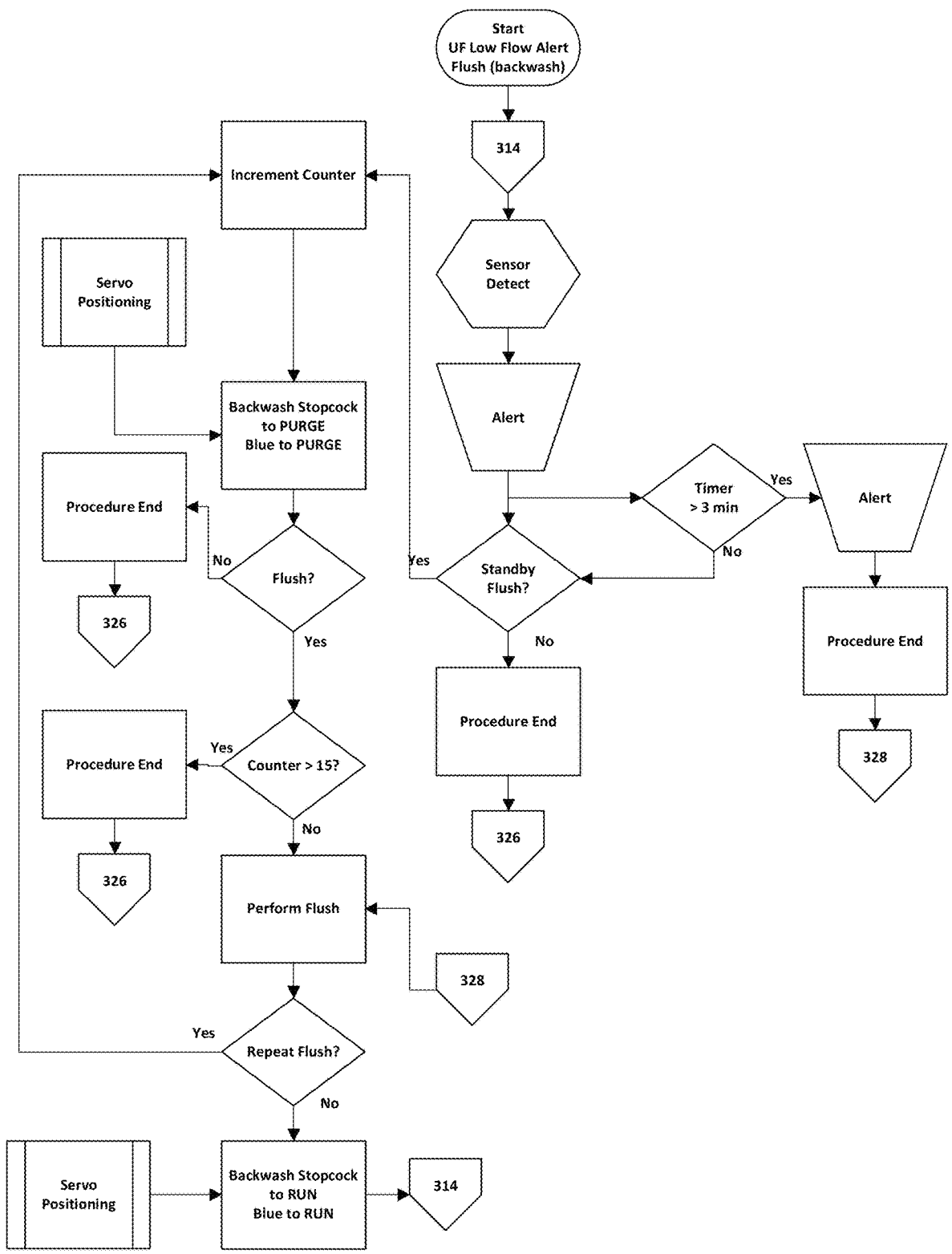
FIG. 34B illustrates a flow diagram of a second example method for ultrafiltrate low flow alert with hemofilter flush of the artificial kidney, with backwash flush, in accordance with an example embodiment.

FIG. 34B illustrates a flow diagram of Flush-2, illustrating a method for ultrafiltrate low flow alert with hemofilter FLUSH of the artificial kidney 100, with backwash flush, in accordance with an example embodiment. Typically, one of Flush-1 or Flush-2 are performed at a time, not both simultaneously. In Flush-2, the backwash stopcock 502 is servo-positioned to FLUSH, and creates a passage from the replacement fluid circuit 17 through the backwash circuit 504 to the hemofilter 1 for backwashing of the hemofilter. (as in FIG. 17B) The remainder of the Flush-2 procedure and triggers are similar to Flush-1 in FIG. 34A.

Figure 35:
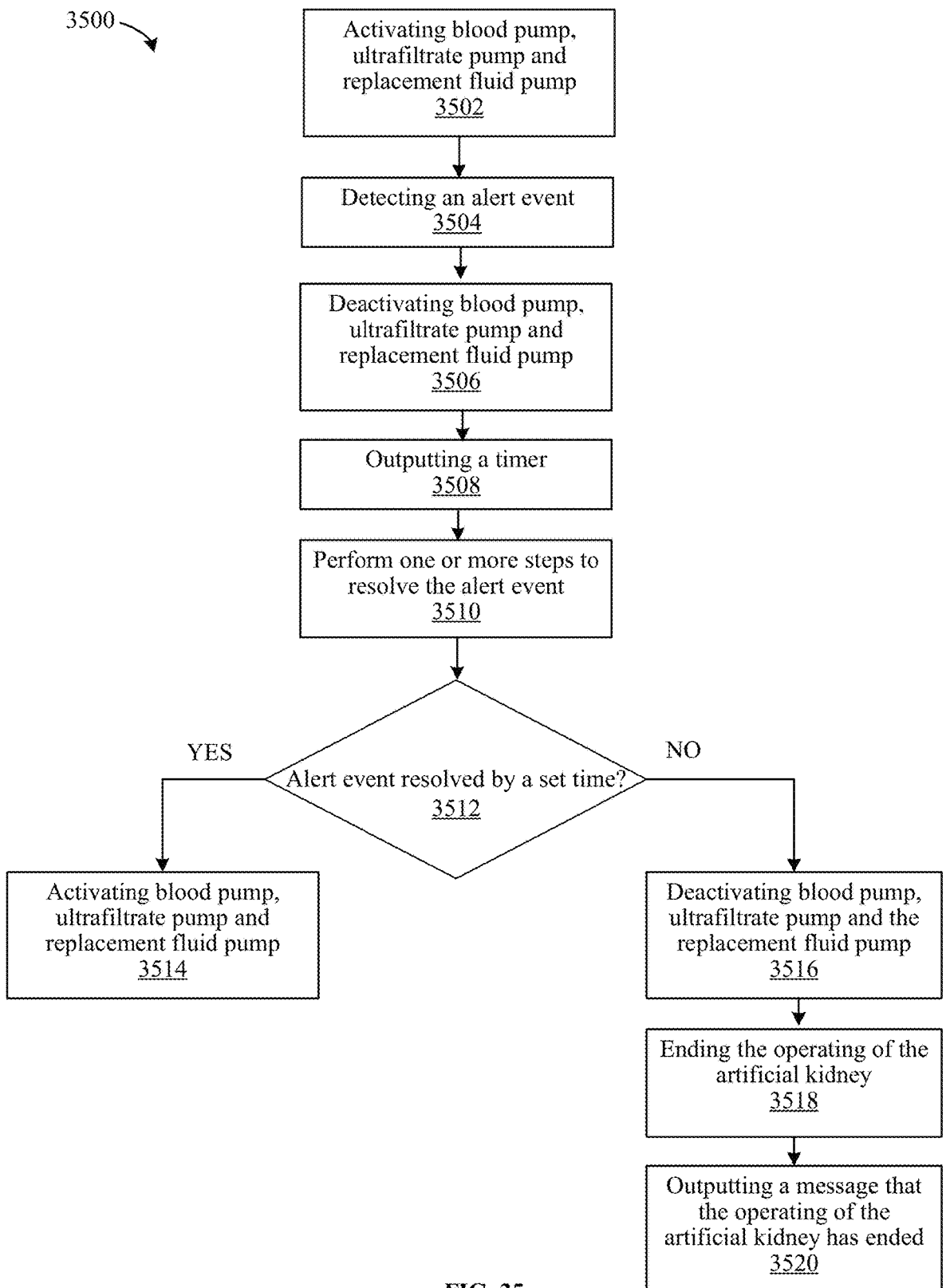
FIG. 35 illustrates a flow diagram of a method for operating the artificial kidney, in accordance with an example embodiment.

FIG. 35 illustrates a flow diagram of a method 3500 for operating the artificial kidney 100, in accordance with an example embodiment. In an example, the method 3500 is performed by the controller 31. At step 3502, the controller 31 activates the blood pump 20, the ultrafiltrate pump 23, and the replacement fluid pump 38, i.e. for procedure running. At step 3504, the controller 31 detects an alert event. For example, the alert event can be detected from one of the sensors or detectors. In response to detecting the alert event, in response, the controller 31 deactivates the blood pump 20, the ultrafiltrate pump 23, and the replacement fluid pump 38 (step 3506), outputs a timer through the user interface device 29 (step 3508) and one or more steps are taken to resolve the alert event (step 3510). At step 3512, the controller 31 checks whether the alert event has been resolved, including checking when the user inputs a Done response, before a set time, e.g. 3 minutes. If yes (YES), at step 3514 the controller 31 activates the blood pump 20, the ultrafiltrate pump 23, and the replacement fluid pump 38 (or maintains the activating of the pumps if the pumps were activated during the steps to resolve the alert event). If no (NO), at step 3516 the controller 31 deactivates the blood pump 20, the ultrafiltrate pump 23, and the replacement fluid pump 38 (or maintains the deactivating of the blood pump 20, the ultrafiltrate pump 23, and the replacement fluid pump 38 if the blood pump 20, the ultrafiltrate pump 23, and the replacement fluid pump 38 were deactivated during the steps to resolve the alert event). At event 3518, the controller 31 ends the operating of the artificial kidney 100. At event 3520, the controller 31 outputs, via the user interface device 29, a message that the operating of the artificial kidney 100 has ended.

Another example embodiment is a kit for assembling the artificial kidney 100. In some examples, all the components of the kit be provided together, or provided to the user or patient in separate lots, for example, as non-disposable components 600 in one lot and the disposables 500 in another lot. In an example, the kit also includes instructions (e.g., paper-based or digital, not shown here) for assembling the artificial kidney 100. In some examples, the instructions including instructions as to how to use and operate the artificial kidney 100. In some examples, the kit includes the inlet cannula and outlet cannula.

An example embodiment is an artificial kidney, comprising: a garment for supporting at least part of the artificial kidney; a blood inlet circuit; a 3-port, 2-position blood inlet stopcock connected to the blood inlet circuit and for connection to a patient inlet circuit; a saline circuit for providing saline and connected to the 3-port, 2-position blood inlet stopcock; a hemofilter connected to the blood inlet circuit; a blood outlet circuit connected to the hemofilter; a blood pump for circulating through the blood inlet circuit, the hemofilter, and the blood outlet circuit; a waste circuit for waste removal; a 3-port, 2-position blood outlet stopcock connected to the blood outlet circuit and to the waste circuit and for connection to a patient outlet circuit; a first actuator for controlling the 3-port, 2-position blood inlet stopcock; a second actuator for controlling the 3-port, 2-position blood outlet stopcock; and a controller for controlling operation of at least the first actuator, the second actuator, and the blood pump.

In another example embodiment of the artificial kidney according to any of the above, the artificial kidney further includes: an ultrafiltrate circuit connected to the hemofilter for removal of ultrafiltrate, the ultrafiltrate circuit including an ultrafiltrate pump for circulating through the ultrafiltrate circuit.

In another example embodiment of the artificial kidney according to any of the above, the ultrafiltrate circuit further includes: an ultrafiltrate flow sensor for detecting flow through the ultrafiltrate circuit; an ultrafiltrate bag for storage of the ultrafiltrate; and a blood detector for detecting blood leakage in the ultrafiltrate circuit.

In another example embodiment of the artificial kidney according to any of the above, the ultrafiltrate circuit further includes: ultrafiltrate tubing; and an ultrafiltrate tubing holder for removably attaching the ultrafiltrate circuit tubing to the garment.

In another example embodiment of the artificial kidney according to any of the above, the artificial kidney further includes: a flow detector for detecting air in the patient outlet circuit or from the blood outlet circuit, wherein the controller is configured to detect no flow in the ultrafiltrate circuit during running of the blood pump, and in response the controller is configured to perform a flushing mode of the hemofilter and the ultrafiltrate circuit.

In another example embodiment of the artificial kidney according to any of the above, the flushing mode includes a forward flushing and/or a backwash flushing of the hemofilter.

In another example embodiment of the artificial kidney according to any of the above, the artificial kidney further includes: a 3-port, 2-position backwash stopcock connected to the blood outlet circuit, the hemofilter, and the ultrafiltrate circuit, wherein the 3-port, 2-position backwash stopcock defines a backwash stopcock passage between the hemofilter and the blood circuit and the waste circuit, for performing the backward flushing of the hemofilter.

In another example embodiment of the artificial kidney according to any of the above, the flushing mode is configured to be performed by the controller while the artificial kidney is connected to a patient.

In another example embodiment of the artificial kidney according to any of the above, the waste circuit includes: waste tubing; a waste bag; and a waste tubing holder for removably attaching the waste tubing to the garment.

In another example embodiment of the artificial kidney according to any of the above, the artificial kidney further includes a replacement fluid circuit connected to the blood outlet circuit for providing replacement fluid, the replacement fluid circuit including: a replacement fluid pump for circulating through the replacement fluid circuit; a replacement fluid flow sensor for detecting flow through the replacement fluid circuit; and a replacement fluid bag for storage of the replacement fluid.

In another example embodiment of the artificial kidney according to any of the above, the replacement fluid circuit further includes: replacement fluid tubing; and a replacement fluid tubing holder for removably attaching the replacement fluid tubing to the garment.

In another example embodiment of the artificial kidney according to any of the above, the replacement fluid circuit further includes a replacement fluid air detector, wherein the controller is configured to detect air in the replacement fluid circuit via the replacement fluid air detector, and in response is configured to: deactivate the blood pump; deactivate the replacement fluid pump; deactivate the ultrafiltrate pump; control the second actuator to control the 3-port, 2-position blood outlet stopcock to define a first blood outlet stopcock passage between the blood outlet circuit and the waste circuit; and activate the replacement fluid pump in a forward direction being towards the blood outlet circuit.

In another example embodiment of the artificial kidney according to any of the above, the artificial kidney further includes an air detector for detecting air in the patient outlet circuit or from the blood outlet circuit, wherein the controller is configured to detect air in the patient outlet circuit or from the blood outlet circuit via the air detector, and in response is configured to: deactivate the blood pump; deactivate the replacement fluid pump; deactivate the ultrafiltrate pump; control the first actuator to control the 3-port, 2-position blood inlet stopcock to define a first blood inlet stopcock passage between the saline circuit and the blood inlet circuit to provide saline to the blood inlet circuit; control the second actuator to control the 3-port, 2-position blood outlet stopcock to define a first blood outlet stopcock passage between the blood outlet circuit and the waste circuit; activate the blood pump; re-deactivate the blood pump; control the second actuator to control the 3-port, 2-position blood outlet stopcock to define a second blood outlet stopcock passage between the blood outlet circuit and the patient outlet circuit; activate the replacement fluid pump in a reverse direction being away from the blood outlet circuit to pull the air; re-deactivate the replacement fluid pump; control the second actuator to control the 3-port, 2-position blood outlet stopcock to define the first blood outlet stopcock passage between the blood outlet circuit and the waste circuit; and activate the replacement fluid pump in a forward direction being towards the blood outlet circuit.

In another example embodiment of the artificial kidney according to any of the above, the controller is configured to prime the artificial kidney in which the controller is configured to: control the first actuator to control the 3-port, 2-position blood inlet stopcock to define a first blood inlet stopcock passage between the saline circuit and the blood inlet circuit; control the second actuator to control the 3-port, 2-position blood outlet stopcock to define a second blood outlet stopcock passage between the blood outlet circuit and the patient outlet circuit; activate the ultrafiltrate pump; activate the blood pump; deactivate the ultrafiltrate pump; deactivate the blood pump; control, after the deactivating of the blood pump, the second actuator to control the 3-port, 2-position blood outlet stopcock to define a first blood outlet stopcock passage between the blood outlet circuit and the waste circuit; and activate the replacement fluid pump.

In another example embodiment of the artificial kidney according to any of the above, the patient outlet includes an air detector and a flow sensor, wherein the controller is configured to, for the prime of the artificial kidney, temporarily deactivate the air detector and the flow sensor.

In another example embodiment of the artificial kidney according to any of the above, the controller is configured to control the first actuator to control the 3-port, 2-position blood inlet stopcock to define a second blood inlet stopcock passage between the patient inlet circuit and the blood inlet circuit, control the second actuator to control the 3-port, 2-position blood outlet stopcock to define a second blood outlet stopcock passage between the blood outlet circuit and the patient outlet circuit, activate the blood pump, activate the ultrafiltrate pump and activate the replacement fluid pump.

In another example embodiment of the artificial kidney according to any of the above, the controller is configured to control the first actuator to control the 3-port, 2-position blood inlet stopcock to define a second blood inlet stopcock passage between the patient inlet circuit and the blood inlet circuit, control the second actuator to control the 3-port, 2-position blood outlet stopcock to define a second blood outlet stopcock passage between the blood outlet circuit and the patient outlet circuit, activate the blood pump, activate the ultrafiltrate pump and activate the replacement fluid pump.

In another example embodiment of the artificial kidney according to any of the above, the artificial kidney further includes an air detector for detecting air in the patient outlet circuit or in the blood outlet circuit, wherein the controller is configured to detect air in the patient outlet circuit or in the blood outlet circuit via the air detector, and in response the controller is configured to perform a purging mode of the blood outlet circuit and the blood inlet circuit.

In another example embodiment of the artificial kidney according to any of the above, the artificial kidney further includes an air detector, wherein the controller is configured to check the air detector prior to running of the blood pump.

In another example embodiment of the artificial kidney according to any of the above, the artificial kidney further includes a blood flow sensor for detecting flow through the patient outlet circuit.

In another example embodiment of the artificial kidney according to any of the above, the artificial kidney further includes one or more sensors each for detecting and outputting information in relation to the artificial kidney.

In another example embodiment of the artificial kidney according to any of the above, the controller is configured to: activate the blood pump; detect, using one or more of the sensors, an alert event, and in response: deactivate the blood pump, output a timer, perform one or more steps to resolve the alert event, detect that the alert event has been resolved by a set time, and reactivate or maintain activation of the blood pump.

In another example embodiment of the artificial kidney according to any of the above, the patient outlet circuit further comprises a blood clot filter.

In another example embodiment of the artificial kidney according to any of the above, the patient inlet circuit further comprises an injection port.

In another example embodiment of the artificial kidney according to any of the above, the artificial kidney further includes a battery for providing power to at least the controller.

In another example embodiment of the artificial kidney according to any of the above, the saline circuit further comprises: saline tubing; and a saline bag.

In another example embodiment of the artificial kidney according to any of the above, the artificial kidney further includes: tubing; and a holder for securing the tubing to the garment. In another example embodiment of the artificial kidney according to any of the above, the tubing includes a collar having a flange, wherein the holder includes a groove dimensioned to receive the flange.

In another example embodiment of the artificial kidney according to any of the above, the holder includes a snap-lid for securing the tubing.

In another example embodiment of the artificial kidney according to any of the above, the holder includes a first counterpart of a loop and hook connector, wherein the garment includes a second counterpart of the loop and hook connector.

In another example embodiment of the artificial kidney according to any of the above, the 3-port, 2-position blood inlet stopcock and the 3-port, 2-position blood outlet stopcock each include: a first port, a second port, and a third port, and a stopcock lever for switching between a first position and a second position, wherein the first position defines a first stopcock passage between the first port and the second port and wherein the second position defines a second stopcock passage between the first port and the third port, wherein for the blood inlet stopcock the first port is connected to the blood inlet circuit, the second port is connected to the saline circuit, and the third port is connected to the patient inlet circuit, and wherein for the blood outlet stopcock, the first port is connected to the blood outlet circuit, the second port is connected to the waste circuit, and the third port is connected to the patient outlet circuit.

In another example embodiment of the artificial kidney according to any of the above, the first actuator and the second actuator each include a servo-positioner attached to the respective stopcock lever of the 3-port, 2-position blood inlet stopcock or the 3-port, 2-position blood outlet stopcock, the servo-positioner configured to rotate the respective stopcock lever to position the respective stopcock lever of the 3-port, 2-position blood inlet stopcock or the 3-port, 2-position blood outlet stopcock at the first stopcock passage or the second stopcock passage as determined by the controller.

In another example embodiment of the artificial kidney according to any of the above, the patient inlet circuit includes an inlet insert-to-open valve connector and an inlet cannula for connecting to the inlet insert-to-open valve connector, and wherein the patient outlet circuit includes an outlet insert-to-open valve connector and an outlet cannula for connecting to the outlet insert-to-open valve connector.

In another example embodiment of the artificial kidney according to any of the above, the artificial kidney further includes a user interface device for interaction with the controller.

In another example embodiment of the artificial kidney according to any of the above, the blood pump is a clamp-on pump.

In another example embodiment of the artificial kidney according to any of the above, the blood pump is a peristaltic pump.

In another example embodiment of the artificial kidney according to any of the above, the blood pump is configured to operate at constant flow rate from 5 mL/minute to 250 mL/minute.

In another example embodiment of the artificial kidney according to any of the above, the blood pump is configured to operate at constant flow rate of on or about 50 mL/minute.

Another example embodiment is a kit for assembling the artificial kidney according to any of the above.

Another example embodiment is a kit for assembling an artificial kidney, the kit comprising: a garment for supporting at least part of the artificial kidney; a blood inlet circuit; a 3-port, 2-position blood inlet stopcock connected to the blood inlet circuit and for connection to a patient inlet circuit; a saline circuit for providing saline and for connection to the 3-port, 2-position blood inlet stopcock; a hemofilter for connection to the blood inlet circuit; a blood outlet circuit for connection to the hemofilter; a blood pump for circulating through the blood inlet circuit, the hemofilter, and the blood outlet circuit; a waste circuit for waste removal; a 3-port, 2-position blood outlet stopcock for connection to the blood outlet circuit, the waste circuit and for connection to a patient outlet circuit; a first actuator for controlling the 3-port, 2-position blood inlet stopcock; a second actuator for controlling the 3-port, 2-position blood outlet stopcock; and a controller for controlling operation of at least the first actuator, the second actuator, and the blood pump.

Another example embodiment is a method for controlling an artificial kidney, the artificial kidney including a blood circuit, a hemofilter connected to the blood circuit, a blood pump for circulating through the blood circuit, a 3-port, 2-position blood inlet stopcock connected to the blood circuit, a 3-port, 2-position blood outlet stopcock connected to the blood circuit, a saline circuit for providing saline and connected to the 3-port, 2-position blood inlet stopcock, a waste circuit for waste removal and connected to the 3-port, 2-position blood outlet stopcock, the method comprising: controlling the 3-port, 2-position blood inlet stopcock; controlling the 3-port, 2-position blood outlet stopcock; and activating the blood pump.

In another example embodiment of the method according to any of the above, the method further includes: detecting an alert event, and in response: deactivating the blood pump, outputting a timer, performing one or more steps to resolve the alert event, detecting that the alert event has been resolved by a set time, and reactivating or maintaining the activating of the blood pump.

In another example embodiment of the method according to any of the above, the artificial kidney includes an air detector and a flow sensor, wherein the controller is configured to, in response to the detecting the alert event, temporarily deactivate the air detector and the flow sensor.

In another example embodiment of the method according to any of the above, the artificial kidney further includes an ultrafiltrate circuit connected to the hemofilter for removal of ultrafiltrate, the ultrafiltrate circuit including an ultrafiltrate pump for circulating through the ultrafiltrate circuit and an ultrafiltrate bag for storing the ultrafiltrate, wherein the artificial kidney further includes a replacement fluid circuit connected to the blood circuit for providing replacement fluid, the replacement fluid circuit including a replacement fluid pump for circulating through the replacement fluid circuit, the method further comprising: deactivating, in response to the detecting the alert event, the ultrafiltrate pump and the replacement fluid pump; and reactivating or maintaining activating, in response to the detecting that the alert event has been resolved by the set time, the ultrafiltrate pump and the replacement fluid pump.

In another example embodiment of the method according to any of the above, the artificial kidney further includes a controller, a first actuator for controlling the 3-port, 2-position blood inlet stopcock, and a second actuator for controlling the 3-port, 2-position blood outlet stopcock, wherein the controlling the 3-port, 2-position blood inlet stopcock includes the controller controlling the first actuator, wherein the controlling the 3-port, 2-position blood outlet stopcock includes the controller controlling the second actuator, wherein the activating the blood pump is performed by the controller.

In another example embodiment of the method according to any of the above, the artificial kidney further includes an ultrafiltrate circuit connected to the hemofilter for removal of ultrafiltrate, the ultrafiltrate circuit including an ultrafiltrate pump for circulating through the ultrafiltrate circuit and an ultrafiltrate bag for storing the ultrafiltrate, wherein the artificial kidney further includes a replacement fluid circuit connected to the blood circuit for providing replacement fluid, the replacement fluid circuit including a replacement fluid pump for circulating through the replacement fluid circuit, the method further comprising: activating the ultrafiltrate pump; and activating the replacement fluid pump.

In another example embodiment of the method according to any of the above, the artificial kidney further includes a controller, wherein the activating the blood pump, the activating the ultrafiltrate pump, and the activating the replacement fluid pump are performed by the controller.

Another example embodiment is a controller-implemented method for controlling an artificial kidney, the artificial kidney including a blood circuit, a hemofilter connected to the blood circuit, a blood pump for circulating through the blood circuit, the method comprising: detecting an alert event, and in response: outputting a timer, performing one or more steps to resolve the alert event, detecting that the alert event has been resolved by a set time, and activating or maintaining the activating of the blood pump.

In another example embodiment of the controller-implemented method according to any of the above, the detecting that the alert event has been resolved by the set time includes receiving user input of being done.

In another example embodiment of the controller-implemented method according to any of the above, the artificial kidney includes one or more disposables, wherein the alert event is replacement of one or more of the disposables.

In another example embodiment of the controller-implemented method according to any of the above, the artificial kidney includes an inlet cannula, an inlet insert-to-open valve connector, an outlet cannula, and an outlet insert-to-open valve connector, wherein the alert event is connection of the inlet cannula to the inlet insert-to-open valve connector and connection of the outlet cannula to the outlet insert-to-open valve connector.

In another example embodiment of the controller-implemented method according to any of the above, the method further includes detecting and outputting, using one or more sensors, information of the artificial kidney, wherein the detecting includes receiving the information from the one or more sensors.

In another example embodiment of the controller-implemented method according to any of the above, the method further includes prior activating, prior to the detecting, the blood pump; and in response to the detecting the alert event: deactivating the blood pump.

In another example embodiment of the controller-implemented method according to any of the above, the artificial kidney further includes an ultrafiltrate circuit connected to the hemofilter for removal of ultrafiltrate, the ultrafiltrate circuit including an ultrafiltrate pump for circulating through the ultrafiltrate circuit and an ultrafiltrate bag for storing the ultrafiltrate, wherein the artificial kidney further includes a replacement fluid circuit connected to the blood circuit for providing replacement fluid, the replacement fluid circuit including a replacement fluid pump for circulating through the replacement fluid circuit, the method further comprising: in response to the detecting the alert event: deactivating the ultrafiltrate pump and the replacement fluid pump; and in response to the detecting that the alert event has been resolved by the set time: reactivating or maintaining the activating of the ultrafiltrate pump and the replacement fluid pump.

In another example embodiment of the controller-implemented method according to any of the above, the alert event is the ultrafiltrate bag being full.

In another example embodiment of the controller-implemented method according to any of the above, the alert event is air in or from the blood circuit or the ultrafiltrate circuit.

In another example embodiment of the controller-implemented method according to any of the above, the artificial kidney includes a patient inlet circuit, a saline circuit, a 3-port, 2-position blood inlet stopcock for connection to the blood circuit, the patient inlet circuit, and the saline circuit, a 3-port, 2-position blood outlet stopcock connected to the blood circuit, a patient outlet circuit connected to the 3-port, 2-position blood outlet stopcock, a waste circuit for waste removal and connected to the 3-port, 2-position blood outlet stopcock, the performing the one or more steps further including: controlling the 3-port, 2-position blood inlet stopcock to define a first blood inlet stopcock passage between the saline circuit and the blood circuit to provide saline to the blood circuit; controlling the 3-port, 2-position blood outlet stopcock to define a first blood outlet stopcock passage between the blood circuit and the waste circuit; reactivating the blood pump; re-deactivating the blood pump; controlling the 3-port, 2-position blood outlet stopcock to define a second blood outlet stopcock passage between the blood circuit and the patient outlet circuit; activating the replacement fluid pump in a reverse direction being away from the blood circuit to pull the air; deactivating the replacement fluid pump; controlling the 3-port, 2-position blood outlet stopcock to define the first blood outlet stopcock passage between the blood circuit and the waste circuit; and reactivating the replacement fluid pump in a forward direction being towards the blood circuit.

In another example embodiment of the controller-implemented method according to any of the above, the alert event is low blood flow alert in the blood circuit.

In another example embodiment of the controller-implemented method according to any of the above, the artificial kidney includes a battery, wherein the alert event is low battery.

In another example embodiment of the controller-implemented method according to any of the above, the artificial kidney includes a voltage regulator, wherein the alert event is fail motor voltage from the voltage regulator.

In another example embodiment of the controller-implemented method according to any of the above, the artificial kidney is a portable artificial kidney or a wearable artificial kidney.

Another example embodiment is a controller-implemented method for operating an artificial kidney, the artificial kidney including a blood circuit, a hemofilter connected to the blood circuit, a blood pump for circulating through the blood circuit, the method comprising: activating the blood pump; detecting an alert event, and in response: deactivating the blood pump, outputting a timer, perform one or more steps to resolve the alert event, detecting that a set time has ended without resolving of the alert event, and outputting a message that the operating of the artificial kidney has ended.

In another example embodiment of the controller-implemented method according to any of the above, the artificial kidney includes an air detector and a flow sensor for the blood circuit, wherein the controller is configured to, in response to the detecting the alert event, temporarily deactivate the air detector and the flow sensor.

In another example embodiment of the controller-implemented method according to any of the above, the detecting that the set time has ended includes failing to detect user input of being done.

Another example embodiment is an artificial kidney, comprising: a blood circuit; a hemofilter connected to the blood circuit; a blood pump for circulating through the blood circuit; and a controller configured to perform the method or the controller-implemented according to any of the above.

Another example embodiment is a non-transitory computer-readable medium, including instructions that, when executed by a controller, causes the controller to control an artificial kidney, the instructions comprising instructions for performing the method or the controller-implemented method according to any of the aboveIn the described methods or block diagrams, the boxes may represent events, steps, functions, processes, modules, messages, and/or state-based operations, etc. While some of the above examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

The above discussed embodiments are considered to be illustrative and not restrictive. Example embodiments described as methods would similarly apply to systems, and vice-versa.

The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprises of a sub-combination of features which may not be explicitly described above. In addition, features from one or more of the above-described embodiments may be selected and combined to create alternative 10 embodiments comprised of a combination of features which may not be explicitly described above. Features suitable for such combinations and sub-combinations would be readily apparent to persons skilled in the art upon review of the present disclosure as a whole. The subject matter described herein intends to cover all suitable changes in technology.

The invention claimed is:

1. An artificial kidney, comprising:
a garment for supporting at least part of the artificial kidney;
a blood inlet circuit;

a 3-port, 2-position blood inlet stopcock connected to the blood inlet circuit and for connection to a patient inlet circuit;
a saline circuit for providing saline and connected to the 3-port, 2-position blood inlet stopcock;
a hemofilter connected to the blood inlet circuit;
a blood outlet circuit connected to the hemofilter;
a blood pump for circulating through the blood inlet circuit, the hemofilter, and the blood outlet circuit;
a waste circuit for waste removal;
a 3-port, 2-position blood outlet stopcock connected to the blood outlet circuit and to the waste circuit and for connection to a patient outlet circuit;
a first actuator for controlling the 3-port, 2-position blood inlet stopcock;
a second actuator for controlling the 3-port, 2-position blood outlet stopcock; and
a controller for controlling operation of at least the first actuator, the second actuator, and the blood pump.

2. The artificial kidney as claimed in claim 1, further comprising:
an ultrafiltrate circuit connected to the hemofilter for removal of ultrafiltrate, the ultrafiltrate circuit including an ultrafiltrate pump for circulating through the ultrafiltrate circuit.

3. The artificial kidney as claimed in claim 2, wherein the ultrafiltrate circuit further includes:
an ultrafiltrate flow sensor for detecting flow through the ultrafiltrate circuit;
an ultrafiltrate bag for storage of the ultrafiltrate; and
a blood detector for detecting blood leakage in the ultrafiltrate circuit.

4. The artificial kidney as claimed in claim 2, further comprising a flow detector for detecting air in the patient outlet circuit or from the blood outlet circuit, wherein the controller is configured to detect no flow in the ultrafiltrate circuit during running of the blood pump, and in response the controller is configured to perform a flushing mode of the hemofilter and the ultrafiltrate circuit.

5. The artificial kidney as claimed in claim 4, wherein the flushing mode includes a forward flushing and/or a backwash flushing of the hemofilter.

6. The artificial kidney as claimed in claim 5, further comprising a 3-port, 2-position backwash stopcock connected to the blood outlet circuit, the hemofilter, and the ultrafiltrate circuit, wherein the 3-port, 2-position backwash stopcock defines a backwash stopcock passage between the hemofilter and the blood circuit and the waste circuit, for performing the backward flushing of the hemofilter.

7. The artificial kidney as claimed in claim 2, further comprising a replacement fluid circuit connected to the blood outlet circuit for providing replacement fluid, the replacement fluid circuit including:
a replacement fluid pump for circulating through the replacement fluid circuit;
a replacement fluid flow sensor for detecting flow through the replacement fluid circuit; and
a replacement fluid bag for storage of the replacement fluid.

8. The artificial kidney as claimed in claim 7, wherein the replacement fluid circuit further includes a replacement fluid air detector, wherein the controller is configured to detect air in the replacement fluid circuit via the replacement fluid air detector, and in response is configured to:
deactivate the blood pump;
deactivate the replacement fluid pump;
deactivate the ultrafiltrate pump;
control the second actuator to control the 3-port, 2-position blood outlet stopcock to define a first blood outlet stopcock passage between the blood outlet circuit and the waste circuit; and
activate the replacement fluid pump in a forward direction being towards the blood outlet circuit.

9. The artificial kidney as claimed in claim 7, further comprising an air detector for detecting air in the patient outlet circuit or from the blood outlet circuit, wherein the controller is configured to detect air in the patient outlet circuit or from the blood outlet circuit via the air detector, and in response is configured to:
deactivate the blood pump;
deactivate the replacement fluid pump;
deactivate the ultrafiltrate pump;
control the first actuator to control the 3-port, 2-position blood inlet stopcock to define a first blood inlet stopcock passage between the saline circuit and the blood inlet circuit to provide saline to the blood inlet circuit;
control the second actuator to control the 3-port, 2-position blood outlet stopcock to define a first blood outlet stopcock passage between the blood outlet circuit and the waste circuit;
activate the blood pump;
re-deactivate the blood pump;
control the second actuator to control the 3-port, 2-position blood outlet stopcock to define a second blood outlet stopcock passage between the blood outlet circuit and the patient outlet circuit;
activate the replacement fluid pump in a reverse direction being away from the blood outlet circuit to pull the air;
re-deactivate the replacement fluid pump;
control the second actuator to control the 3-port, 2-position blood outlet stopcock to define the first blood outlet stopcock passage between the blood outlet circuit and the waste circuit; and
activate the replacement fluid pump in a forward direction being towards the blood outlet circuit.

10. The artificial kidney as claimed in claim 7, wherein the controller is configured to prime the artificial kidney in which the controller is configured to:
control the first actuator to control the 3-port, 2-position blood inlet stopcock to define a first blood inlet stopcock passage between the saline circuit and the blood inlet circuit;
control the second actuator to control the 3-port, 2-position blood outlet stopcock to define a second blood outlet stopcock passage between the blood outlet circuit and the patient outlet circuit;
activate the ultrafiltrate pump;
activate the blood pump;
deactivate the ultrafiltrate pump;
deactivate the blood pump;
control, after the deactivating of the blood pump, the second actuator to control the 3-port, 2-position blood outlet stopcock to define a first blood outlet stopcock passage between the blood outlet circuit and the waste circuit; and
activate the replacement fluid pump.

11. The artificial kidney as claimed in claim 10, wherein the controller is configured to control the first actuator to control the 3-port, 2-position blood inlet stopcock to define a second blood inlet stopcock passage between the patient inlet circuit and the blood inlet circuit, control the second actuator to control the 3-port, 2-position blood outlet stopcock to define a second blood outlet stopcock passage between the blood outlet circuit and the patient outlet circuit, activate the blood pump, activate the ultrafiltrate pump and activate the replacement fluid pump.

12. The artificial kidney as claimed in claim 7, wherein the controller is configured to control the first actuator to control the 3-port, 2-position blood inlet stopcock to define a second blood inlet stopcock passage between the patient inlet circuit and the blood inlet circuit, control the second actuator to control the 3-port, 2-position blood outlet stopcock to define a second blood outlet stopcock passage between the blood outlet circuit and the patient outlet circuit, activate the blood pump, activate the ultrafiltrate pump and activate the replacement fluid pump.

13. The artificial kidney as claimed in claim 1, further comprising an air detector for detecting air in the patient outlet circuit or in the blood outlet circuit, wherein the controller is configured to detect air in the patient outlet circuit or in the blood outlet circuit via the air detector, and in response the controller is configured to perform a purging mode of the blood outlet circuit and the blood inlet circuit.

14. The artificial kidney as claimed in claim 1, further comprising one or more sensors each for detecting and outputting information in relation to the artificial kidney, wherein the controller is configured to:
   activate the blood pump;
   detect, using one or more of the sensors, an alert event, and in response:
   deactivate the blood pump,
   output a timer,
   perform one or more steps to resolve the alert event,
   detect that the alert event has been resolved by a set time, and
   reactivate or maintain activation of the blood pump.

15. The artificial kidney as claimed in claim 1, wherein the saline circuit further comprises:
   saline tubing; and
   a saline bag.

16. The artificial kidney as claimed in claim 1, wherein the 3-port, 2-position blood inlet stopcock and the 3-port, 2-position blood outlet stopcock each include: a first port, a second port, and a third port, and a stopcock lever for switching between a first position and a second position,
   wherein the first position defines a first stopcock passage between the first port and the second port and wherein the second position defines a second stopcock passage between the first port and the third port,
   wherein for the blood inlet stopcock the first port is connected to the blood inlet circuit, the second port is connected to the saline circuit, and the third port is connected to the patient inlet circuit, and
   wherein for the blood outlet stopcock, the first port is connected to the blood outlet circuit, the second port is connected to the waste circuit, and the third port is connected to the patient outlet circuit.

17. The artificial kidney as claimed in claim 16, wherein the first actuator and the second actuator each include a servo-positioner attached to the respective stopcock lever of the 3-port, 2-position blood inlet stopcock or the 3-port, 2-position blood outlet stopcock, the servo-positioner configured to rotate the respective stopcock lever to position the respective stopcock lever of the 3-port, 2-position blood inlet stopcock or the 3-port, 2-position blood outlet stopcock at the first stopcock passage or the second stopcock passage as determined by the controller.

18. The artificial kidney as claimed in claim 1, wherein the patient inlet circuit includes an inlet insert-to-open valve connector and an inlet cannula for connecting to the inlet insert-to-open valve connector, and wherein the patient outlet circuit includes an outlet insert-to-open valve connector and an outlet cannula for connecting to the outlet insert-to-open valve connector.

* * * * *